US011462794B2

(12) United States Patent
Sheeks et al.

(10) Patent No.: US 11,462,794 B2
(45) Date of Patent: Oct. 4, 2022

(54) HIGH POWER BATTERY-POWERED SYSTEM

(71) Applicant: MILWAUKEE ELECTRIC TOOL CORPORATION, Brookfield, WI (US)

(72) Inventors: Samuel Sheeks, Germantown, WI (US); Keith Boulanger, Kenosha, WI (US); Andrew T. Beyerl, Pewaukee, WI (US); Timothy R. Obermann, Waukesha, WI (US); Carl B. Westerby, Menomonee Falls, WI (US); Matthew J. Mergener, Mequon, WI (US); Cameron R. Schulz, Milwaukee, WI (US); Kyle C. Fassbender, Brookfield, WI (US); Matthew R. Polakowski, Greenfield, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 136 days.

(21) Appl. No.: 16/751,344

(22) Filed: Jan. 24, 2020

(65) Prior Publication Data

US 2020/0162007 A1 May 21, 2020

Related U.S. Application Data

(63) Continuation of application No. PCT/US2018/043749, filed on Jul. 25, 2018.
(Continued)

(51) Int. Cl.
*H01M 50/20* (2021.01)
*H02K 11/33* (2016.01)
(Continued)

(52) U.S. Cl.
CPC ......... *H01M 50/20* (2021.01); *H01M 50/213* (2021.01); *H02H 7/0833* (2013.01);
(Continued)

(58) Field of Classification Search
CPC ...... H02P 27/08; H01M 50/213; H01M 50/20
(Continued)

(56) References Cited

U.S. PATENT DOCUMENTS 4,327,302 A    4/1982   Hershberger
4,434,546 A    3/1984   Hershberger
(Continued)

FOREIGN PATENT DOCUMENTS

CN    2715414 Y    8/2005
CN    1949628 A    4/2007
(Continued)

OTHER PUBLICATIONS

International Search Report and Written Opinion for Application No. PCT/US2018/043749 dated Nov. 21, 2018, 26 pages.
(Continued)

*Primary Examiner* — Kawing Chan
(74) *Attorney, Agent, or Firm* — Michael Best & Friedrich LLP

(57) ABSTRACT

An electrical combination, a motorized device system, a motor assembly, a battery pack, and operating methods. The combination may include an electrical device including a device housing, a load supported by the device housing, the load being operable to output at least about 1800 watts (W), and a device terminal electrically connected to the load; a battery pack including a pack housing, battery cells supported by the pack housing, the battery cells being electrically connected and having a nominal voltage of up to about 20 volts, and a pack terminal electrically connectable to the device terminal to transfer current between the battery pack
(Continued)

and the electrical device; and a controller operable to control the transfer of current.

17 Claims, 89 Drawing Sheets

Related U.S. Application Data

(60) Provisional application No. 62/570,828, filed on Oct. 11, 2017, provisional application No. 62/536,807, filed on Jul. 25, 2017.

(51) Int. Cl.
| | |
|---|---|
| *H02H 7/08* | (2006.01) |
| *H02P 27/08* | (2006.01) |
| *H02K 1/18* | (2006.01) |
| *H02K 1/14* | (2006.01) |
| *H02K 9/06* | (2006.01) |
| *H02K 3/52* | (2006.01) |
| *H02K 5/20* | (2006.01) |
| *H02K 5/15* | (2006.01) |
| *H02K 7/14* | (2006.01) |
| *H02K 21/16* | (2006.01) |
| *H02K 1/276* | (2022.01) |
| *H01M 50/213* | (2021.01) |

(52) U.S. Cl.
CPC ............ *H02K 1/146* (2013.01); *H02K 1/185* (2013.01); *H02K 1/276* (2013.01); *H02K 3/522* (2013.01); *H02K 5/15* (2013.01); *H02K 5/20* (2013.01); *H02K 7/145* (2013.01); *H02K 9/06* (2013.01); *H02K 11/33* (2016.01); *H02K 21/16* (2013.01); *H02P 27/08* (2013.01); *H02K 2203/09* (2013.01); *H02K 2213/03* (2013.01)

(58) Field of Classification Search
USPC ........................................................ 318/139
See application file for complete search history.

(56) References Cited

U.S. PATENT DOCUMENTS

| | | | |
|---|---|---|---|
| 4,437,325 A | 3/1984 | Hershberger | |
| 4,476,736 A | 10/1984 | Hershberger | |
| 4,689,973 A | 9/1987 | Hershberger | |
| 4,806,717 A | 2/1989 | Hershberger | |
| 4,905,423 A | 3/1990 | van Laere | |
| RE33,655 E | 8/1991 | Hershberger | |
| 5,510,725 A * | 4/1996 | Schantz, Jr. | B60L 58/20 |
| | | | 324/762.09 |
| 5,672,926 A | 9/1997 | Brandes et al. | |
| 5,742,513 A * | 4/1998 | Bouhenguel | G01R 31/3278 |
| | | | 324/418 |
| 5,945,760 A | 8/1999 | Honda et al. | |
| 5,962,944 A | 10/1999 | Narita et al. | |
| 6,008,559 A | 12/1999 | Asano et al. | |
| 6,025,667 A | 2/2000 | Narita et al. | |
| 6,031,311 A | 2/2000 | Lee | |
| 6,049,153 A | 4/2000 | Nishiyama et al. | |
| 6,087,751 A | 7/2000 | Sakai | |
| 6,147,428 A | 11/2000 | Takazawa et al. | |
| 6,177,745 B1 | 1/2001 | Narita et al. | |
| 6,274,960 B1 | 8/2001 | Sakai et al. | |
| 6,300,700 B1 | 10/2001 | Nishiyama et al. | |
| 6,329,734 B1 | 12/2001 | Takahashi et al. | |
| 6,340,857 B2 | 1/2002 | Nishiyama et al. | |
| 6,342,745 B1 | 1/2002 | Sakai et al. | |
| 6,356,001 B1 | 3/2002 | Nishiyama et al. | |
| 6,369,480 B1 | 4/2002 | Nishiyama et al. | |
| 6,437,473 B1 | 8/2002 | Möbius et al. | |
| 6,441,524 B2 | 8/2002 | Kaneko et al. | |
| 6,525,442 B2 | 2/2003 | Koharagi et al. | |
| 6,552,462 B2 | 4/2003 | Sakai et al. | |
| 6,555,940 B2 | 4/2003 | Naito et al. | |
| 6,630,762 B2 | 10/2003 | Naito et al. | |
| 6,664,688 B2 | 12/2003 | Naito et al. | |
| 6,717,315 B1 | 4/2004 | Tajima et al. | |
| 6,741,002 B2 | 5/2004 | Nishiyama et al. | |
| 6,741,003 B2 | 5/2004 | Naito et al. | |
| 6,759,778 B2 | 7/2004 | Nishiyama et al. | |
| 6,774,523 B2 | 8/2004 | Ahn et al. | |
| 6,826,824 B2 | 12/2004 | Hiroyuki et al. | |
| 6,867,526 B2 | 3/2005 | Mori et al. | |
| 6,885,125 B2 | 4/2005 | Inayama et al. | |
| 6,906,444 B2 | 6/2005 | Hattori et al. | |
| 6,917,133 B2 | 7/2005 | Koharagi et al. | |
| 6,927,519 B2 | 8/2005 | Popov | |
| 6,943,474 B2 | 9/2005 | Inayama et al. | |
| 6,956,312 B2 | 10/2005 | Inayama et al. | |
| 6,967,424 B2 | 11/2005 | Popov | |
| 6,979,924 B2 | 12/2005 | Nishiyama et al. | |
| 6,987,342 B2 | 1/2006 | Hans | |
| D516,504 S | 3/2006 | Okuda et al. | |
| 7,019,426 B2 | 3/2006 | Mori et al. | |
| 7,057,322 B2 | 6/2006 | Araki et al. | |
| 7,151,335 B2 | 12/2006 | Tajima et al. | |
| 7,170,209 B2 | 1/2007 | Araki et al. | |
| 7,176,598 B2 | 2/2007 | Mori et al. | |
| 7,196,446 B2 | 3/2007 | Hans | |
| 7,204,012 B2 | 4/2007 | Kloepzig et al. | |
| D555,086 S | 11/2007 | Zhang | |
| 7,321,177 B2 | 1/2008 | Uchida et al. | |
| 7,385,328 B2 | 6/2008 | Melfi | |
| 7,432,624 B2 | 10/2008 | Kolehmainen et al. | |
| 7,436,095 B2 | 10/2008 | Aydin et al. | |
| 7,474,029 B2 | 1/2009 | Rahman et al. | |
| 7,479,723 B2 | 1/2009 | Dawsey et al. | |
| D589,441 S | 3/2009 | Van Wambeke | |
| 7,504,754 B2 | 3/2009 | Jahns et al. | |
| 7,521,832 B2 | 4/2009 | Tajima et al. | |
| 7,550,889 B2 | 6/2009 | Horst et al. | |
| 7,560,842 B2 | 7/2009 | Hattori | |
| D597,932 S | 8/2009 | Aglassinger | |
| 7,598,645 B2 | 10/2009 | Ley et al. | |
| 7,605,510 B2 | 10/2009 | Okuma et al. | |
| D604,695 S | 11/2009 | Aglassinger | |
| 7,612,480 B2 | 11/2009 | Fujii et al. | |
| D606,935 S | 12/2009 | Murayama et al. | |
| 7,705,503 B2 | 4/2010 | Takahashi et al. | |
| 7,705,504 B2 | 4/2010 | Nakayama et al. | |
| 7,732,965 B2 | 6/2010 | Nakayama et al. | |
| 7,750,523 B2 | 7/2010 | Nakayama et al. | |
| D622,661 S | 8/2010 | Yamada et al. | |
| 7,791,236 B2 | 9/2010 | Liang et al. | |
| 7,800,272 B2 | 9/2010 | Nakayama et al. | |
| 7,804,216 B2 | 9/2010 | Takahashi et al. | |
| 7,808,143 B2 | 10/2010 | Lee et al. | |
| 7,843,101 B2 | 11/2010 | Ito et al. | |
| 7,851,958 B2 | 12/2010 | Cai et al. | |
| 7,868,503 B1 | 1/2011 | Nakayama et al. | |
| 7,902,710 B2 | 3/2011 | Han et al. | |
| 7,906,882 B2 | 3/2011 | Okuma et al. | |
| 7,932,658 B2 | 4/2011 | Ionel | |
| 7,952,249 B2 | 5/2011 | Kori et al. | |
| D639,730 S | 6/2011 | Kawase | |
| D640,628 S | 6/2011 | Lopano et al. | |
| D640,975 S | 7/2011 | Okuda et al. | |
| D643,809 S | 8/2011 | Okuda et al. | |
| 8,008,825 B2 | 8/2011 | Suzuki et al. | |
| 8,018,109 B2 | 9/2011 | Leonardi et al. | |
| 8,044,546 B2 | 10/2011 | Liang et al. | |
| 8,058,767 B2 | 11/2011 | Haruno et al. | |
| 8,067,871 B2 | 11/2011 | Tajima et al. | |
| 8,080,915 B2 | 12/2011 | Nakayama et al. | |
| 8,120,223 B2 | 2/2012 | Leonardi et al. | |
| 8,138,651 B2 | 3/2012 | Rahman et al. | |
| D657,307 S | 4/2012 | Zhao | |
| 8,174,158 B2 | 5/2012 | Rahman et al. | |
| 8,179,011 B2 | 5/2012 | Takemoto et al. | |

(56) References Cited

U.S. PATENT DOCUMENTS

| | | | |
|---|---|---|---|
| 8,217,547 B2 | 7/2012 | Kamiya et al. |
| 8,227,953 B2 | 7/2012 | Suzuki et al. |
| 8,232,703 B2 | 7/2012 | Nakayama et al. |
| 8,264,113 B2 | 9/2012 | Takemoto et al. |
| 8,319,387 B2 | 11/2012 | Maemura et al. |
| 8,350,431 B2 | 1/2013 | Liang et al. |
| RE44,037 E | 3/2013 | Tajima et al. |
| D679,651 S | 4/2013 | Stratford |
| 8,427,023 B2 | 4/2013 | Maemura et al. |
| D682,192 S | 5/2013 | Corbin |
| D682,193 S | 5/2013 | Corbin |
| 8,461,737 B2 | 6/2013 | Feng et al. |
| 8,536,748 B2 | 9/2013 | Liang et al. |
| 8,546,990 B2 | 10/2013 | Suzuki et al. |
| 8,564,168 B2 | 10/2013 | Chamberlin et al. |
| 8,598,763 B2 | 12/2013 | Aota et al. |
| 8,729,763 B2 | 5/2014 | Kogure et al. |
| D712,826 S | 9/2014 | Marino et al. |
| 8,866,359 B2 | 10/2014 | Li et al. |
| 8,884,485 B2 | 11/2014 | Jurkovic et al. |
| 8,928,197 B2 | 1/2015 | Jurkovic et al. |
| 8,928,198 B2 | 1/2015 | Lutz et al. |
| 8,957,560 B2 | 2/2015 | Uchiyama et al. |
| 9,024,499 B2 | 5/2015 | Nakada |
| 9,035,522 B2 | 5/2015 | Liang et al. |
| 9,130,422 B2 | 9/2015 | Rahman et al. |
| 9,130,424 B2 | 9/2015 | Moon et al. |
| 9,300,175 B2 | 3/2016 | Shibata |
| 9,369,012 B2 | 6/2016 | Hattori et al. |
| 9,419,481 B2 | 8/2016 | Yamaguchi et al. |
| 9,496,758 B2 | 11/2016 | Kawanami |
| 9,502,930 B2 | 11/2016 | Huang et al. |
| 9,502,934 B2 | 11/2016 | Huang et al. |
| 9,515,526 B2 | 12/2016 | Huang et al. |
| D780,688 S | 3/2017 | Elder |
| D785,562 S | 5/2017 | Cooper |
| 9,647,501 B2 | 5/2017 | Nigo et al. |
| 9,680,341 B2 | 6/2017 | Takeda et al. |
| 9,705,388 B2 | 7/2017 | Melfi et al. |
| 9,748,806 B2 | 8/2017 | Koka et al. |
| D797,661 S | 9/2017 | Elder |
| 9,755,489 B2 | 9/2017 | Takemoto et al. |
| 9,755,490 B2 | 9/2017 | Inuzuka |
| D800,650 S | 10/2017 | Itoh et al. |
| D801,919 S | 11/2017 | Elder |
| 9,831,729 B2 | 11/2017 | Kim et al. |
| D812,555 S | 3/2018 | Schoch |
| D818,948 S | 5/2018 | Waldron |
| D819,562 S | 6/2018 | Waldron |
| D826,150 S | 8/2018 | Cayon |
| D844,558 S | 4/2019 | Taniguchi et al. |
| D849,681 S | 5/2019 | Howell |
| D884,600 S | 5/2020 | Zhou |
| D884,601 S | 5/2020 | Zhou |
| D887,969 S | 6/2020 | Howell |
| D890,692 S | 7/2020 | Elder |
| D894,120 S | 8/2020 | Timm |
| D898,662 S | 10/2020 | Waldron |
| D911,931 S | 3/2021 | Li et al. |
| D912,615 S | 3/2021 | Li et al. |
| D919,560 S | 5/2021 | Taniguchi et al. |
| 2002/0117923 A1 | 8/2002 | Takei |
| 2002/0175583 A1 | 11/2002 | Kikuchi et al. |
| 2004/0018419 A1* | 1/2004 | Sugimoto ............... B60L 58/10 429/61 |
| 2005/0099155 A1 | 5/2005 | Okuda et al. |
| 2005/0225192 A1 | 10/2005 | Kloepzig et al. |
| 2005/0248320 A1 | 11/2005 | Denning |
| 2006/0103335 A1 | 5/2006 | Kolehmainen et al. |
| 2006/0279162 A1 | 12/2006 | Achor et al. |
| 2007/0057589 A1 | 3/2007 | Tatematsu et al. |
| 2007/0159021 A1 | 7/2007 | Horst |
| 2007/0193761 A1 | 8/2007 | Brotto |
| 2008/0258573 A1 | 10/2008 | Kamiya |
| 2009/0140593 A1 | 6/2009 | Kaiser et al. |
| 2010/0085020 A1 | 4/2010 | Suzuki et al. |
| 2010/0117475 A1 | 5/2010 | Leonardi et al. |
| 2010/0218386 A1 | 9/2010 | Ro kamp et al. |
| 2010/0218966 A1 | 9/2010 | Liebhard et al. |
| 2011/0156521 A1 | 6/2011 | Nagashima et al. |
| 2011/0163701 A1 | 7/2011 | Carrier et al. |
| 2012/0038236 A1 | 2/2012 | Tajima et al. |
| 2012/0200186 A1 | 8/2012 | Sano et al. |
| 2013/0043757 A1 | 2/2013 | Kagami et al. |
| 2013/0057294 A1 | 3/2013 | Mizoguchi et al. |
| 2013/0106227 A1 | 5/2013 | Aoyama |
| 2013/0119810 A1 | 5/2013 | Aoyama |
| 2013/0187504 A1 | 7/2013 | Tanaka |
| 2014/0028226 A1 | 1/2014 | Mergener et al. |
| 2014/0062244 A1 | 3/2014 | Sano et al. |
| 2014/0091664 A1 | 4/2014 | Aoyama |
| 2014/0111050 A1 | 4/2014 | Chamberlin et al. |
| 2014/0131059 A1 | 5/2014 | Verbrugge et al. |
| 2014/0147718 A1 | 5/2014 | Furui et al. |
| 2014/0152139 A1 | 6/2014 | Huang et al. |
| 2014/0283373 A1 | 9/2014 | Melfi et al. |
| 2014/0285050 A1 | 9/2014 | Melfi et al. |
| 2014/0292132 A1 | 10/2014 | Kazmin et al. |
| 2014/0361645 A1 | 12/2014 | Beyerl |
| 2015/0091406 A1 | 4/2015 | Tajima et al. |
| 2015/0130317 A1 | 5/2015 | Hung et al. |
| 2015/0171684 A1 | 6/2015 | McClelland et al. |
| 2015/0229172 A1 | 8/2015 | Kashihara et al. |
| 2015/0256117 A1 | 9/2015 | Suzuki et al. |
| 2016/0036089 A1 | 2/2016 | Lutz et al. |
| 2016/0056672 A1 | 2/2016 | Yuan et al. |
| 2016/0111984 A1 | 4/2016 | Koizumi et al. |
| 2016/0149463 A1 | 5/2016 | Smith et al. |
| 2016/0149467 A1 | 5/2016 | Smith et al. |
| 2016/0172912 A1 | 6/2016 | Nigo et al. |
| 2016/0231382 A1* | 8/2016 | Hirose ............... H02J 7/0068 |
| 2016/0248061 A1 | 8/2016 | Brambrink et al. |
| 2016/0276886 A1 | 9/2016 | Baba et al. |
| 2016/0285330 A1 | 9/2016 | Mukai et al. |
| 2016/0344274 A1 | 11/2016 | Jurkovic et al. |
| 2017/0015347 A1 | 1/2017 | Asao et al. |
| 2017/0040854 A1 | 2/2017 | Saint-Michel |
| 2017/0063211 A1 | 3/2017 | Mochida et al. |
| 2017/0070111 A1 | 3/2017 | Kanda et al. |
| 2017/0104375 A1 | 4/2017 | Kim et al. |
| 2017/0104376 A1 | 4/2017 | Nakagawa et al. |
| 2017/0106521 A1 | 4/2017 | Kelleher et al. |
| 2017/0144693 A1 | 5/2017 | Okubo |
| 2017/0170696 A1 | 6/2017 | Ogawa et al. |
| 2017/0302117 A1 | 10/2017 | Fukumoto et al. |
| 2017/0366053 A1 | 12/2017 | Ash |
| 2018/0076676 A1 | 3/2018 | Chen et al. |
| 2019/0074682 A1 | 3/2019 | Suda et al. |

FOREIGN PATENT DOCUMENTS

| | | |
|---|---|---|
| CN | 200983519 Y | 11/2007 |
| CN | 100392946 C | 6/2008 |
| CN | 201130876 Y | 10/2008 |
| CN | 100481678 C | 4/2009 |
| CN | 101436793 A | 5/2009 |
| CN | 101917076 A | 12/2010 |
| CN | 101295891 B | 2/2012 |
| CN | 202142925 U | 2/2012 |
| CN | 202142926 U | 2/2012 |
| CN | 202145610 U | 2/2012 |
| CN | 102420475 A | 4/2012 |
| CN | 202260714 U | 5/2012 |
| CN | 101447705 B | 11/2012 |
| CN | 103061944 A | 4/2013 |
| CN | 103078465 A | 5/2013 |
| CN | 202918085 U | 5/2013 |
| CN | 101741199 B | 6/2013 |
| CN | 103267053 A | 8/2013 |
| CN | 203301332 U | 11/2013 |
| CN | 203312944 U | 11/2013 |
| CN | 103580327 A | 2/2014 |
| CN | 102916512 B | 11/2014 |
| CN | 104638864 A | 5/2015 |

(56) References Cited

FOREIGN PATENT DOCUMENTS

| | | |
|---|---|---|
| CN | 104658748 A | 5/2015 |
| CN | 104882978 A | 9/2015 |
| CN | 105048671 A | 11/2015 |
| CN | 103715799 B | 3/2016 |
| CN | 103715800 B | 3/2016 |
| CN | 103715797 B | 4/2016 |
| CN | 103715798 B | 4/2016 |
| CN | 103715852 B | 4/2016 |
| CN | 103715851 B | 5/2016 |
| CN | 103780038 B | 5/2016 |
| CN | 105811604 A | 7/2016 |
| CN | 104104168 B | 8/2016 |
| CN | 105846627 A | 8/2016 |
| CN | 106026599 A | 10/2016 |
| CN | 106451988 A | 2/2017 |
| CN | 104767338 B | 6/2017 |
| CN | 206542315 U | 10/2017 |
| CN | 206759279 U | 12/2017 |
| DE | 10345417 A1 | 5/2005 |
| DE | 102005047771 A1 | 4/2007 |
| DE | 102008044127 A1 | 6/2009 |
| DE | 102013205928 A1 | 10/2014 |
| EP | 26110022 A2 | 7/2013 |
| JP | 2005287240 A | 10/2005 |
| JP | 2007135339 | 5/2007 |
| WO | 2012059258 A1 | 1/1997 |
| WO | 2006095887 A1 | 9/2006 |
| WO | 2012047118 A1 | 4/2012 |
| WO | 20131784362 A2 | 12/2013 |
| WO | 2014090050 A1 | 6/2014 |
| WO | 2014104824 A1 | 7/2014 |
| WO | 2015171486 A1 | 11/2015 |
| WO | 2015179318 A1 | 11/2015 |
| WO | 2017012765 A1 | 1/2017 |
| WO | 2017051522 A1 | 3/2017 |
| WO | 2017171037 A1 | 10/2017 |
| WO | 2017177740 A1 | 10/2017 |

OTHER PUBLICATIONS

Patent Cooperation Treaty Third Party Observation Report for Application No. PCT/US2018/043749 dated Nov. 14, 2019 (9 pages).
Australian Patent Office Examination Report No. 1 for Application No. 2018306290 dated Jul. 22, 2020 (6 pages).
Extended European Search Report for Application No. 18837466.4 dated Jun. 15, 2021 (12 pages).
Chinese Patent Office Action for Application No. 201880062089.0 dated May 6, 2022 (23 pages including statement of relevance).
European Patent Office Action for Application No. 18751952.5 dated Jul. 5, 2022 (6 pages).

* cited by examiner

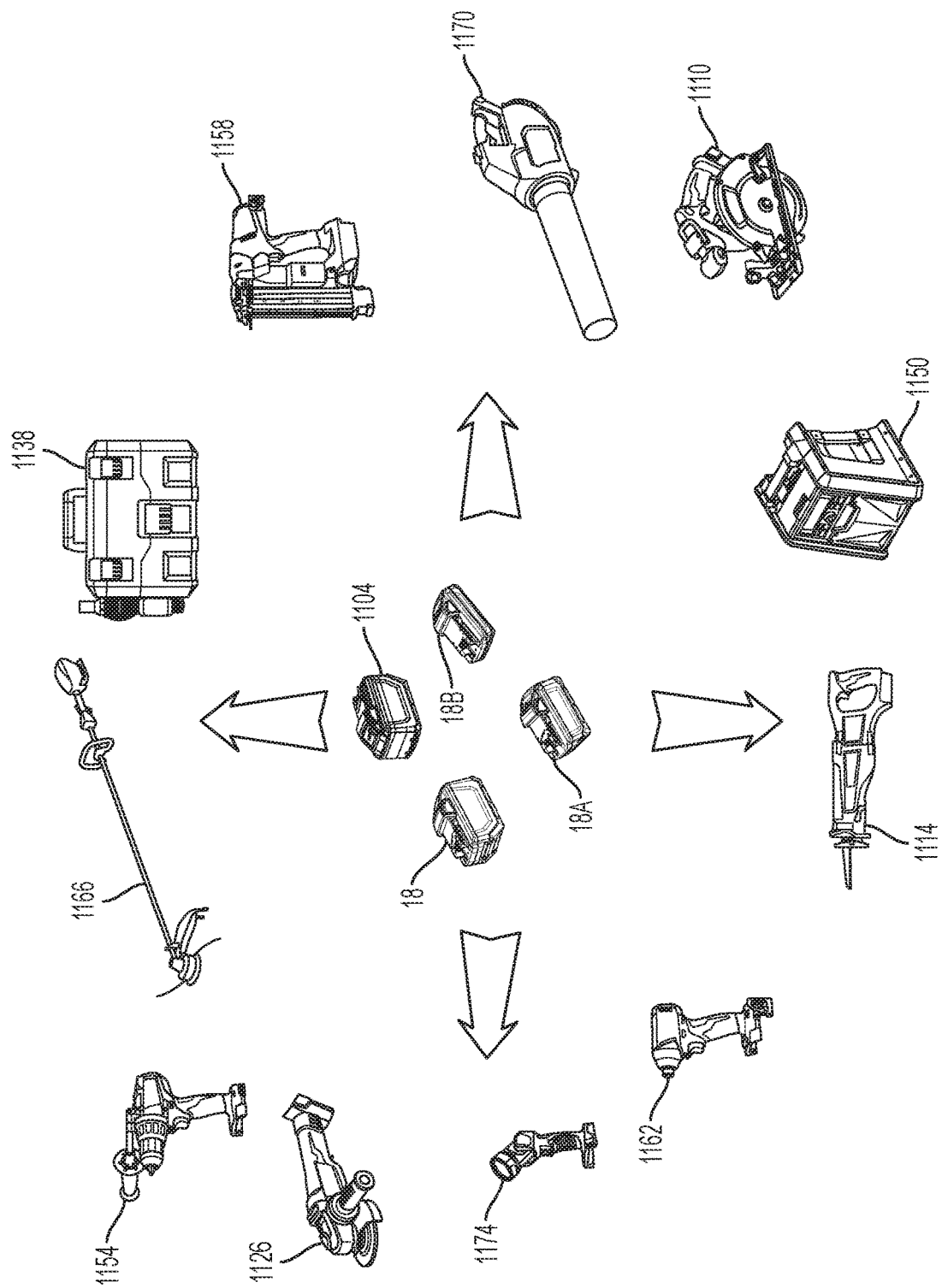

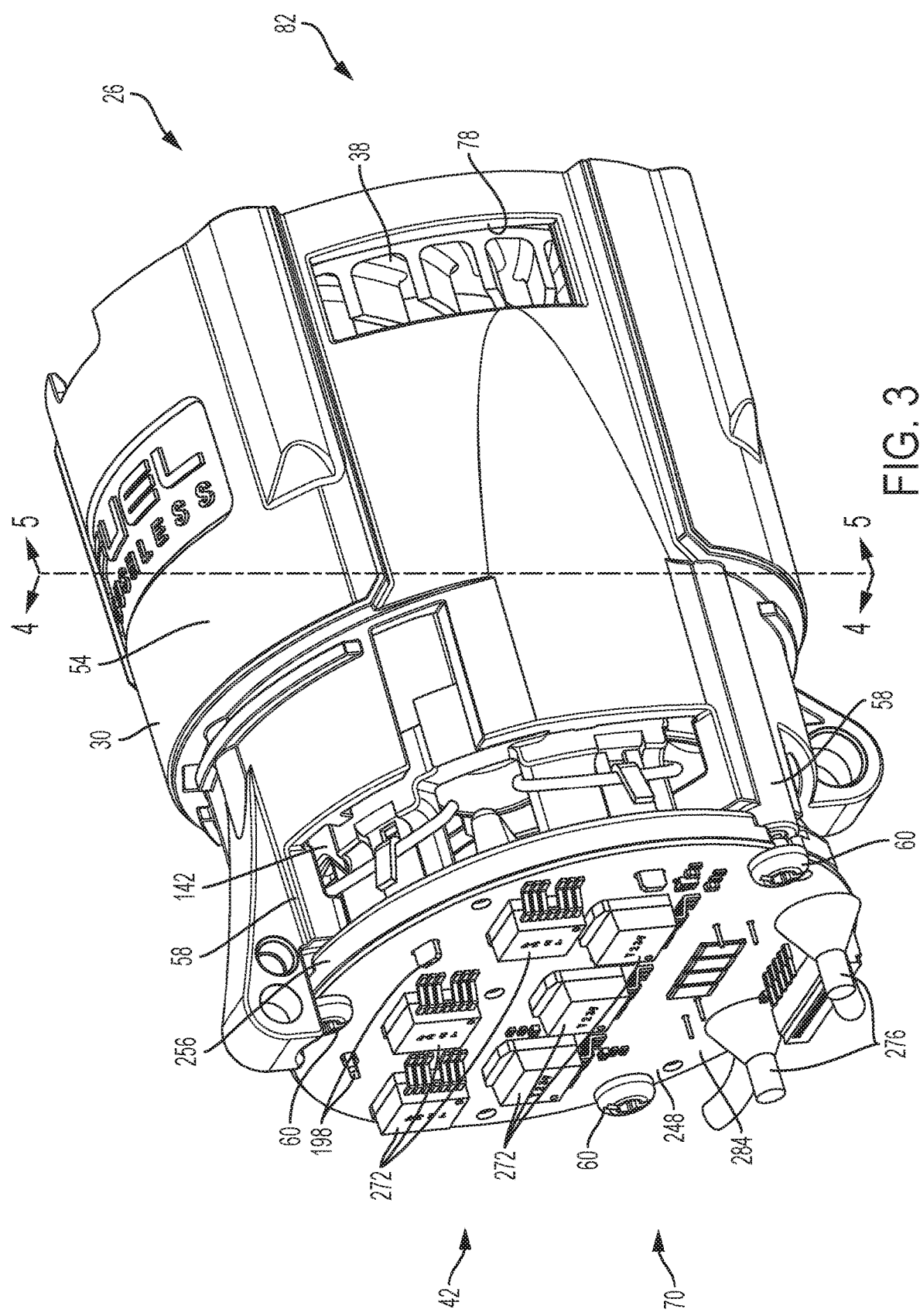

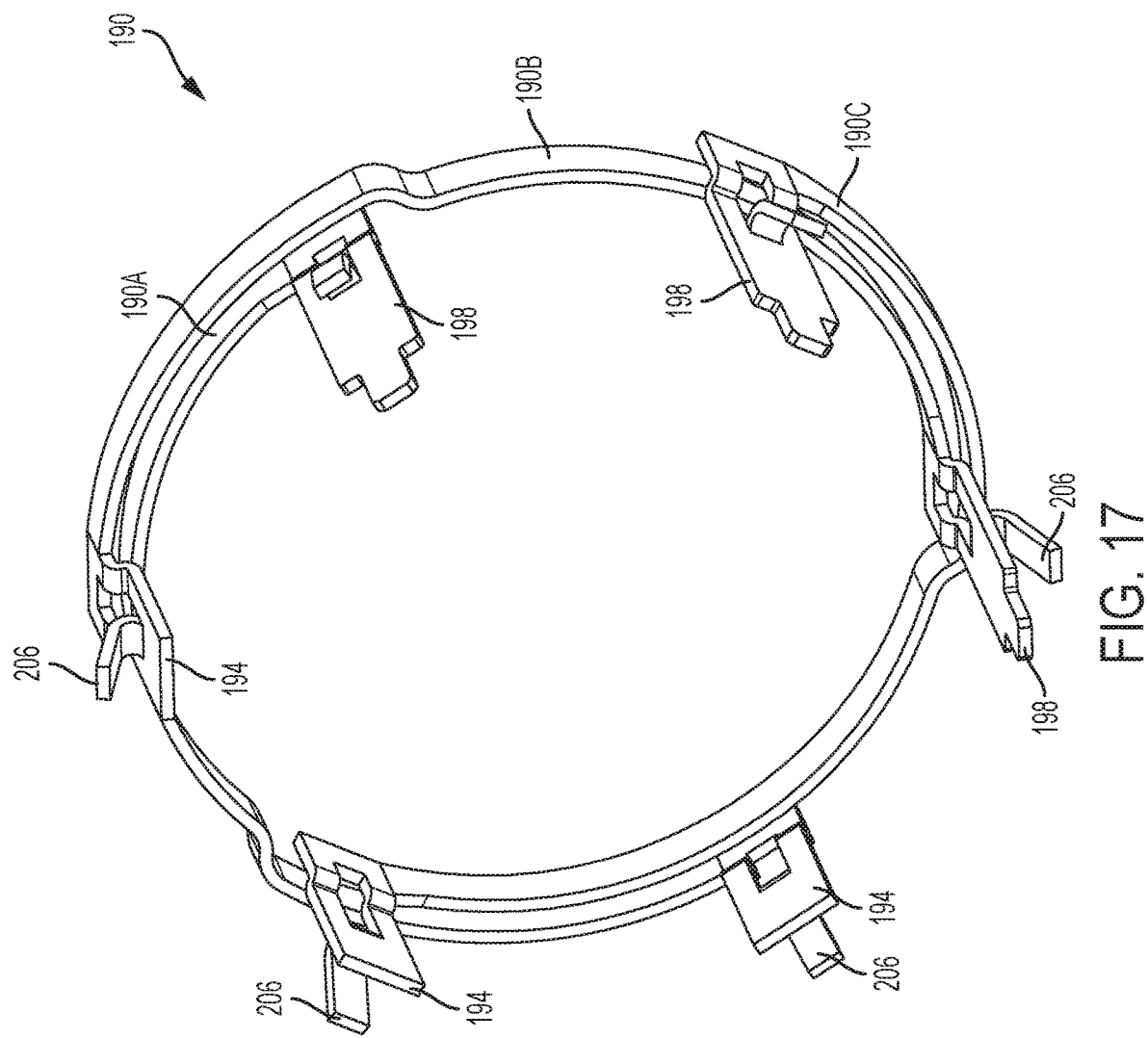

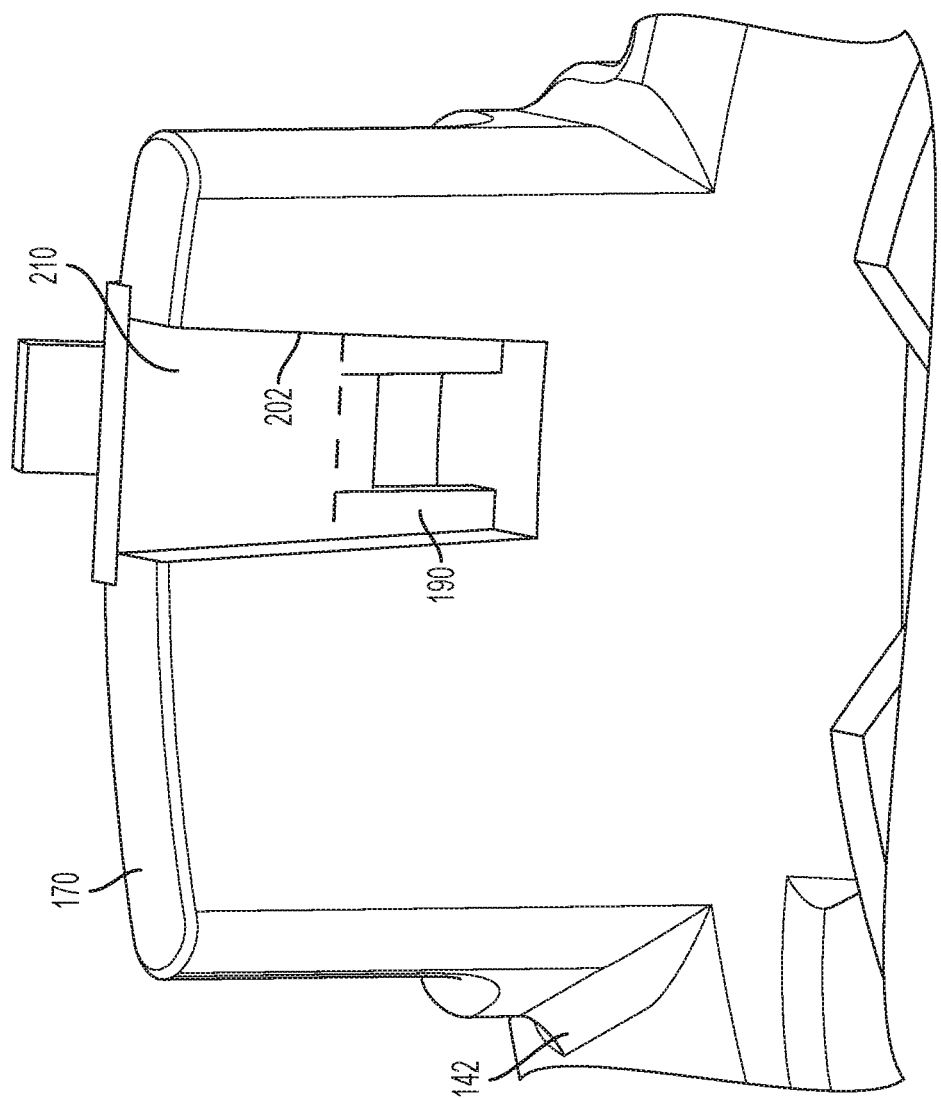

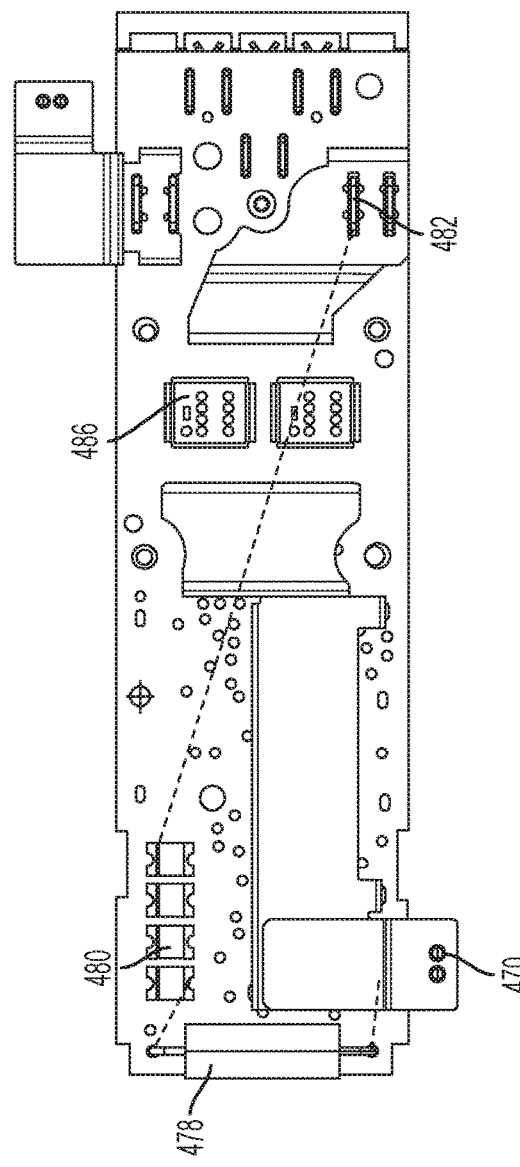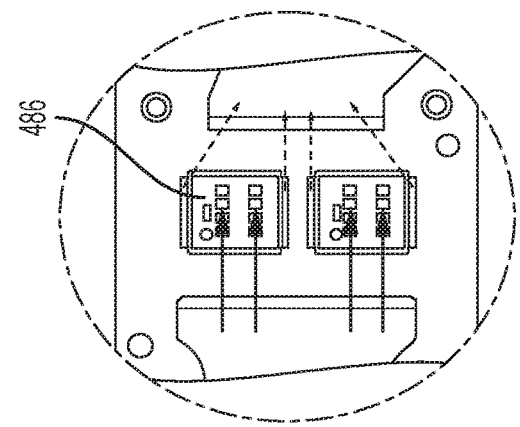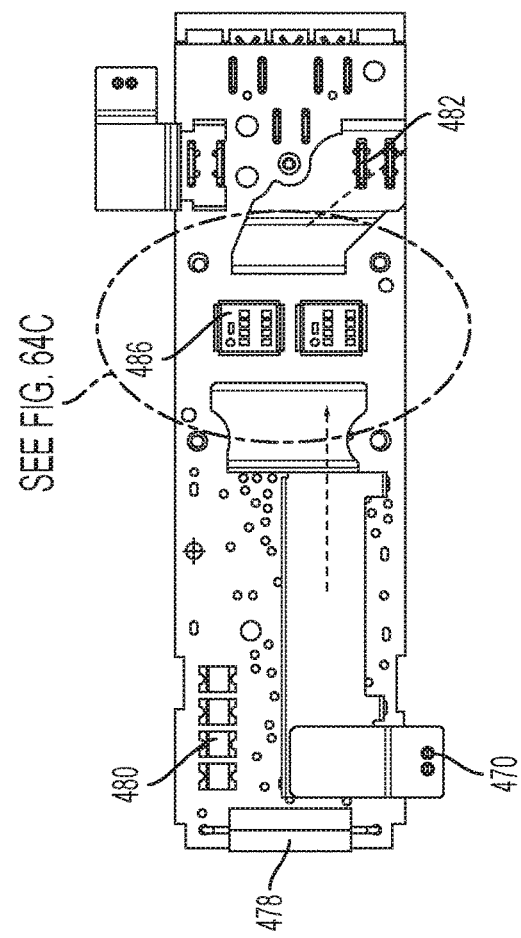

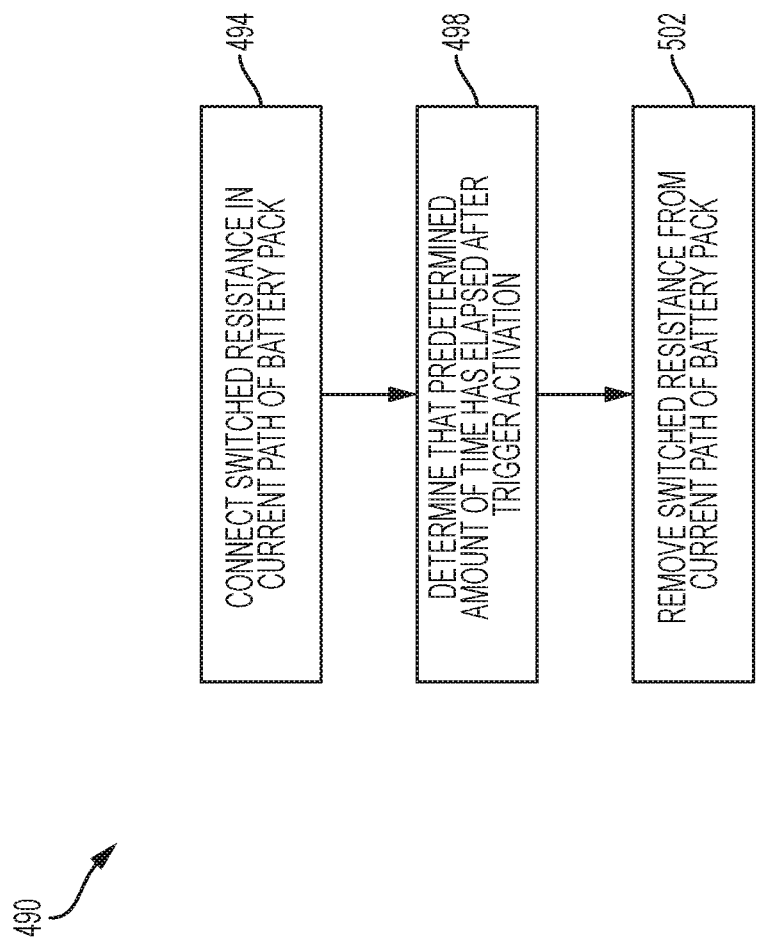

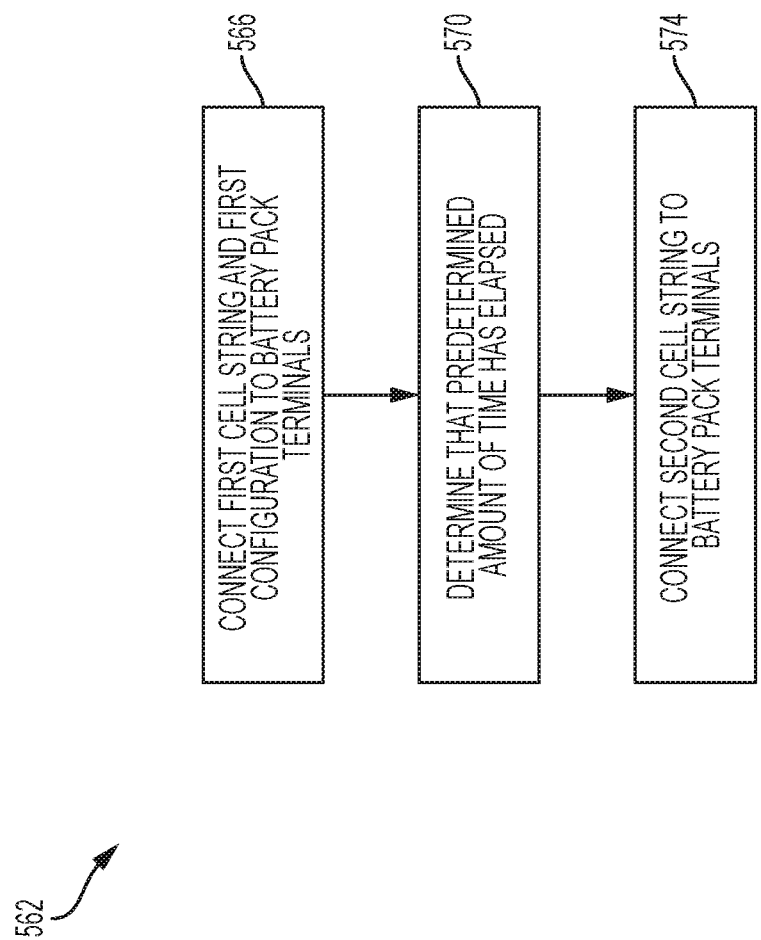

HIGH POWER BATTERY-POWERED SYSTEM

RELATED APPLICATIONS

This application is a continuation of International Application No. PCT/US2018/043749 filed Jul. 25, 2018, which claims priority to U.S. Provisional Patent Application No. 62/570,828 filed Oct. 11, 2017 and U.S. Provisional Patent Application No. 62/536,807 filed Jul. 25, 2017, the entire contents of all of which are hereby incorporated by reference.

FIELD

The present invention relates to battery-powered devices and, more particularly to high power batteries and such devices.

SUMMARY

A high-powered electrical combination is schematically illustrated in FIG. 1A. The combination generally includes a battery power source, an electrical device including a load (e.g., a motor, as illustrated), electrical interconnections between the power source and the load, and electronics operable to control, for example, discharge of the power source, operation of the load, etc.

The combination is incorporated into a motorized device (e.g., power tools, outdoor tools, other motorized devices, etc.) or a non-motorized device having an associated output mechanism powered by the load (e.g., a saw blade, a bit, a grinding wheel, a power supply, a lighting device, etc.). At least some of the devices incorporating the combination are hand-held devices (e.g., a device supportable by a user during operation), and, accordingly, the combination must fit within limitations (e.g., weight, volume/package size, etc.) of a hand-held device.

In the illustrated construction, the battery power source has a nominal voltage of up to about 20 volts (V) (e.g., about 18 V to about 20 V). Also, the combination is operable to output high power (e.g., a peak power of 1800 watts (W) to 2400 W or more (2.4 horsepower (hp) to 3.0 hp or more)). In order to achieve this peak power, a high current (e.g., 100 amps (A) or more) is discharged from the power source, through the interconnections, through components of the electronics and to the load. Again, this high power output is achieved within limitations of a hand-held device.

In contrast, existing combinations for hand-held devices, with a nominal voltage of 18 V to 20 V, are operable to output only between about 1000 W to about 1400 W at a current of between about 50 A to 70 A. There are many challenges evolving from performance of the existing technology to that of the present invention.

One challenge is increasing the deliverable power of the battery power source. Such an increase can be obtained by increasing the number of cells in the battery, in series and/or in parallel. An increase in the cell form factor, with associated reduced impedance, will also increase the available power. However, each of these solutions results in an increase in the size and weight of the battery power source, contrary to the limitations of the hand-held devices.

Another challenge is effectively exploiting at the load (e.g., the motor) the power provided by the battery power source. An increase in motor size (e.g., diameter) will result in increased power output. Such an increase again conflicts with the limitations of hand-held devices. To maximize increased deliverable power from the battery power source to the load, impedance and losses in the system must be reduced.

Increased deliverable power from the battery power source and/or increased power output from the load require additional electronics to control such discharge, operation, etc. Further, the increased power from an 18 V to 20 V battery power source requires an increased current which generates heat. Operation must be controlled and/or cooling structure provided to manage the increased current and heat.

As mentioned above, existing devices operate at a peak current of 50 A to 70 A. Again, to achieve the high output power in the present combination with a 18 V to 20 V battery power source, the peak current is at least about 100 A. Existing interconnections (e.g., terminals, switches, conductors, etc.) are not designed to handle the increased current/heat. Operation must be controlled and/or cooling structure provided to manage the increased current and heat.

However, overcoming these challenges raises others. For example, increased power from the power source and output by the load could possibly be achieved by adding more and/or larger components—more and larger battery cells, a larger motor, thicker terminals, bigger switches, etc. As discussed above, each of these additions, however, conflicts with the limitations imposed by the device being hand-held by making the combination heavier, larger, etc.

As another example, the high power battery power source may be used with existing electrical devices, and these devices are not constructed to handle the available high power from the power source. As mentioned above, to handle with increased current, improvements have been made to the interconnections and to the electronics. The existing devices do not include such improved components and could be damaged by the increased power, current, heat, etc.

As yet another example, in existing electrical devices, due to relatively-higher impedance in the system (battery, interconnections, electronics, motor), the stall current of the motor was lower than the maximum current of components (e.g., switches, field-effect transistors (FETs), etc.) in the system. Accordingly, in existing devices, the motor would stall before the components were subjected to their maximum current. With the reduced impedance in the present combination, the stall current now exceeds these maximum current values. In operation, the current can now exceed the component current thresholds before stalling.

In one independent embodiment, an electrical combination may generally include an electrical device, a battery pack and a controller. The electrical device may generally include a device housing, a load supported by the device housing, the load being operable to output at least about 1800 watts (W) (about 2.4 horsepower (hp)), and a device terminal electrically connected to the load. The battery pack may include a pack housing, battery cells supported by the pack housing, the battery cells being electrically connected and having a nominal voltage of up to about 20 volts, and a pack terminal electrically connectable to the device terminal to transfer current between the battery pack and the electrical device. The controller may be operable to control the transfer of current. The load may be operable to output at least about 2200 watts (W) (about 3 horsepower (hp)).

In some constructions, the load includes a motor including an output shaft, the motor being operable to output at least about 1800 watts (W) (about 2.4 horsepower (hp)). In some constructions, the device includes a power tool, and the motor is operable to drive a tool member. The motor may include a brushless direct current motor. The motor may include a stator having a nominal outer diameter of between about 60 millimeters (mm) and about 80 mm (e.g., about 70 mm).

In some constructions, the battery cells each have a diameter between about 18 mm and about 21 mm and a length between about 65 mm and about 71 mm (e.g., a diameter of about 21 mm and a length of about 71 mm). The battery pack may include up to 15 battery cells, and the battery cells may be arranged in sets of battery cells (e.g., five cells) connected in series, the sets being connected in parallel.

The battery cells may be operable to output an operating discharge current of between about 80 Amps (A) and about 110 A and to output a peak discharge current up to about 200 A. The battery cells may have a capacity of between about 3.0 Amp-hours (Ah) and 5.0 Ah.

In some constructions, the combination may also include a power circuit electrically connected between the battery cells and the motor, the power circuit including semi-conducting switches operable to apply current to the load. The load may include a brushless direct current motor, the switches being operable to apply current across the windings. A heat sink may be in heat transfer relationship with the switches and have a thermal capacity of at least about 63 joule per Celsius (J/C). The heat sink may be intersected by a rotational axis of the rotor. A combined length of the motor and the heat sink is up to about 84 mm.

In some constructions, the device may include a hand-held power tool. The pack housing may connectable to and supportable by the device housing such that the battery pack is supportable by the hand-held power tool.

In the combination, control electronics including the controller may have a volume of up to about 15,000 cubic millimeters (mm$^3$) (e.g., about 8750 mm$^3$ (dimensions of about 50 mm by about 35 mm by about 5 mm)), the motor may have a volume of up to about 92,000 mm$^3$, and the battery pack may have a volume of up to about 1,534,500 mm$^3$. The control electronics may have a weight of up to about 19.6 grams (g), the power electronics may have a weight of up to about 94.1 grams (g), the motor may have a weight of up to about 1.89 lbs., and the battery pack may have a weight of up to about 3.5 lbs.

In another independent embodiment, a motorized device (e.g., a power tool) system may generally include a power tool, a battery pack, and a controller. The power tool may include a tool housing, a motor supported by the tool housing, the motor including an output shaft operable to drive a tool element, the motor being operable to output at least about 1800 watts (W) (2.4 horsepower (hp)), and a tool terminal electrically connected to the load. The battery pack may include a pack housing, battery cells supported by the pack housing, the battery cells being electrically connected and having a nominal voltage of up to about 20 volts, and a pack terminal electrically connectable to the tool terminal to transfer current between the battery pack and the power tool. The controller may be operable to control the transfer of current.

In yet another independent embodiment, a method of operating an electric motor may be provided. The method may generally include supplying a first voltage signal at a first duty cycle to the motor; determining whether a current to be supplied to the motor exceeds a threshold; and, if the current to be supplied exceeds a threshold, supplying a second voltage signal at a second duty cycle to the motor, the second duty cycle being less than the first duty cycle.

The method may also include, after supplying a second voltage signal at a second duty cycle to the motor, determining whether a current to be supplied to the motor exceeds the threshold; and, if the current to be supplied exceeds the threshold, supplying a third voltage signal at a third duty cycle to the motor, the third duty cycle being less than the second duty cycle. The method may also include, after supplying a second voltage signal at a second duty cycle to the motor, determining whether a current to be supplied to the motor exceeds the threshold; and, if the current to be supplied does not exceed the threshold, supplying the first voltage signal at the first duty cycle to the motor. Accordingly, the method may continuously vary the duty cycle to provide maximum desired output current.

Supplying includes supplying a voltage signal through a switch, and wherein the current threshold is associated with the switch. Supplying a voltage signal through a switch includes supplying a voltage signal through a field-effect transistor (FET), the current threshold being associated with the FET.

In a further independent embodiment, a method of operating a motor may be provided. A FET may be operable to supply current to the motor, and a relay may be operable to supply current to the FET. The method may generally include, in response to a signal to operate the motor, determining whether the FET is operational; and, if the FET is operational, operating the relay to supply current through the FET to the motor. In some constructions, a second FET may operable to supply current to the motor, and the method may further include, before operating the relay, in response to the signal to operate the motor, determining whether the second FET is operational.

The method may further include, if the FET is not operational, disabling operation of the motor. Disabling may include temporarily disabling operation of the motor. The method may include, after temporarily disabling, determining whether the FET is operational; if the FET is operational after temporarily disabling the motor, operating the relay to supply current through the FET to the motor; and/or, if the FET is not operational after temporarily disabling the motor, permanently disabling the motor.

Determining may include turning on the FET. Determining may include supplying a test signal to the FET, and monitoring an output of the FET. The signal may include a trigger signal.

In another independent aspect, a method of operating an electrical combination may be provided. The electrical combination may include an electrical device and a battery power source, the device including a device terminal, the battery source including a plurality of cells having a voltage and a battery terminal connectable to the device terminal. The method may generally include connecting the plurality of battery cells to the battery terminal across a resistor to supply current to the device, the resistor having a first resistance; determining whether a condition has occurred; and, after the condition occurs, connecting the plurality of battery cells to the battery terminal through a switch, the switch having a second resistance less than the first resistance.

Determining may include determining whether a time period has elapsed. Determining whether a time period has elapsed may include determining whether a start-up time period has elapsed. Connecting through a switch may include shorting the resistor with the switch. Connecting through a switch may include connecting the plurality of battery cells to the battery terminal through a FET.

In yet another independent aspect, a battery pack may generally include a housing; a plurality of cells supported by the housing and having a voltage; a battery terminal; an electrical circuit selectively connecting the plurality of cells to the battery terminal to supply a current to an electrical device, the circuit including a resistor in a first electrical path between the plurality of cells to the battery terminal, the resistor having a first resistance, and a switch in a second electrical path between the plurality of cells to the battery terminal, the switch having a second resistance less than the first resistance; and a controller operable to selectively connect the plurality of cells to the battery terminal across the resistor or through the switch.

The controller may be operable to control the switch to short the resistor. The controller may be operable to close the switch to short the resistor. The controller may be operable to control the switch after a condition occurs. The controller may be operable to control the switch after a time period has elapsed. The controller may be operable to control the switch after a time period after start-up. The switch may include a FET.

In a further independent aspect, an electrical combination may generally include an electrical device, a battery pack, and an electrical circuit. The electrical device may include a device housing, a load supported by the device housing, and a device terminal electrically connected to the load. The battery pack may include a pack housing, battery cells supported by the pack housing, the battery cells being electrically connected, and a pack terminal electrically connectable to the device terminal to transfer current between the battery pack and the electrical device. The electrical circuit is between the battery cells and the load and may include a discharge switch operable to selectively connect the battery cells to the load, an operation switch operable to output an operation signal, a controller operable to determine a condition of the electrical device or the battery pack, and a logic portion operable to receive a first input from the operation switch and a second input from the controller, the logic portion outputting a control signal to the discharge switch based on the first input and the second input. The discharge switch may include an electromechanical relay or a semiconductor based solid state relay.

In another independent aspect, a battery pack may generally include a housing including a support portion connectable to and supportable by an electrical device, the support portion defining a channel operable to receive a projection on the electrical device, the support portion including a plastic material molded to define the channel, and a metal material molded in the plastic material, the metal material defining a C-shaped portion around the channel; a plurality of battery cells supported by the housing; and a battery terminal electrically connected to the plurality of battery cells and connectable to a terminal of the electrical device.

In yet another independent aspect, an electric motor may generally include a stator including a core defining a plurality of teeth, a plurality of coils disposed on respective stator teeth, and an end cap proximate an end of the core, the end cap including a plurality of coil contact plates molded in the end cap and a first terminal and a second terminal separate from and connectable to the contact plates, the contact plates short-circuiting opposite ones of the plurality of coils; and a rotor supported for rotation relative to the stator.

In a further independent aspect, an electric motor assembly may generally include a motor housing; a brushless electric motor supported by the housing; and a printed circuit board (PCB) assembly connected to the housing, the PCB assembly including a heat sink, a power PCB coupled to a first side of the heat sink, and a position sensor PCB coupled to an opposite second side of the heat sink and in facing relationship with the motor. The position sensor PCB may include a plurality of Hall-effect sensors. The motor may include a rotor supporting a magnet, the Hall-effect sensors being operable to sense a position of the magnet.

Other independent aspects of the invention may become apparent by consideration of the detailed description and accompanying drawings.

BRIEF DESCRIPTION OF THE DRAWINGS

FIG. 2B illustrates a system of existing electrical devices operable to be powered by an existing battery pack or the high-power battery assembly of FIGS. 1A-1B.

FIG. 3 is a perspective view of the motor assembly of the electrical combination of FIGS. 1A-1B.

FIG. 17 is a perspective view of the coil contact plates of FIG. 15.

FIG. 18 is an enlarged partial perspective view of a stator end cap and coil contact plate terminal according to an aspect of the invention.

FIGS. 64A-64C illustrate a switched resistance of the battery pack of FIG. 2A.

FIG. 65 is a flowchart of a method of operating the battery pack of FIG. 2A.

FIG. 71 is a flowchart of a method of switching cell strings of the battery pack of FIG. 70.

DETAILED DESCRIPTION

Figure 1A:
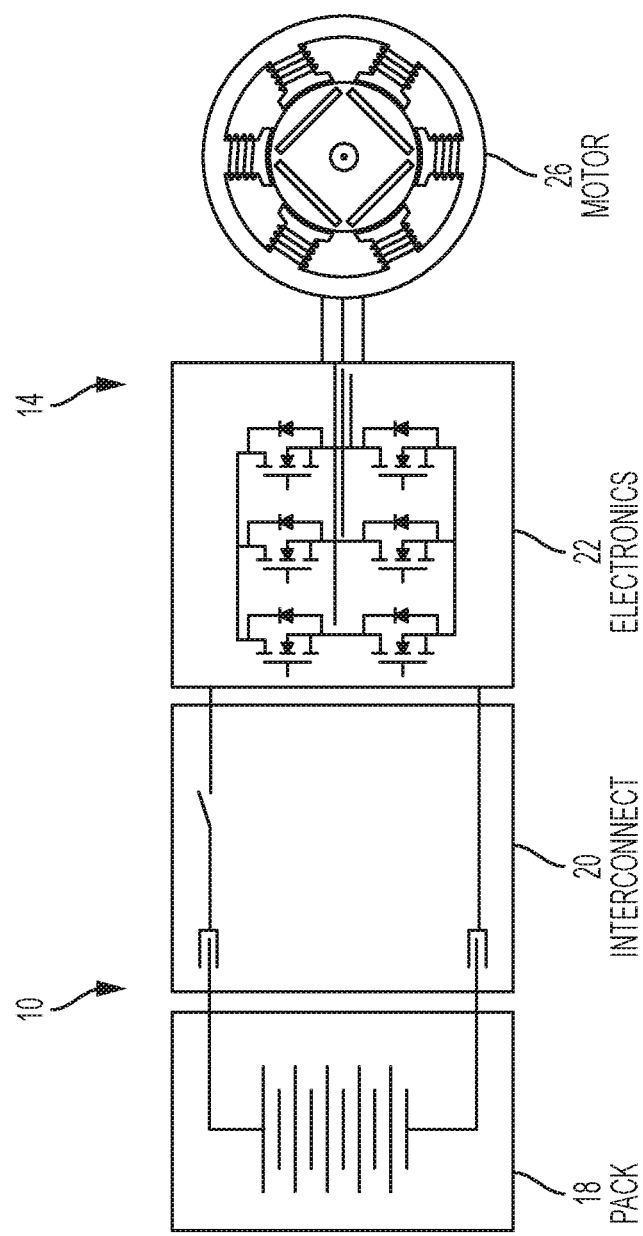
FIG. 1A is a schematic diagram of an electrical combination including a battery assembly, an electronics assembly, and a motor assembly.

Before any independent embodiments of the disclosure are explained in detail, it is to be understood that the disclosure is not limited in its application to the details of construction and the arrangement of components set forth in the following description or illustrated in the accompanying drawings. The disclosure is capable of other independent embodiments and of being practiced or of being carried out in various ways. Also, it is to be understood that the phraseology and terminology used herein are for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Many of the modules and logical structures described are capable of being implemented in software executed by a microprocessor or a similar device or of being implemented in hardware using a variety of components including, for example, application specific integrated circuits ("ASICs"). Terms like "controller" and "module" may include or refer to both hardware and/or software. Capitalized terms conform to common practices and help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

Figure 1B:
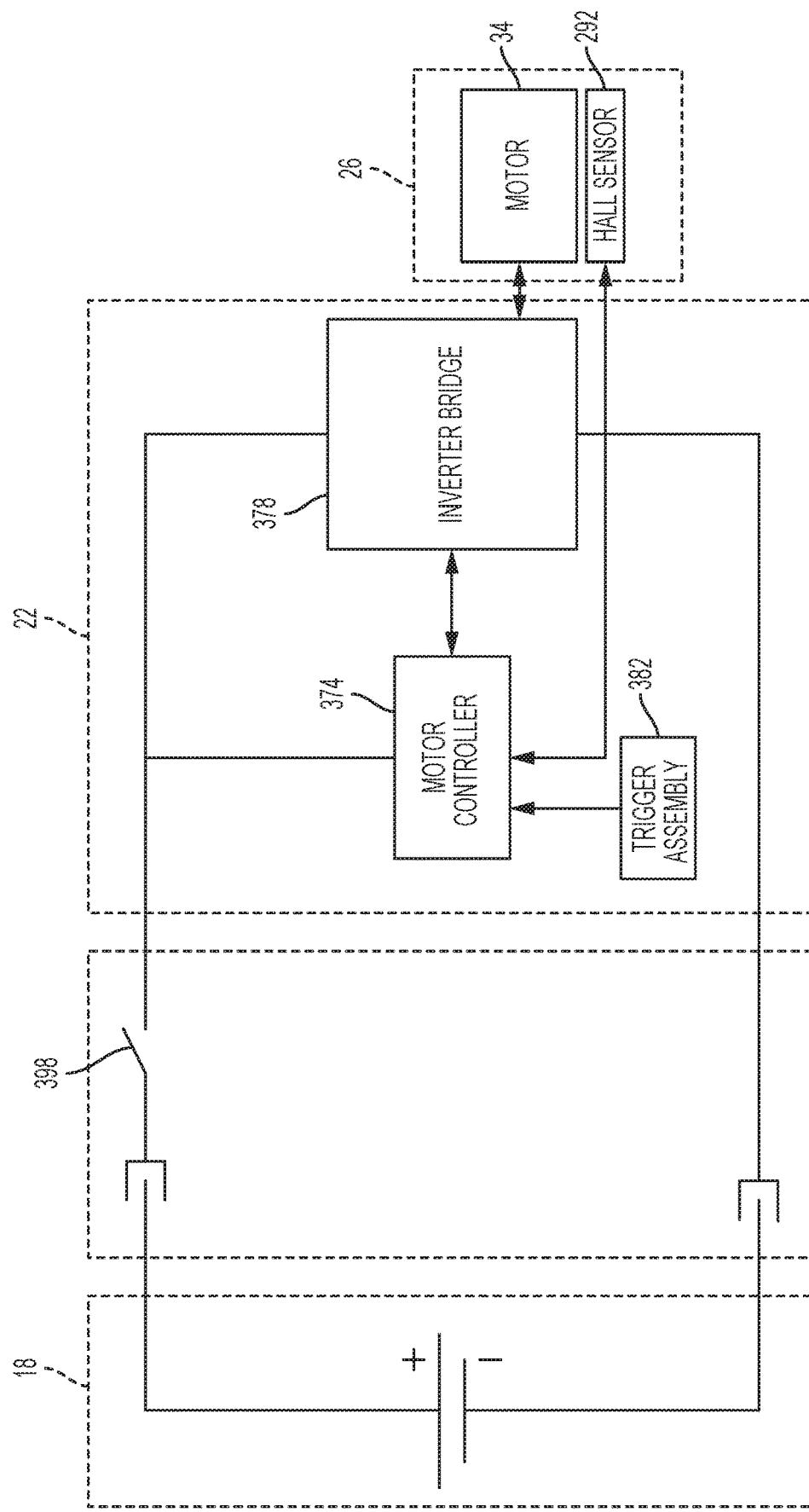
FIG. 1B is a block diagram of the electrical combination of FIG. 1A.

FIGS. 1A-1B illustrate simplified block diagrams of an electrical combination 10. The combination 10 includes a high power DC electrical device (e.g., power tool) system 14 that includes a power source (e.g., a battery assembly 18), interconnects 20 (e.g., terminals, conductors, switches, etc.), an electronic assembly 22 (e.g., controls, switching field-effect transistors (FETs), trigger, etc.), a motor assembly 26. As explained in greater detail below, the high power DC tool system 14 achieves a high power output with a DC power source within the packaging restrictions (e.g., weight, volume, etc.) of a hand-held power tool.

Figure 2A:
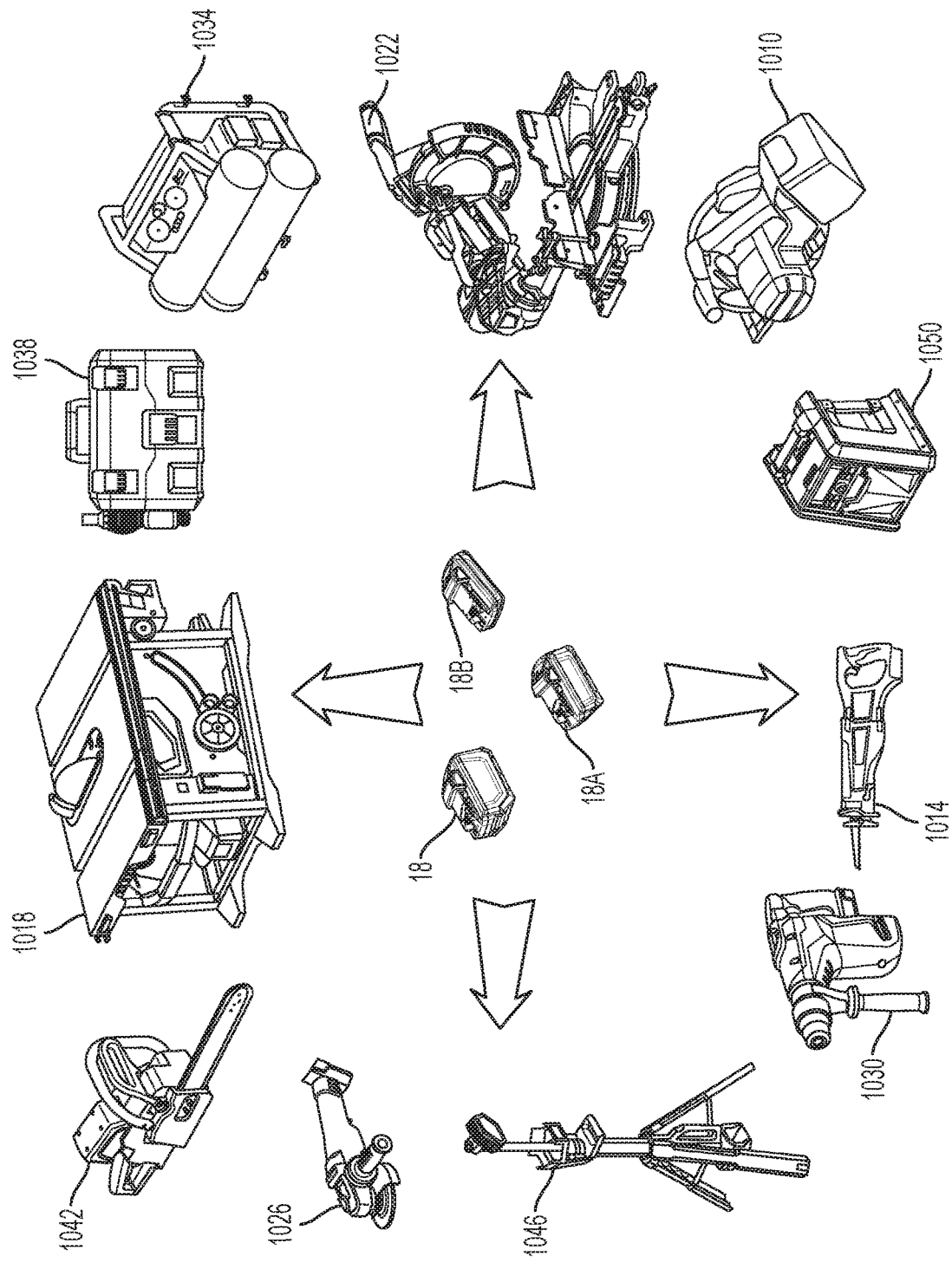
FIG. 2A illustrates a high power electrical system including various high power electrical devices incorporating the high power electrical combination of FIGS. 1A-1B.

FIG. 2A illustrates a high power electrical system 1000 including various high power electrical devices incorporating the high power electrical combination 10. For example, the system 1000 includes motorized power tools (e.g., a circular saw (e.g., a worm drive saw 1010), a reciprocating saw 1014, a table saw 1018, a miter saw 1022, an angle grinder 1026, a SDS Max hammer 1030, a compressor 1034, a vacuum 1038, etc.), outdoor tools (e.g., a chain saw 1042, a string trimmer, a hedge trimmer, a blower, a lawn mower, etc.), other motorized devices (e.g., vehicles, utility carts, etc.), etc. and non-motorized electrical devices (e.g., a power supply, a light 1046, a testing device, an audio device 1050, etc.).

FIG. 2B illustrates a system 1100 of existing electrical devices operable to be powered by an existing battery pack 1104 or the high-power battery assembly 18, 18A, 18B. Likewise, the existing electrical devices include various motorized power tools (e.g., a circular saw 1110, a reciprocating saw 1114, a grinder 1126, a vacuum 1138, a drill 1154, a nailer 1158, an impact driver/wrench 1162, etc.), outdoor tools (e.g., a string trimmer 1166, a hedge trimmer, a blower 1170, etc.), etc. and non-motorized electrical devices (e.g., an audio device 1150, a light 1174, a testing device, etc.).

With reference to FIGS. 3-7, a motor assembly 26 generally includes a motor housing 30, a motor 34 positioned within the motor housing 30, a fan 38, a printed circuit board (PCB) assembly 42. The motor 34 includes a stator 46 and a rotor 50 positioned at least partially within the stator 46. A similar motor is described and illustrated in U.S. Provisional Patent Application No. 62/458,367, filed Feb. 13, 2017, the entire contents of which is hereby incorporated by reference.

With reference to FIGS. 3-7 and 19-22, the motor housing 30 includes a cylindrical portion 54 at least partially housing the motor 34. Mounting bosses 58 are provided along the cylindrical portion 54 through which fasteners 60 extend to interconnect the PCB assembly 42 to the motor housing 26 and through which fasteners 61 extend to interconnect the main housing 26 with the stator 46. With reference to FIG. 6A, the motor housing 30 also includes a hub portion 62 coaxial with the cylindrical portion 54 and axially spaced from the cylindrical portion 54, posts 66 extending axially from a rear end 70 of the cylindrical portion 54, and radially extending spokes 74 interconnecting the hub portion 62 to the post 66. Windows 78 are formed in a front end 82 of the cylindrical portion 54 radially outward from the fan 38.

With reference to FIGS. 5-6A, 7, and 19-22, the cylindrical portion 54 of the motor housing 30 also includes radially inward-extending ribs 86 extending the entire length of the cylindrical portion 54, with each pair of adjacent ribs 86 defining a channel 90 therebetween. When the motor 34 is inserted into the motor housing 30, corresponding ribs 94 on the motor 34 are slidably received within the respective channels 90 defined in the cylindrical portion 54, thereby rotationally orienting the motor 34 relative to the motor housing 30. In addition, the motor housing 30 includes radially inward-extending support ribs 98 extending the entire length of the cylindrical portion 54, which contact and support the stator 46.

With particular reference to FIG. 5-11, the stator 46 includes a plurality of individual stator laminations 102 stacked together to form a stator core 106 (i.e., a stator stack). As mentioned above, the stator 46 includes radially outward extending ribs 94 on an outer circumferential surface 110 extending the entire length of the stator core 106. Adjacent ribs 94 define a concave channel 114, which corresponds to the channel 90 defined by the motor housing 30, through which fasteners 61 extend. In addition, the stator 46 includes recesses 118, the purposes of which is described below, extending parallel with and rotationally offset from the ribs 94.

Figure 12:
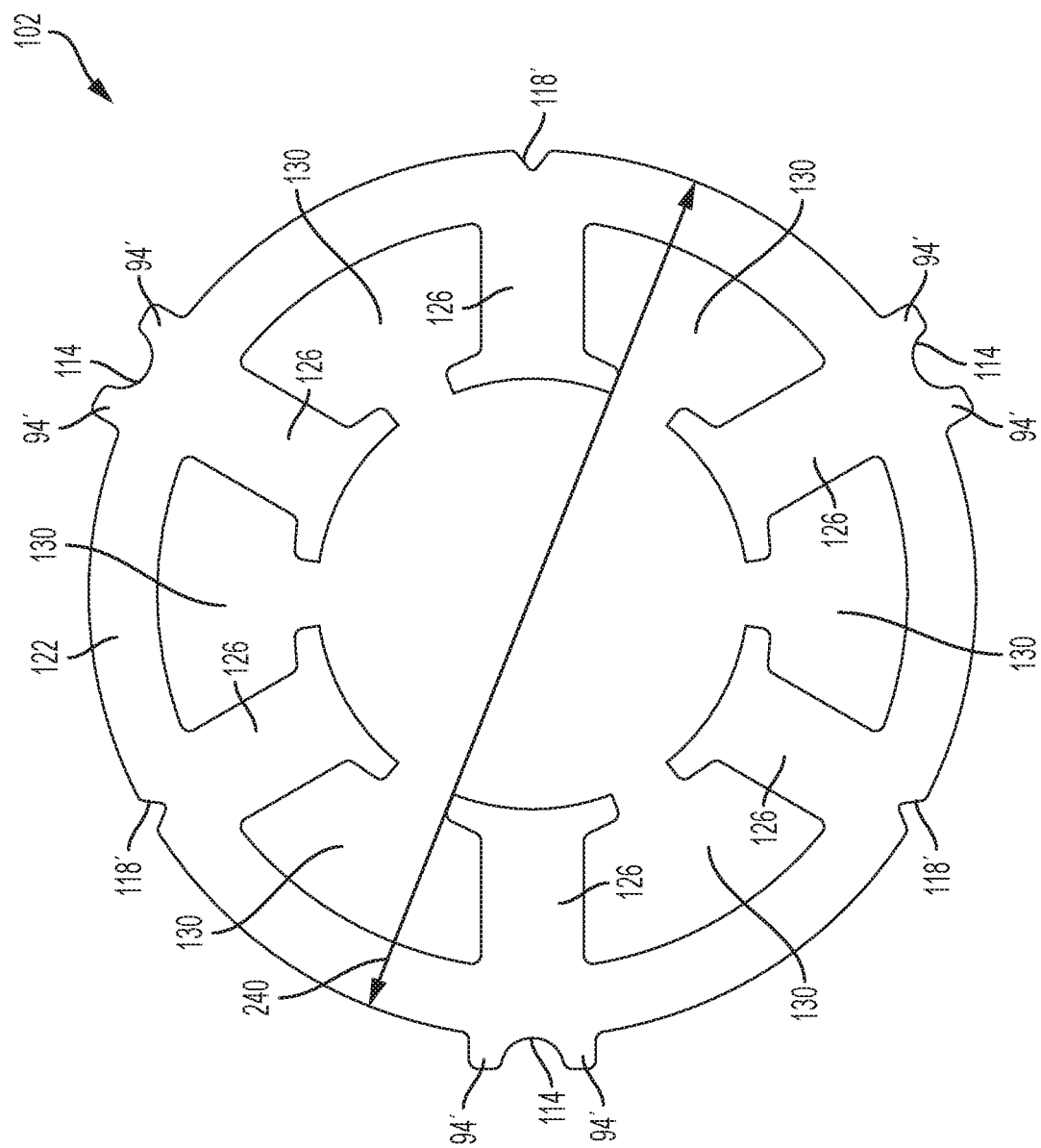
FIG. 12 is a front view of a stator lamination.
Figure 13:
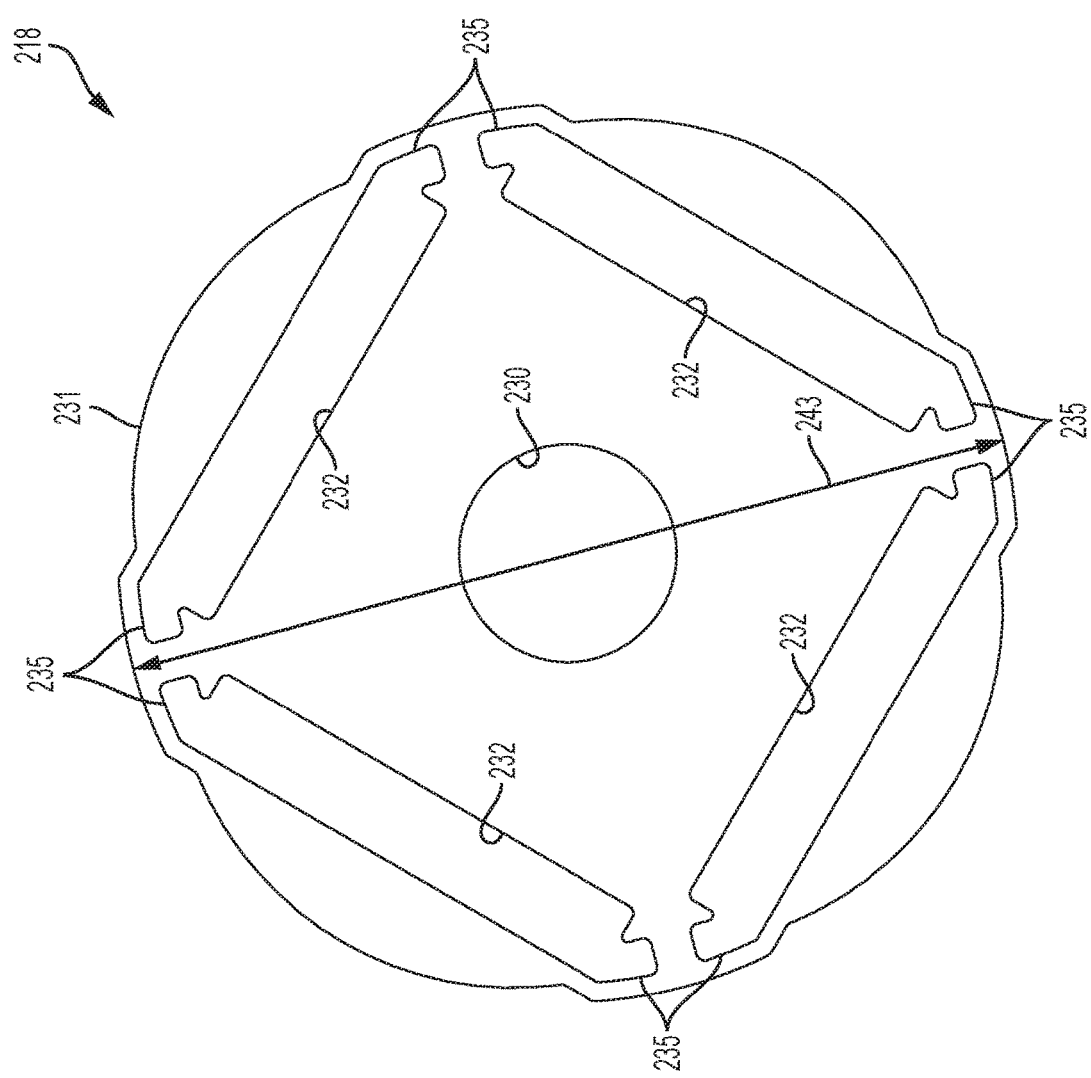
FIG. 13 is a front view of a rotor lamination.
Figure 14:
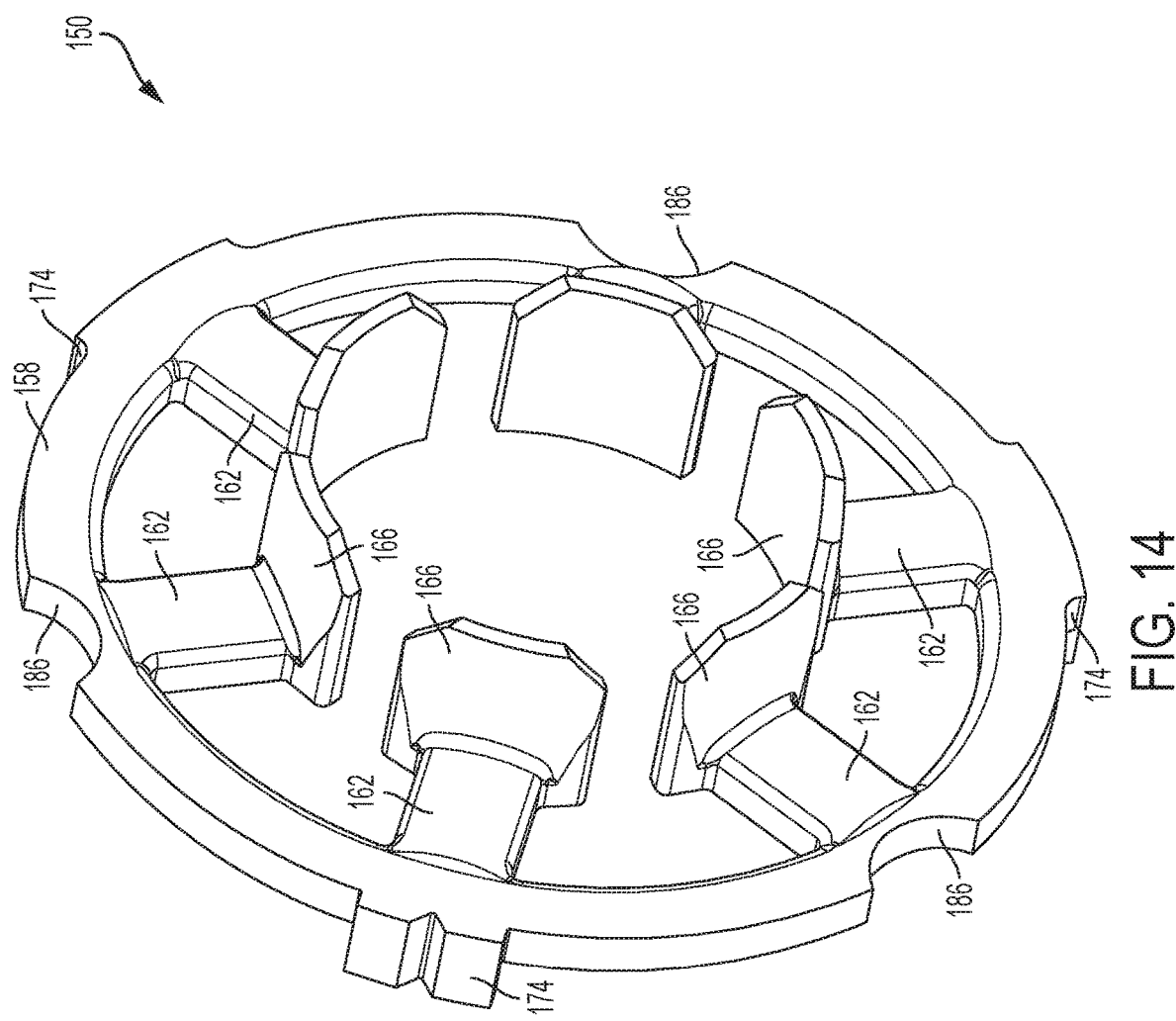
FIG. 14 is a perspective view of a stator end cap.

With reference to FIG. 12, each stator lamination 102 includes a yoke 122 (a.k.a., a rim, a back iron, etc.) having multiple radially outwardly-extending protrusions 94' (FIG. 12) collectively defining the ribs 94 when the laminations 102 are stacked together. Each stator lamination 102 also includes recesses 118' defined on the outer surface of the yoke 122 collectively defining the recesses 118 when the laminations 102 are stacked together. The stator 46 also includes inwardly extending stator teeth 126 and slots 130 defined between each pair of adjacent stator teeth 126 when the laminations 102 are stacked together. In the illustrated embodiment, the stator laminations 102 include six stator teeth 126, defining six stator slots 130.

The stator 46 further includes stator windings 134 at least partially positioned within the slots 130. In the illustrated embodiment, the stator windings 134 include six coils 134A-134F connected in a three phase, parallel delta configuration. In alternative embodiments (not shown), the coils 134A-134F may be connected in alternative configurations (e.g., series, delta, etc.). Insulating members 138 (FIG. 10) are provided within each slot 130 to insulate that stator teeth 126 from the stator windings 134. The stator windings 134 are wound around the stator core 106 with a continuous (i.e., single wire) precision winding process that results in filling the slots 130 to a value of at least 30%. In some embodiments, the slot fill may be at least 36%.

In some embodiments (i.e., a 45 millimeter (mm) stator stack length 242), the stator windings 134 have a wire gauge of approximately 1.5 mm. In some embodiments, the delta, line-line resistance of the stator windings 134 is within a range from approximately 3.82 m$\Omega$ to approximately 5.18 m$\Omega$. In other embodiments, the delta, line-line resistance of the stator windings 134 is approximately 4.5 m$\Omega$. The parallel resistance of the stator windings 134 (i.e., the resistance of two coils in parallel) is within a range of approximately 6.3 m$\Omega$ to approximately 7.7 m$\Omega$. In some embodiments, the parallel resistance of the stator windings 134 is approximately 7.0 m$\Omega$.

The stator 46 includes a rear end cap 142 adjacent a rear end 146 of the stator core 106 and a front end cap 150 adjacent a front end 154. With reference to FIGS. 8-10 and 14-15, each end cap 142, 150 includes rim portions 158 and end cap teeth 162 extending radially inward from the rim portions 158. The end cap teeth 162 include projections 166 that support the respective stator coil windings 134. The stator windings 134 are also guided between adjacent stator teeth 126 by flanges 170 formed on the rear end cap 142.

Each end cap 142, 150 additionally includes tabs 174 extending transversely from the rim portions 158, with each tab 174 including a radially inwardly extending projection 178 received in the corresponding recesses 118 formed on the stator core 106 to rotationally align the each end cap 142, 150 relative to the stator core 106. The rear end cap 142 includes concave recesses 182 aligned with the channels 114 in the stator core 106 through which the fasteners 61 extend. Likewise, the front end cap 150 includes concave recesses 186 aligned with the channels 114 in the stator core 106.

Figure 15:
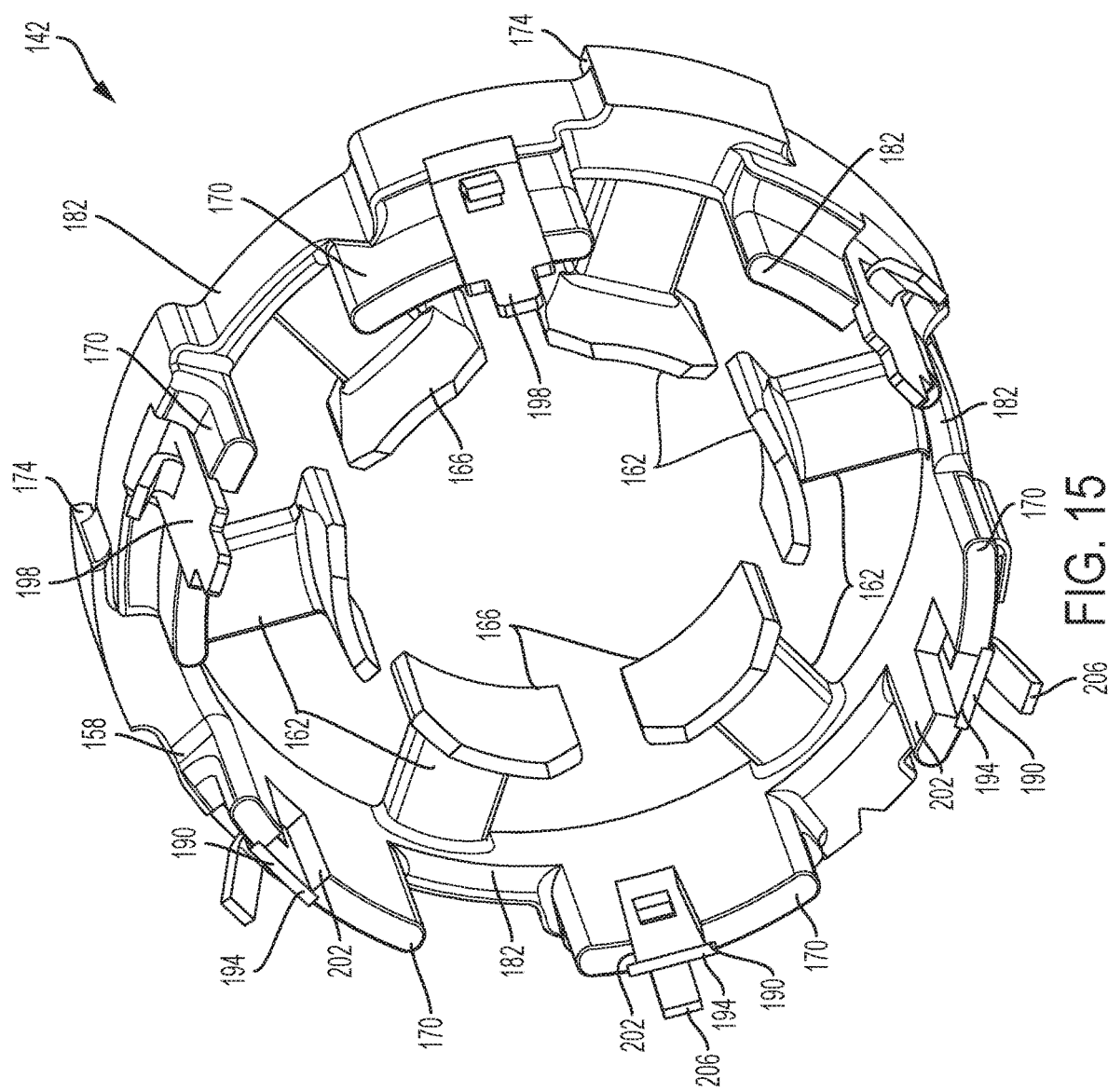
FIG. 15 is a perspective view of another stator end cap with coil contact plates overmolded therein.
Figure 16:
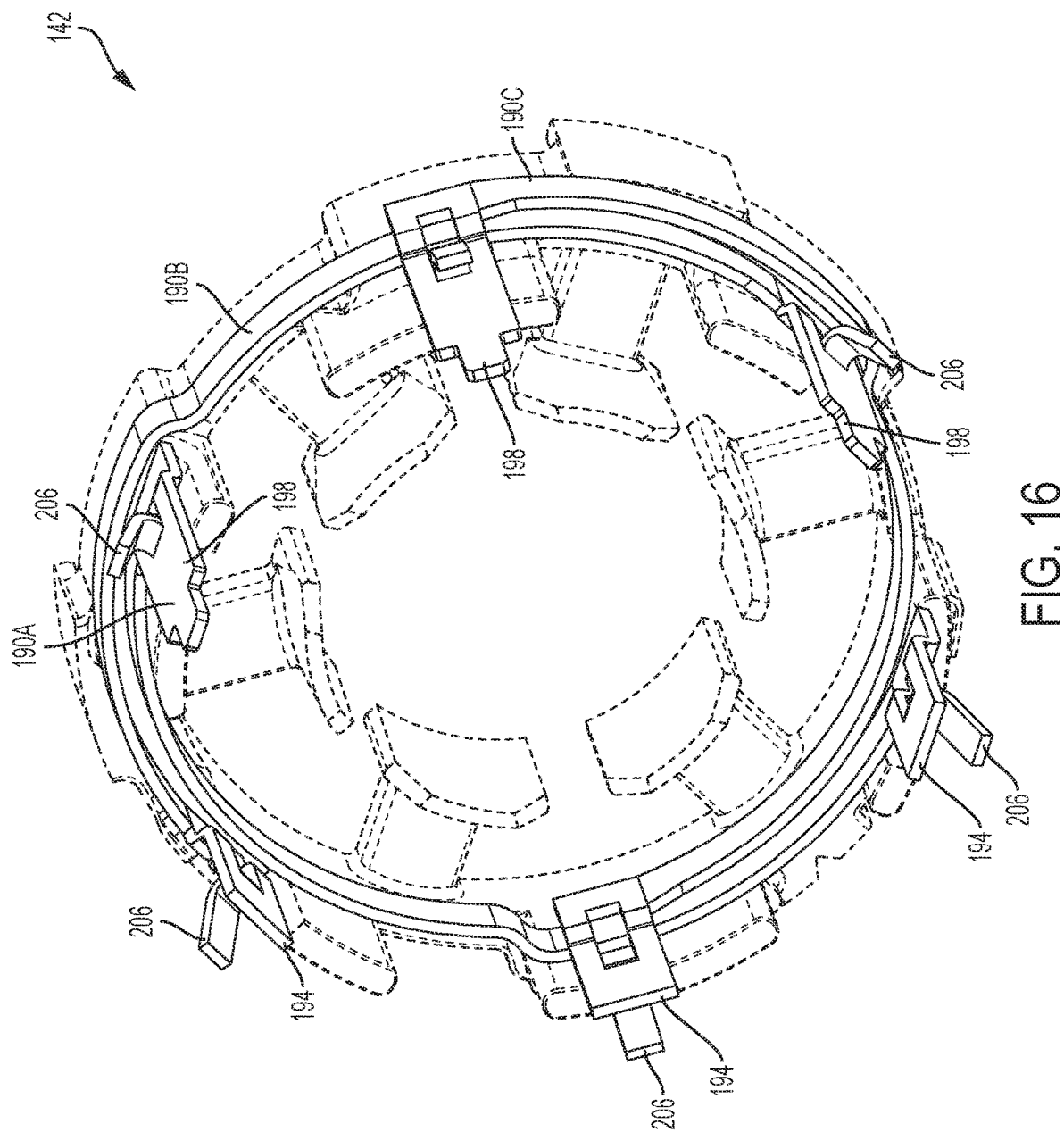
FIG. 16 is another perspective view of the stator end cap and coil contact plates of FIG. 15, illustrating the stator end cap in a transparent state.

With reference to FIGS. 15-17, the stator 46 includes coil contact plates 190 (also referred interchangeably herein as coil contact plates 190A, 190B, 190C) overmolded in the rear end cap 142. During assembly of the stator 46, the stator windings 134 are wound around the stator teeth 126 and the end cap teeth 162, and the coil contact plates 190 short-circuit diagonally opposite pairs of coils 134 (e.g., 134A and 134D, 134B and 134E, 134C and 134F).

With reference to FIGS. 16-17, the coil contact plates 190 are generally semi-circular in shape and staggered to avoid contact between adjacent coil contact plates 190. Each coil contacts plate 190 includes a first terminal 194 (i.e., a short terminal) and a second terminal 198 (i.e., a long terminal) diagonally opposite the first terminal 194. In the illustrated embodiment, the terminals 194, 198 are positioned within a slot 202 formed by the flange 170 on the rear end cap 142. The stator windings 134 are connected to hooks 206 formed on the terminals 194, 198.

In some embodiments, the rear end cap 142 and the front end cap 150 may be manufactured separately from the stator core 106, positioned relative to the stator core 106 using the tabs 174 and the recesses 118, and then retained to the stator core 106 by the completed coil windings 134. In such an embodiment, the coil contact plates 190 may be overmolded by the rear end cap 142 using, for example, an insert molding process.

In other embodiments (not shown), the stator core 106 and the coil contact plates 190 may be insert molded together, for example, using an injection molding process. In such an embodiment, the mold material defining each of the end caps 142, 150 may also overlie one or multiple of the laminations 102 in the front and the rear of the stator core 106.

In both embodiments, because the coil contact plates 190 are molded within the rear end cap 142, separate means of attaching the coil contact plates 190 to the end cap 142 is unnecessary. Also, the entire circumferential length of the coil contact plates 190 is insulated within the nonconductive mold material comprising the rear end cap 142, thereby reducing the likelihood of corrosion of the coil contact plates 190 if the motor 34 is exposed to wet or damp environments.

With reference to FIG. 18, in some embodiments, the embedded stator coil contact plates 190 include an attachable terminal 210. Specifically, the attachable terminal 210 may be secured to the coil contact plates 190 after the coil contact plates 190 have been embedded within the end cap 142. Advantageously, the attachable terminals 210 can be properly selected for size (e.g., thickness), shape (e.g., hook size), material, etc., for a given application. For example, a thicker terminal 210 with a larger hook size may be required for an application requiring larger current values. In addition, separating the terminals 210 from the coil contact plates 190 reduces the amount of material wasted in manufacturing the coil contact plates 190 via stampings. The terminals 210 may be coupled to the coil contact plates 190 by, for example, a soldering or welding process.

Figure 18A:
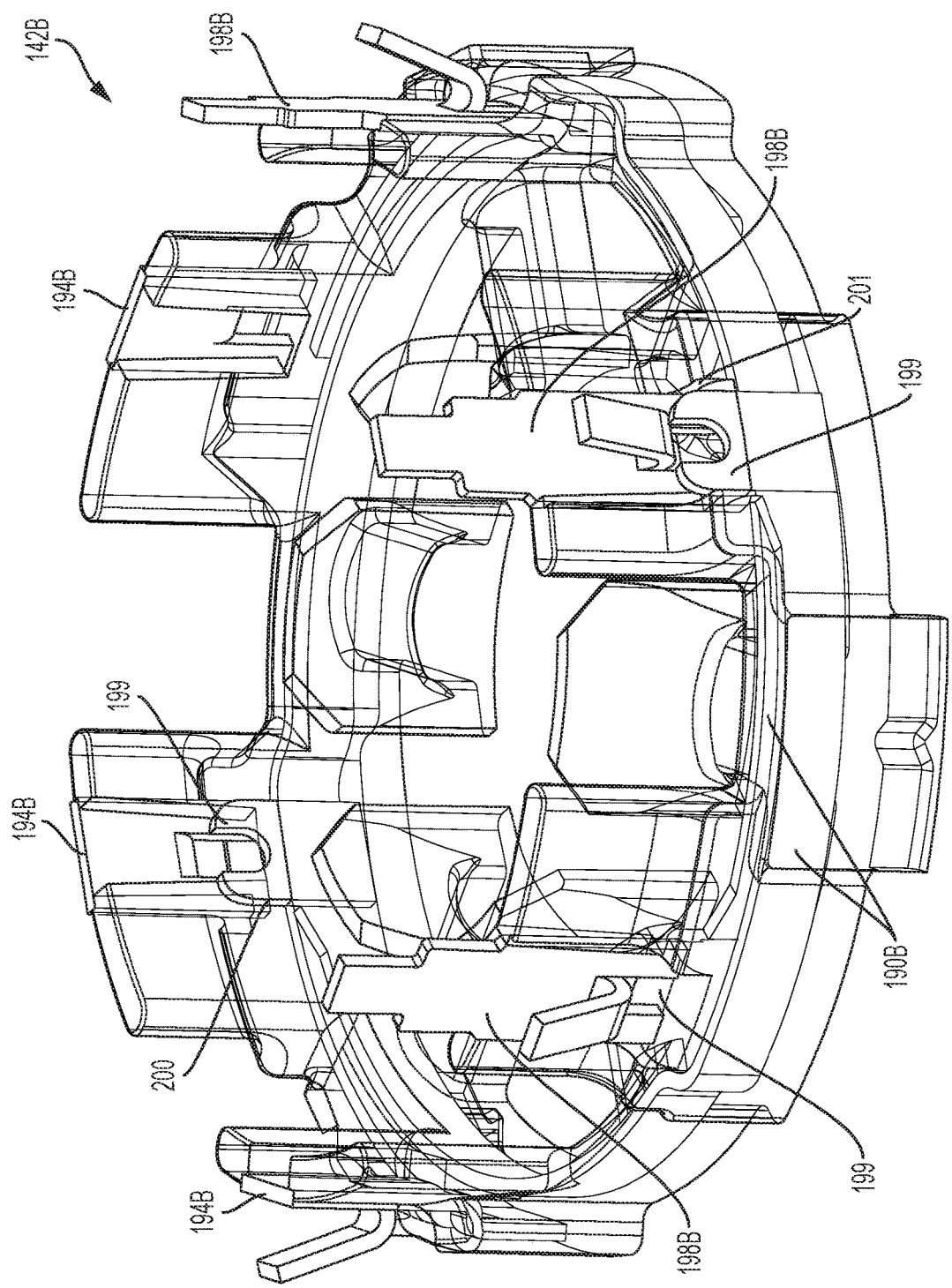
FIG. 18A is a perspective view of a stator end cap with coil contact plates and attachable terminals, according to another aspect of the invention, illustrating the stator end cap in a transparent state.

With reference to FIG. 18A, a stator end cap 142B according to another embodiment is illustrated. The stator end cap 142B includes three embedded coil contact plates 190B (i.e., busbars) and six terminals 194B, 198B. Specifically, three identical contact plates 190B are overmolded within the stator end cap 142B, and can be, for example, approximately 1.0 mm thick.

The terminals 194B, 198B are joined to the contact plates 190B after the molding process by, for example, a welding process. In particular, the terminals 194B, 198B connect to the contact plates 190B at a connection portion 199. In the illustrated embodiment, the adjacent connection portions 199 alternate between being positioned on an inner surface 200 and positioned on an outer surface 201 to enable all of the terminals 194B, 198B to be located in the same radial location. The terminals 194B, 198B include three short terminals 194B and three long terminals 198B (e.g., between approximately 1.3 mm and approximately 1.5 mm in width). As mentioned above, the terminals 194B, 198B can range in size to meet various design requirements.

Figure 18C:
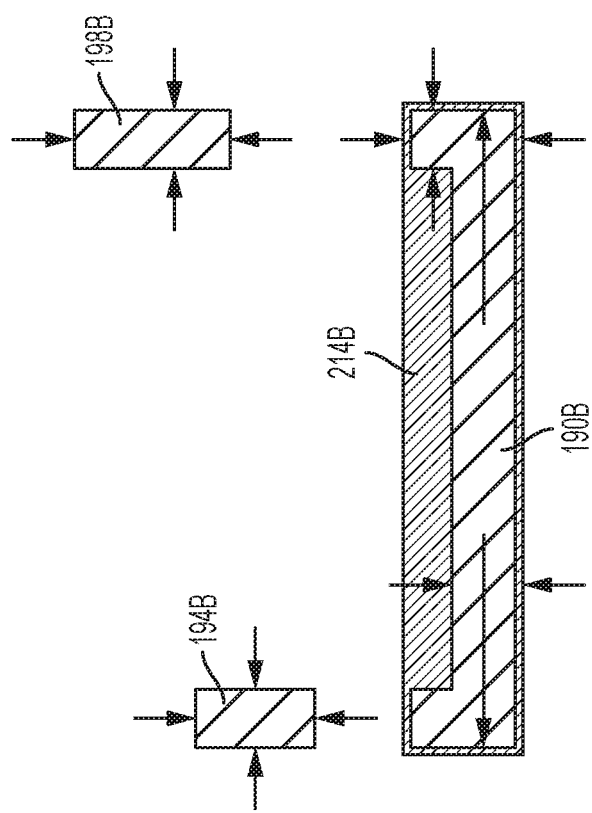
FIG. 18C is a manufacturing schematic for a coil contact plate and attachable terminals according to another embodiment of the invention.
Figure 18B:
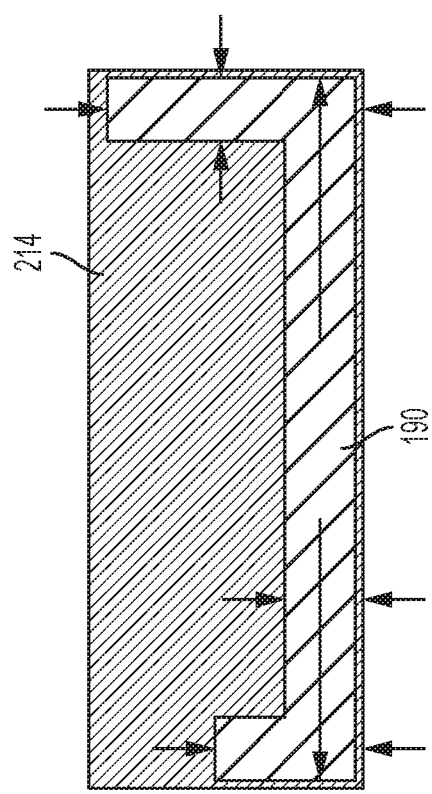
FIG. 18B is a manufacturing schematic for a coil contact plate according to an embodiment of the invention.
Figure 19:
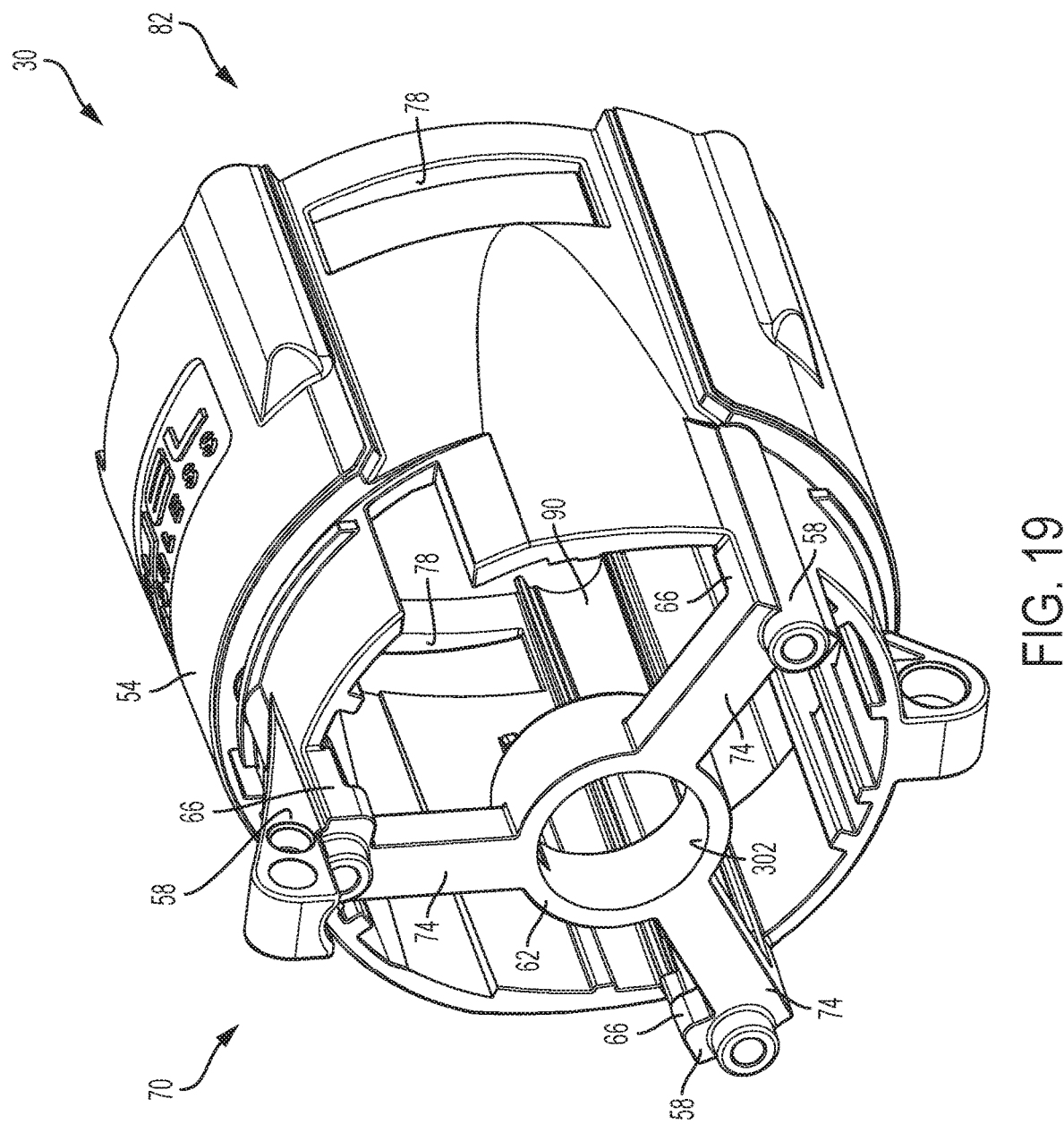
FIG. 19 is a perspective view of a motor housing of the motor assembly of FIG. 3.
Figure 20:
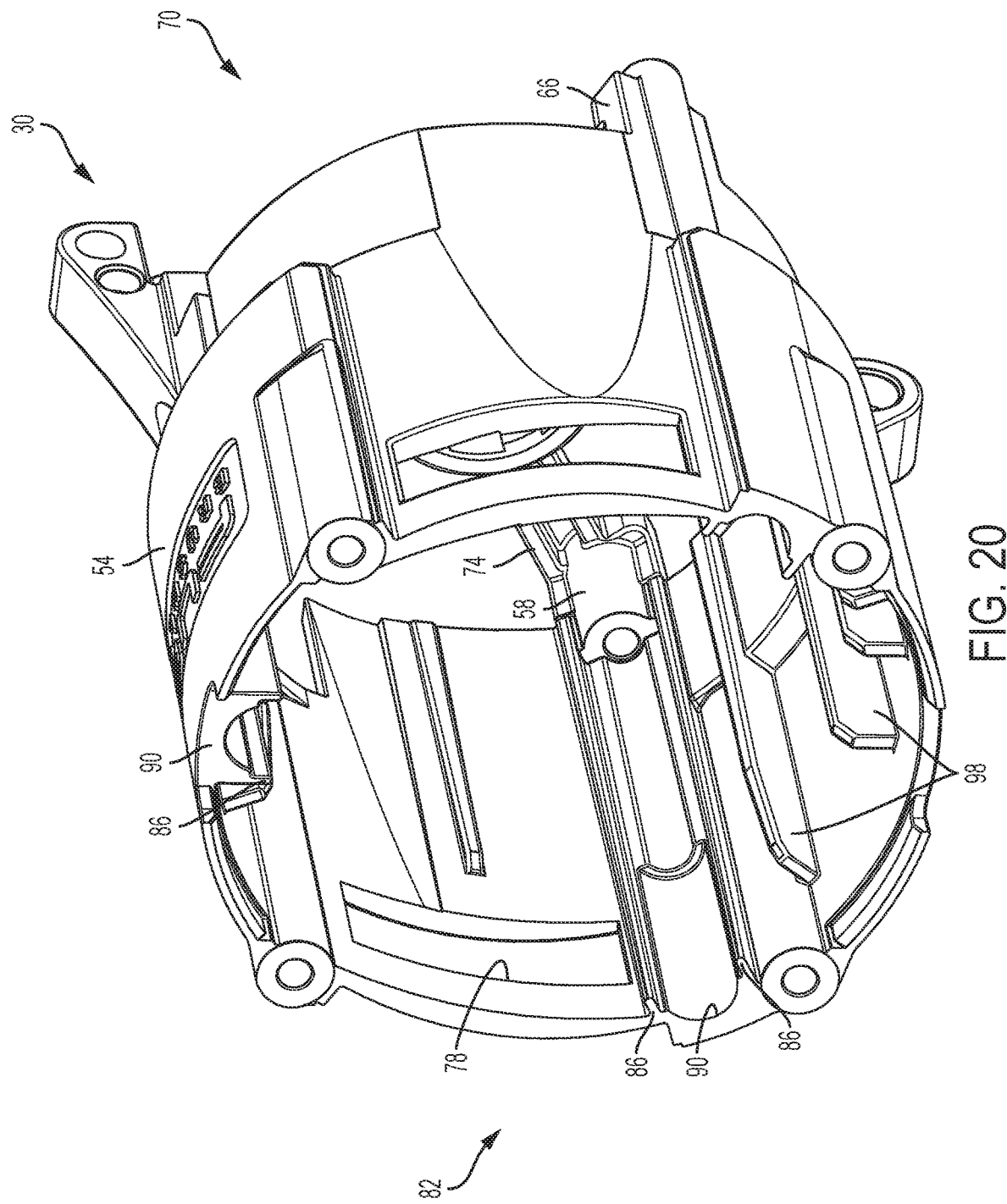
FIG. 20 is another perspective view of the motor housing of FIG. 19.
Figure 21:
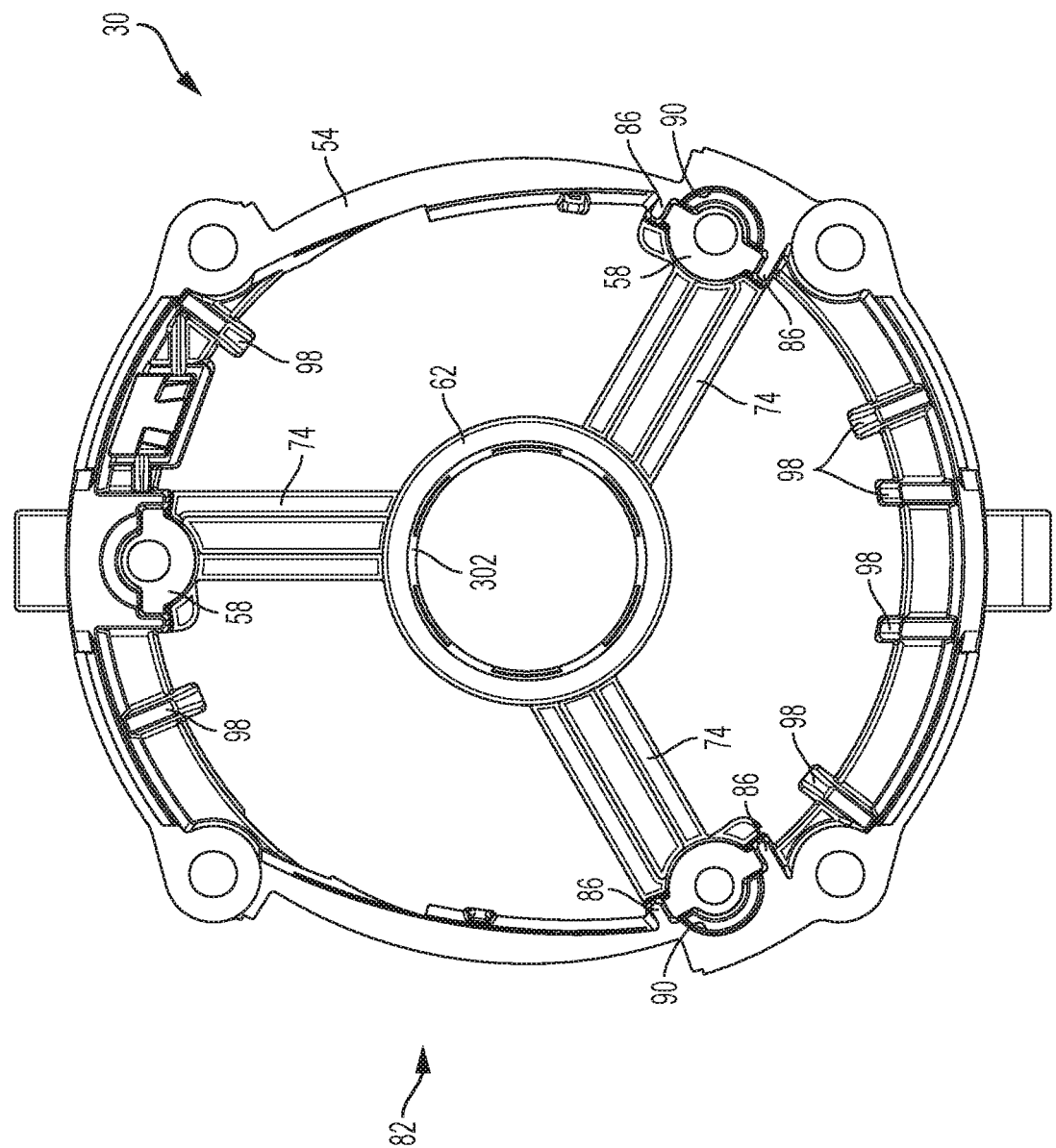
FIG. 21 is a rear view of the motor housing of FIG. 19.
Figure 22:
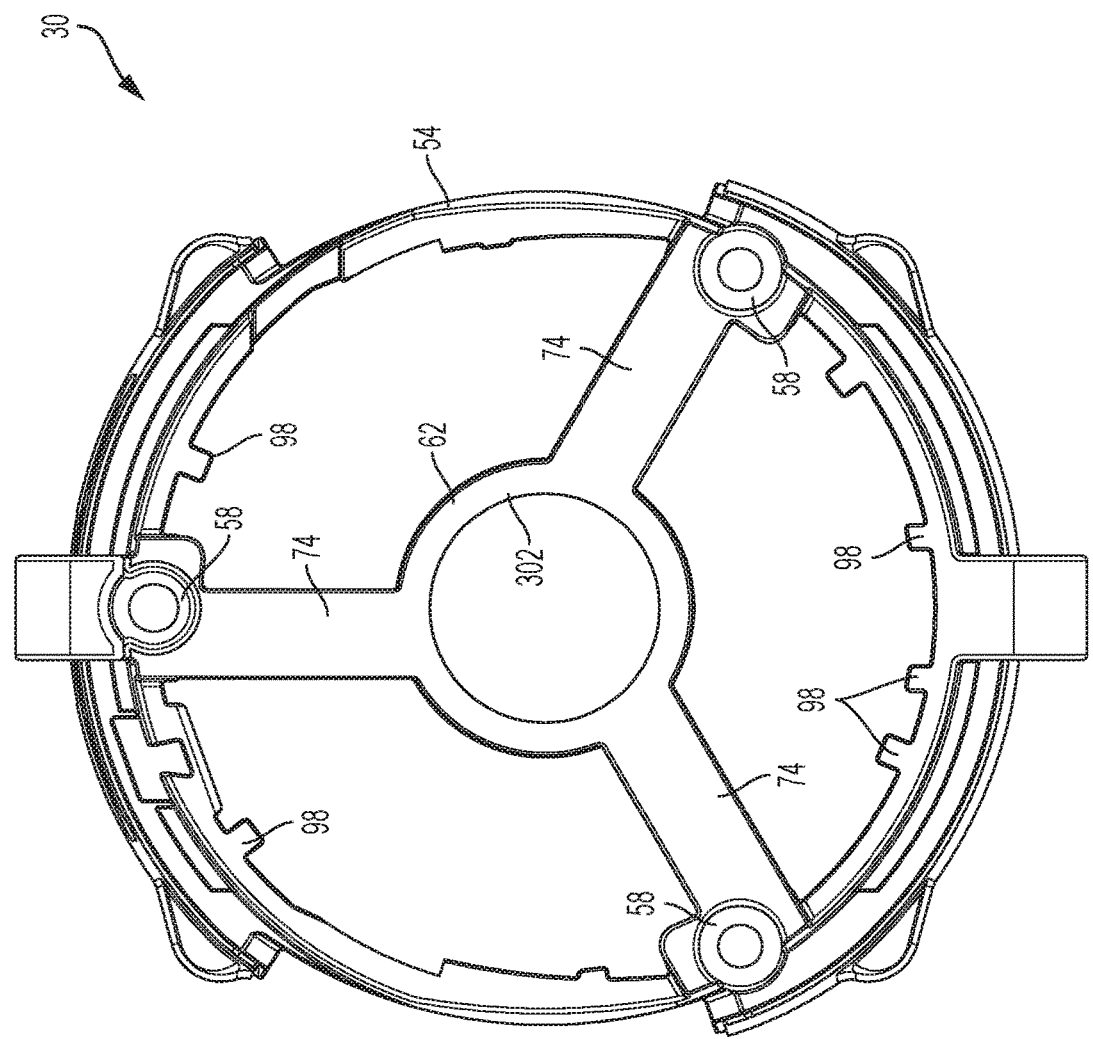
FIG. 22 is a front view of the motor housing of FIG. 19.

With reference to FIGS. 18B and 18C, the coil contact plates (e.g., 190) and terminals (e.g., 194, 198) can be manufactured via, for example, a metal stamping process. With reference to FIG. 18B, the coil contact plate 190 can be stamped from a single piece of material 214. The single piece of material 214 may include an area of approximately 3190 mm$^2$, and the coil contact plate 190 may include an area of approximately 768 mm$^2$. This results in a material scrap rate of approximately 76%.

With reference to FIG. 18C, the coil contact plate 190B is stamped from a first piece of material 214B, and the two terminals 194B, 198B are each stamped separately. The total required amount of material necessary for manufacturing the coil contact plate 190B, the short terminal 194B, and the long terminal 194B is approximately 1310 mm$^2$, and the total area of the resulting parts is approximately 840 mm$^2$. This results in a material scrap rate of approximately 36%.

In addition, material savings can be further increased with the design of FIG. 18C, because the thickness of the individual components can be adjusted. For example, the coil contact plate 190B can be approximately 1 mm thick, while the terminals 194B, 198B can be approximately 1.3 mm to approximately 1.5 mm thick. In contrast, the single piece design of FIG. 18B is a uniform thickness due to use of the single piece of material 214.

Figure 4:
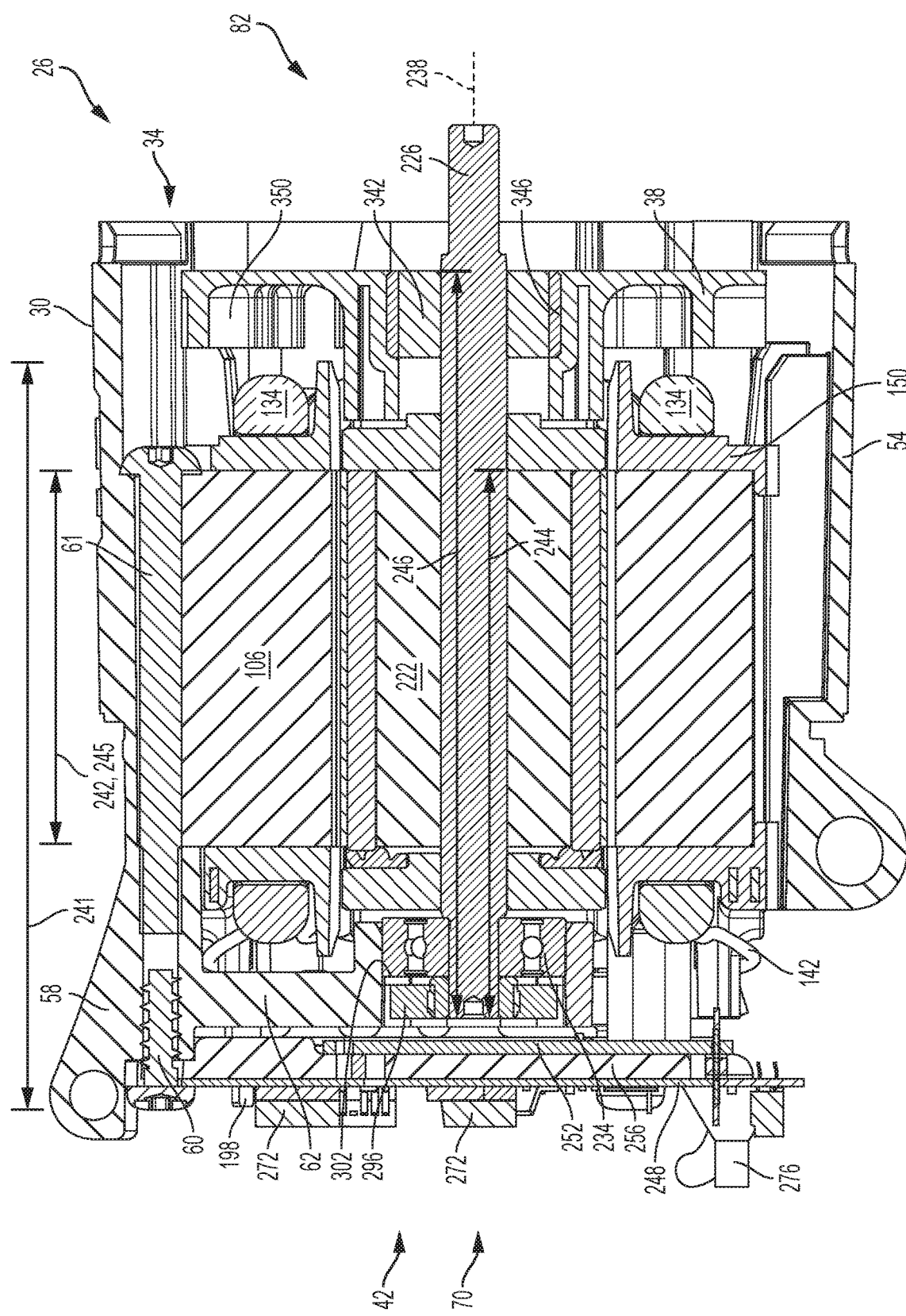
FIG. 4 is cross-sectional view of the motor assembly of FIG. 3, taken along lines 4-4 of FIG. 3.
Figure 5:
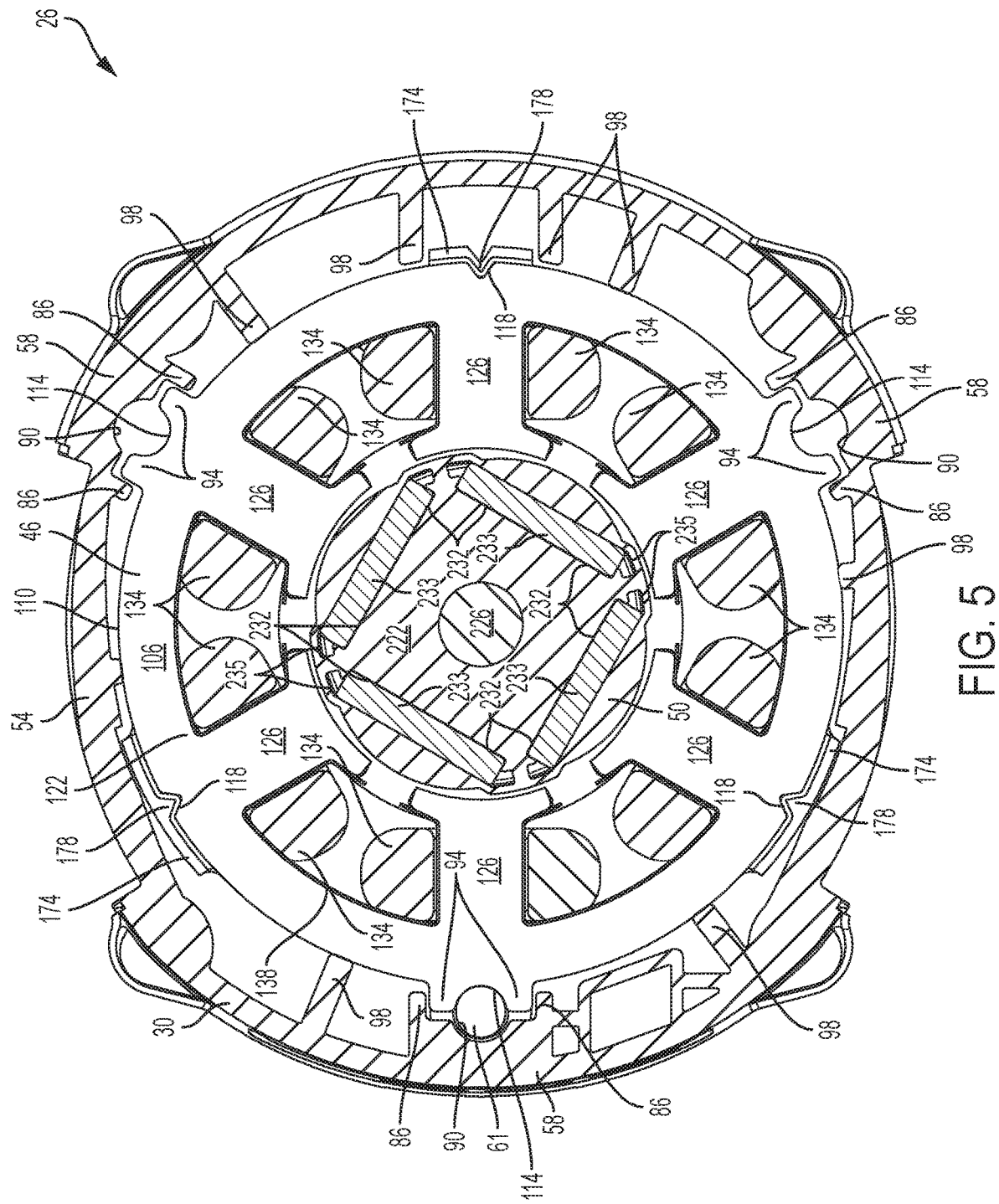
FIG. 5 is a cross-sectional view of the motor assembly of FIG. 3, taken along lines 5-5 of FIG. 3.
Figure 11:
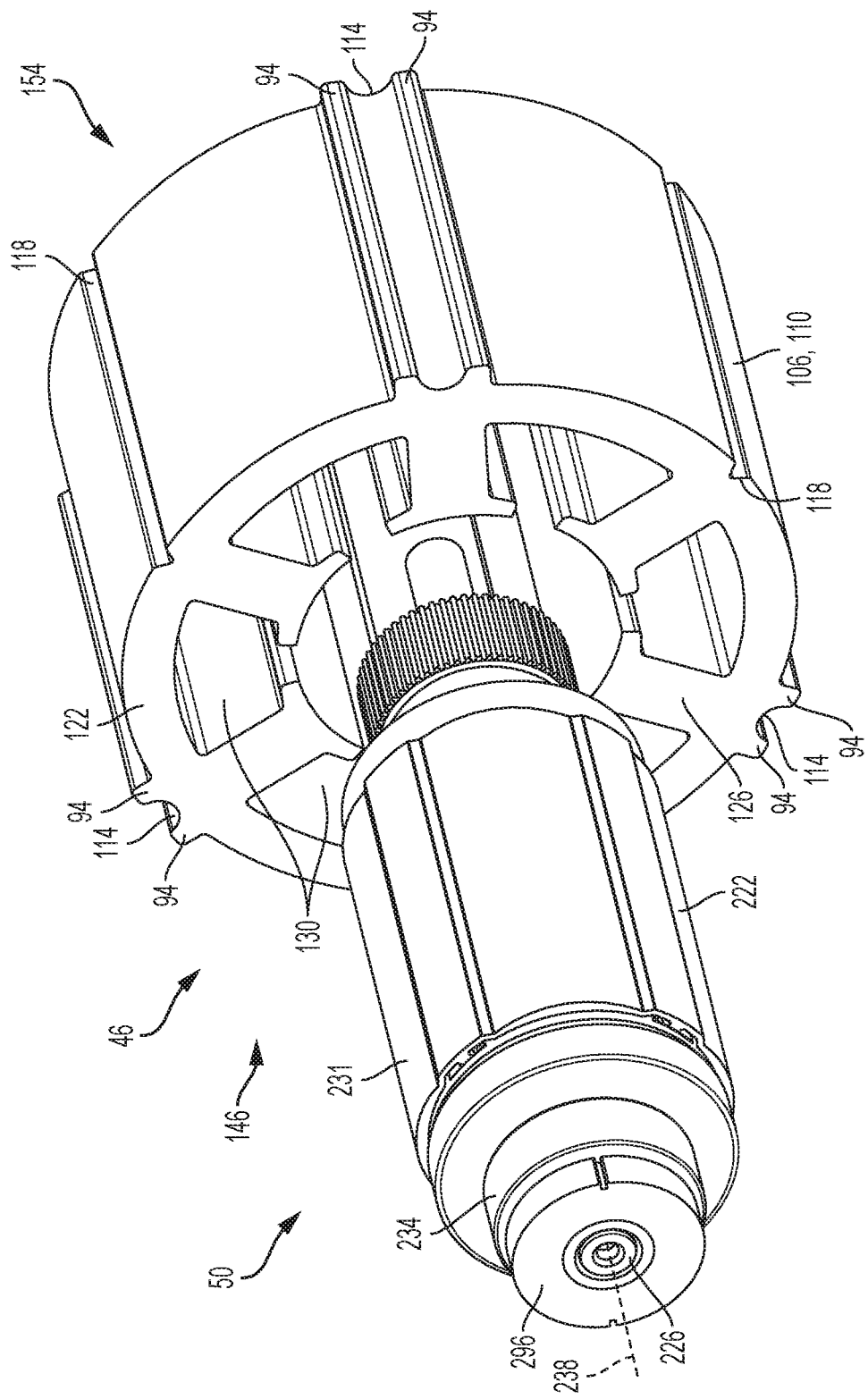
FIG. 11 is an exploded view of the motor assembly of FIG. 3, with portions removed.

With particular reference to FIGS. 4-5 and 11, the rotor 50 includes individual rotor laminations 218 stacked together to form a rotor core 222. A rotor shaft 226 is positioned through a center aperture 230 in the rotor laminations 218. The rotor shaft 226 is at least partially supported by a bearing 234 (FIG. 22) positioned within the hub portion 66. The rotor shaft 226 defines a rotational axis 238 of the rotor 50.

The rotor laminations 218 include a non-circular outer circumference 231 and a plurality of slots 232 in which permanent magnets 233 are received (FIG. 5). In the illustrated embodiment, the rotor 50 is an interior permanent magnet (IPM) type rotor (a.k.a., a buried magnet type rotor). In the illustrated embodiment, the plurality of slots 232 further include air barriers 235 (i.e., flux barriers) at ends of the slots 232. In addition to improving the magnetic characteristics of the rotor 50, the air barriers 235 may accommodate adhesive to aid in retaining the permanent magnets 233 within the slots 232.

Figure 6A:
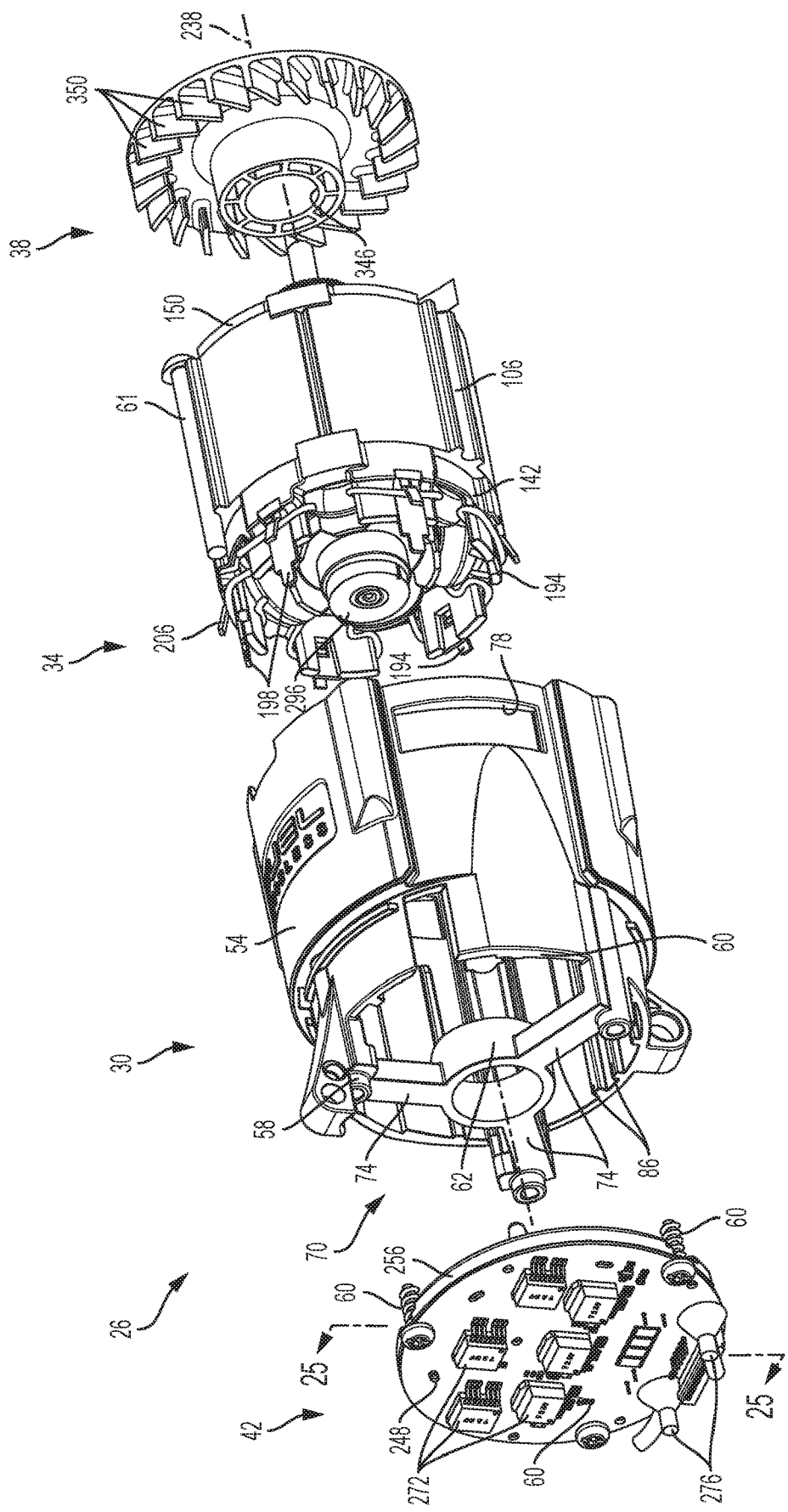
FIG. 6A is a perspective exploded view of the motor assembly of FIG. 3.
Figure 6B:
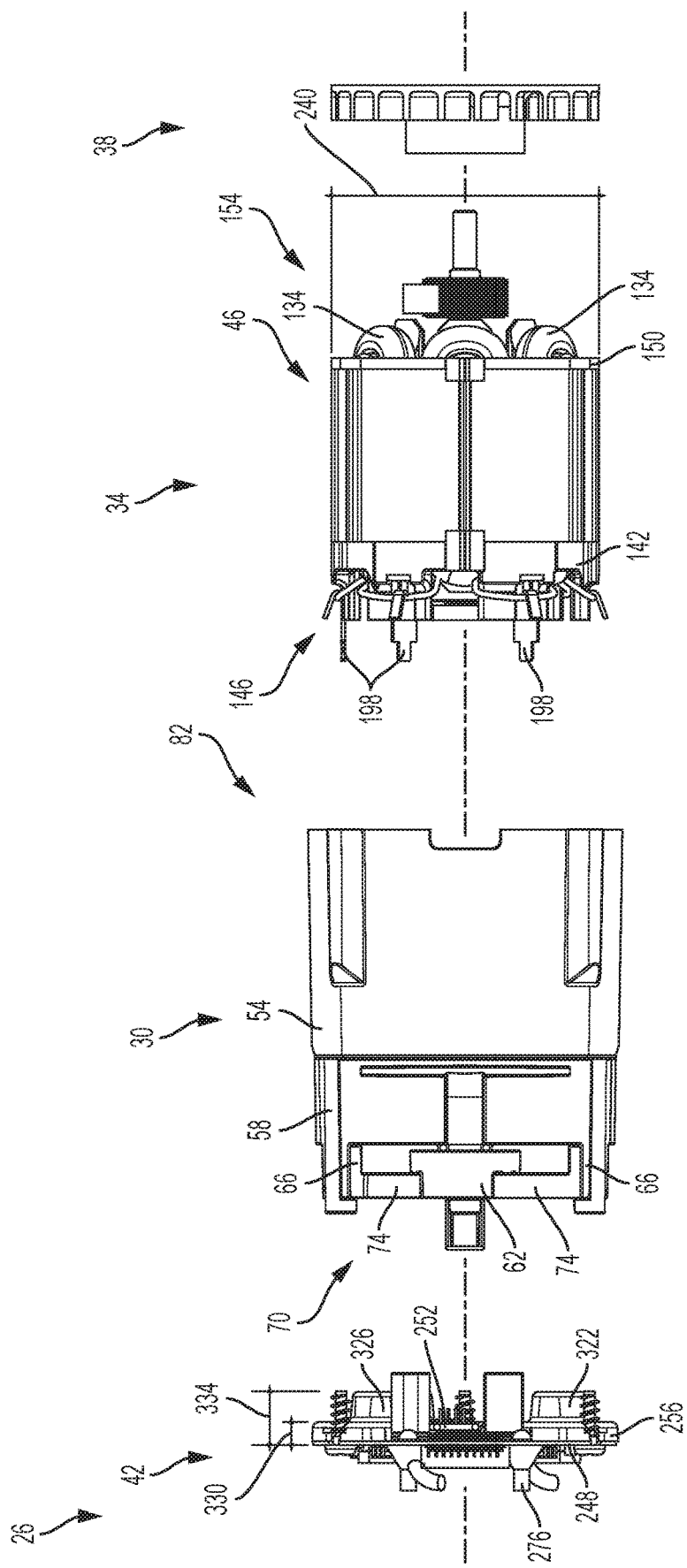
FIG. 6B is a side exploded view of the motor assembly of FIG. 3.

With continued reference to FIGS. 6B and 12, the stator 46 defines an outer diameter 240 of at least about 60 mm. In some embodiments, the outer diameter 240 is between approximately 70 mm and approximately 100 mm. In some embodiments, the outer diameter 240 is approximately 70 mm.

With reference to FIG. 4, the stator 46 defines a length 241 within a range of approximately 68 mm to approximately 88 mm. In some embodiments, the length 241 is approximately 78 mm. The stator core 106 defines a length 242 within a range of approximately 35 mm to approximately 55 mm. In some embodiments, the length 242 of the stator core 106 is approximately 45 mm. In some embodiments, the combined length of the stator 46 and the heat sink 256 is approximately 84 mm (i.e., including the motor housing 30 features that the heat sink 256 mounts to, but not the rest of the housing 30). In further embodiments, the length from the heat sink 256 to back of the fan 38 is approximately 95 mm, and the length from the heat sink 256 to the surface of the housing 30 which mates to, for example, a gear case is approximately 103 mm.

The total weight of the stator 46 (i.e., stator core 106, end caps 142, 150, and coils 134) is within a range of approximately 1.49 pounds to approximately 1.89 pounds. In some embodiments, the total weight of the stator 46 is approximately 1.69 pounds. The stator core 106 further defines a volume within a range of approximately 72,000 mm$^3$ and approximately 92,000 mm$^3$. In some embodiments, the stator core 106 defines a volume of approximately 82,000 mm$^3$.

With continued reference to FIG. 4 and the embodiment with a length 242 of the stator core 106 of approximately 45 mm, the rotor 50 defines an outer diameter 243 within a range of approximately 20 mm and approximately 40 mm. In some embodiments, the outer diameter 243 is approximately 31.1 mm. With reference to FIG. 4, the rotor core 222 defines a length 245 within a range of approximately 35 mm to approximately 55 mm. In some embodiments, the length 245 of the rotor core 222 is approximately 45 mm. In some embodiments, the length 245 of the rotor core 222 is equal to the length 242 of the stator core 106. The rotor 50 further defines a length 244 from the magnet 296 (FIG. 4) to end of the rotor core 222 of approximately 68 mm. In addition, the rotor 50 defines a length 246 from the magnet 296 to the back of the fan 38 of approximately 89.6 mm.

The total weight of the rotor 50 (i.e., the weight of the rotor core 222, the magnets 233, the rotor shaft 226, the bearings 234 and the fan 38) is within a range of approximately 0.74 pounds and approximately 1.14 pounds. In some embodiments, the total weight of the rotor 50 is approximately 0.94 pounds. The weight of the rotor core 222 is within a range of approximately 0.31 pounds to approximately 0.51 pounds. In some embodiments, the weight of the rotor core 222 is approximately 0.41 pounds. In addition, the rotor core 222 defines a volume within a range of approximately 20,000 mm$^3$ to approximately 30,000 mm$^3$. In some embodiments, the rotor core 222 volume is approximately 25,170 mm$^3$.

With reference to FIGS. 23-26, the PCB assembly 42 includes a first printed circuit board 248 (i.e., a power circuit board), a second printed circuit board 252 (i.e., a rotor position sensor board), and a heat sink 256. The heat sink 256 defines a first side 260 to which the first printed circuit board 248 is coupled to and defines a second side 264 to which the second printed circuit board 252 is coupled to. In other words, the heat sink 256 is positioned between the first and second PCBs 248, 252. As such, the heat sink 256 is positioned and operable to draw heat from both the first PCB 248 and the second PCB 252.

The PCB assembly 42 is coupled to the rear end 70 of the motor housing 30 opposite the front end 82 from which the rotor shaft 226 protrudes. The PCB assembly 42 is fastened to the motor housing 30 by the fasteners 60 (FIGS. 4 and 6A) equally spaced about the periphery of the motor housing 30. With reference to FIG. 3, the second terminals 198 extend through the heat sink 256 and are electrically connected to the power circuit board 248, while the first terminals 194 do not protrude through the heat sink 256. Particularly, the terminals 198 of the coil contact plates 190 are connected, respectively to the U, V, W phases of the inverter bridge 378.

In some embodiments, where the power circuit board 248 is located elsewhere within the power tool 10 as described above, the coil contact plates 190 may be connected to the power circuit board 248 by lead wires. Lead wires may be connected to the second terminals 198 (e.g., to holes in the second terminals 198) and routed to the power circuit board 248 within the power tool housing.

In some embodiments, rather than being attached to the motor housing, the power circuit board 248 may be located on a casting elsewhere within the combination 10. For example, the power circuit board 248 may be located in a handle portion of the power tool housing or adjacent the motor assembly 26 in a motor housing portion of the combination 10. However, the rotor sensor board 252 may remain with the motor assembly 26.

Figure 24:
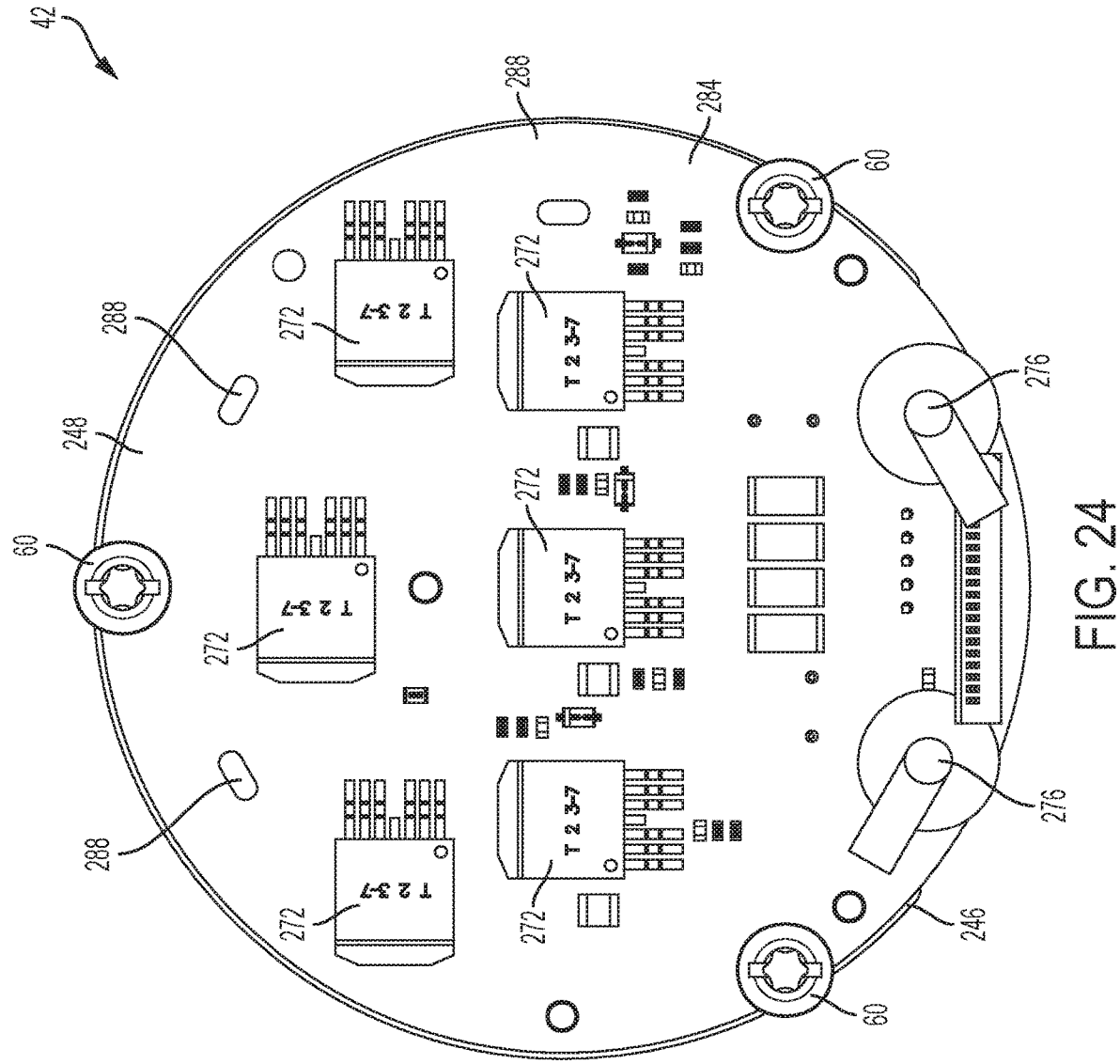
FIG. 24 is a front view of the PCB assembly of FIG. 23.
Figure 25:
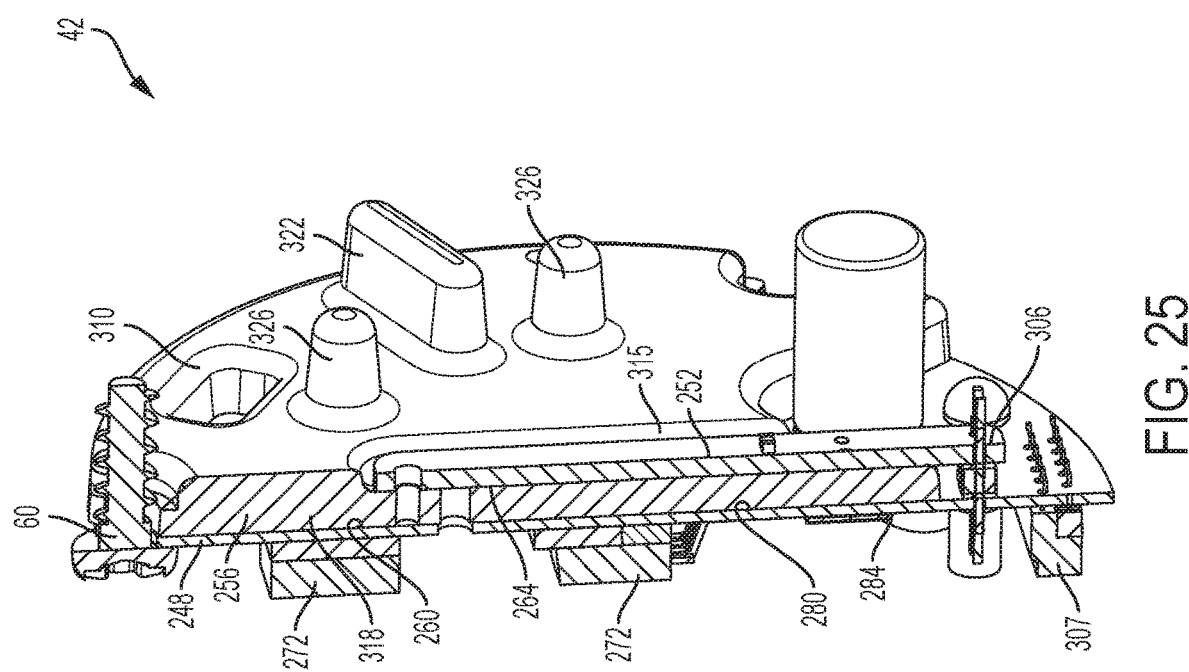
FIG. 25 is a perspective cross-sectional view of the PCB assembly of FIG. 23, taken generally along lines 25-25 of FIG. 5.

With continued reference to FIG. 24, the power circuit board 248 includes a plurality of switches 272 (e.g., FETs, IGBTs, MOSFETs, etc.). The power source (the battery pack 18) provides operating power to the motor 34 through the switches 272 (e.g., an inverter bridge). In the illustrated embodiment, the power circuit board 248 includes terminals 276 to receive the DC power from the power source. By selectively activating the switches 272, power from the power source is selectively applied to coils of the motor 34 to cause rotation of the rotor 50.

The power circuit board 248 includes a first, generally flat surface 280 facing the heat sink 256 and a second surface 284 opposite the first surface 280. The switches 272 and capacitors 288 associated with the power circuit board 248 are positioned on the second surface 284. The first surface 280 is held in contact with the heat sink 256 such that heat generated by the power circuit board 248 (e.g., heat generated by the switches 272) is transferred by conduction to the heat sink 256 where it is subsequently dissipated.

The power circuit board 248 also includes holes 288 through which the terminals 198 of the coil contact plates 190 protrude. The holes 288 are connected to the U, V, and W terminals of the inverter bridge, respectively, via printed electrical traces on the power circuit board 248. Accordingly, individual electric wires are not required to electrically connect the switches 272 to the coil contact plates 190. Additionally, recesses (similar to recesses 314) are provided on the outer circumference of the power circuit board 248 through which the fasteners 60 extend.

Figure 7:
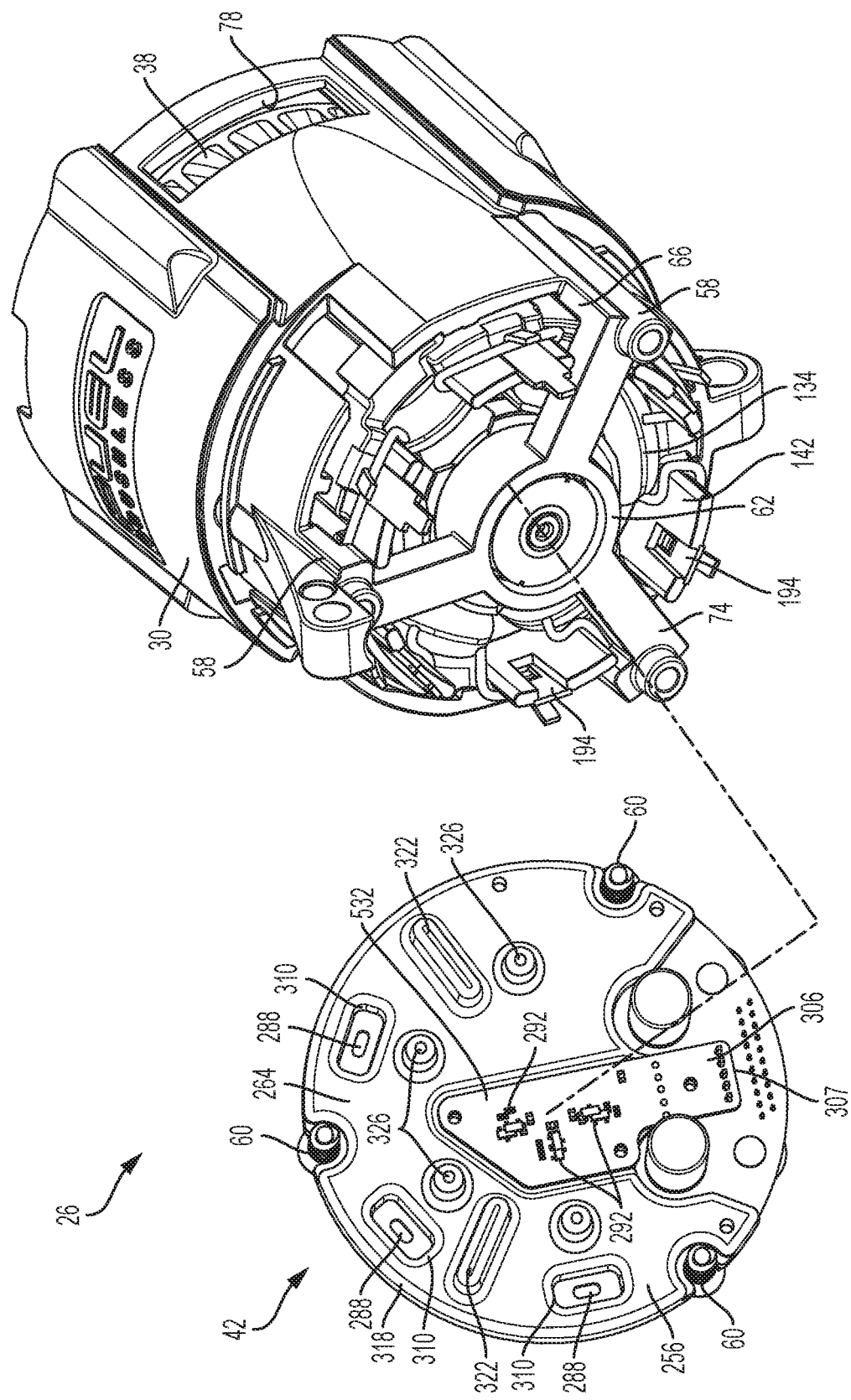
FIG. 7 is a perspective view of the motor assembly of FIG. 3, illustrating a PCB assembly exploded from the remainder of the motor assembly.
Figure 8:
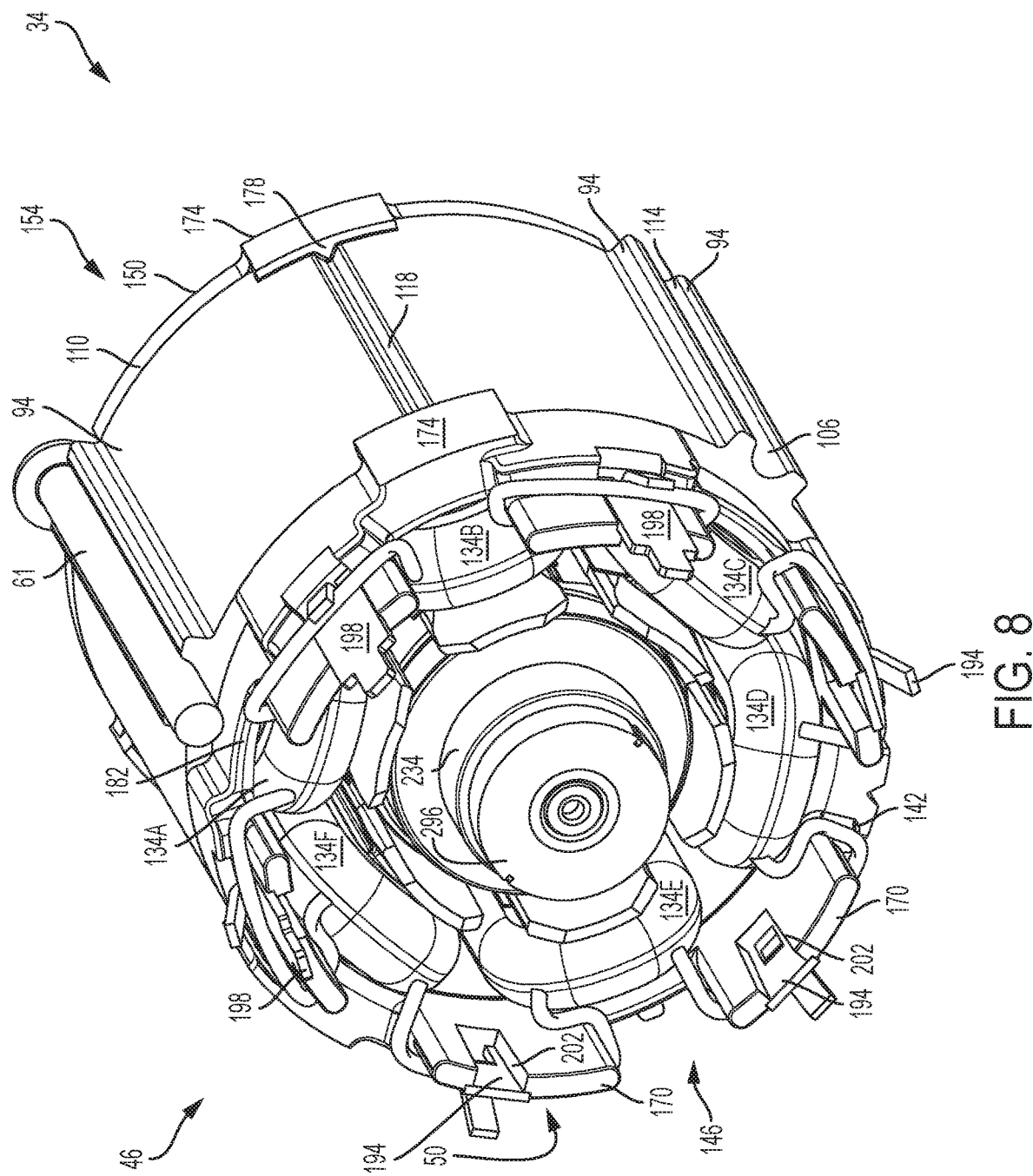
FIG. 8 is a perspective view of the motor assembly of FIG. 3, with portions removed.
Figure 9:
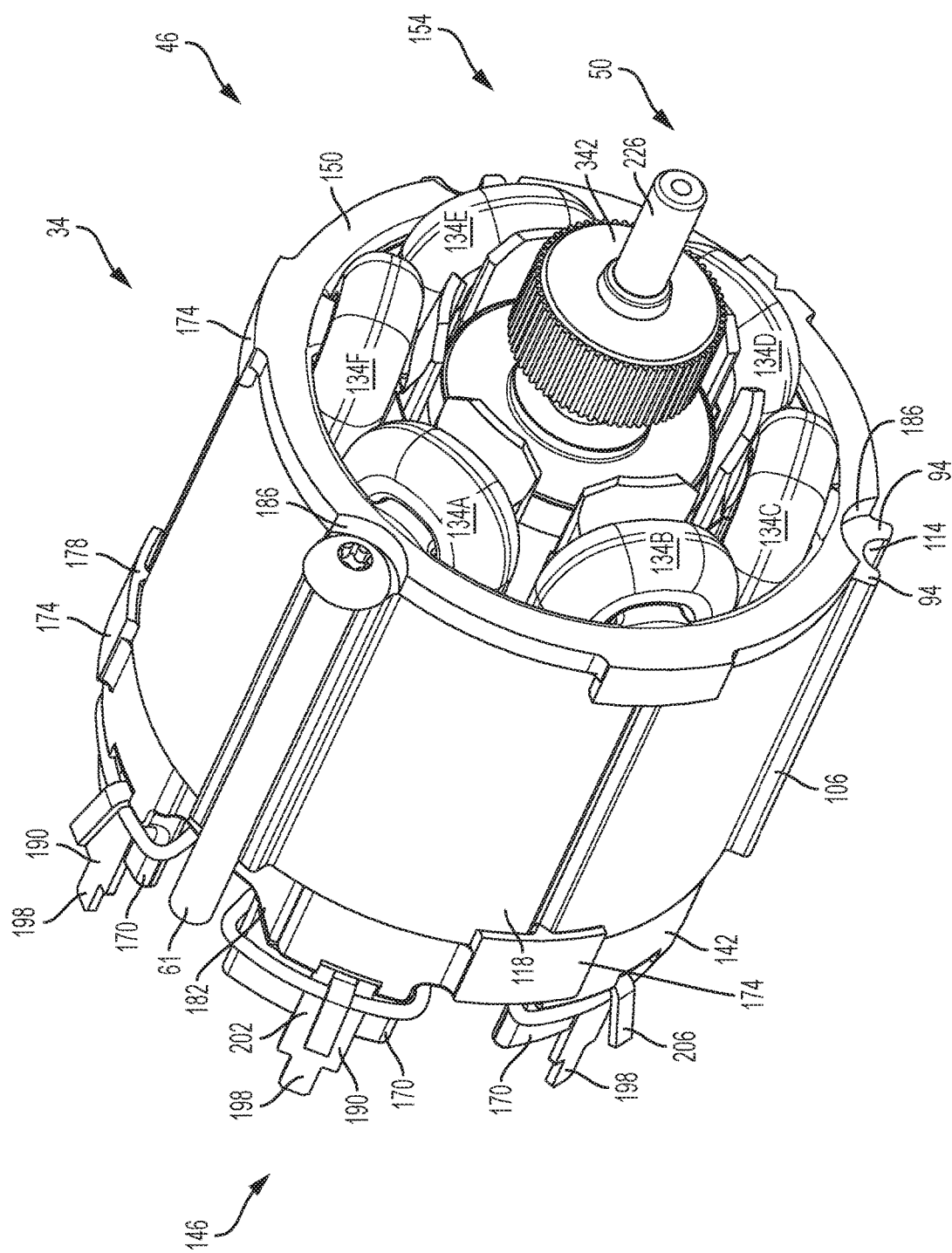
FIG. 9 is another perspective view of the motor assembly of FIG. 3, with portions removed.
Figure 10:
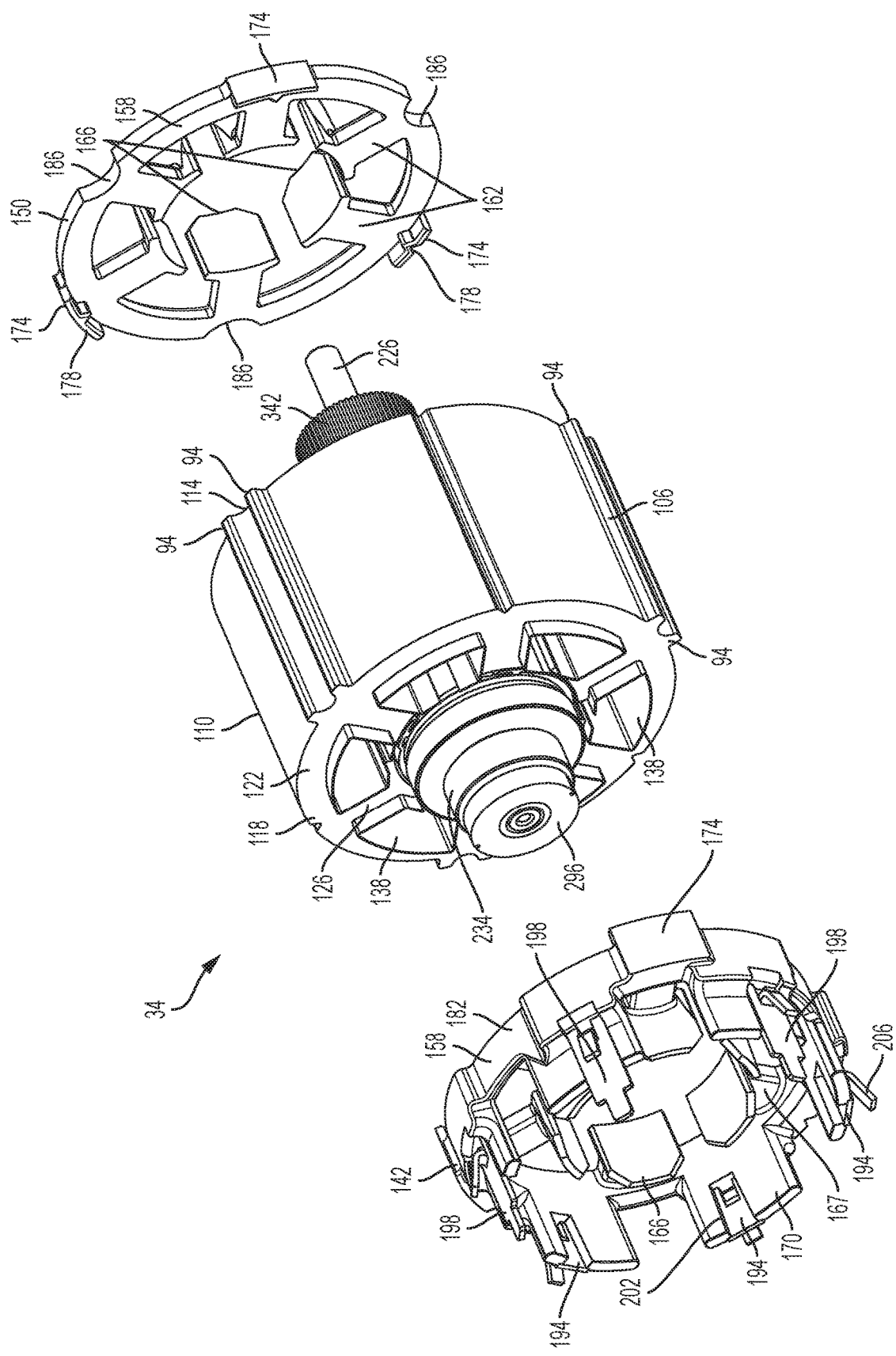
FIG. 10 is an exploded view of the motor assembly of FIG. 3, with portions removed.
Figure 23:
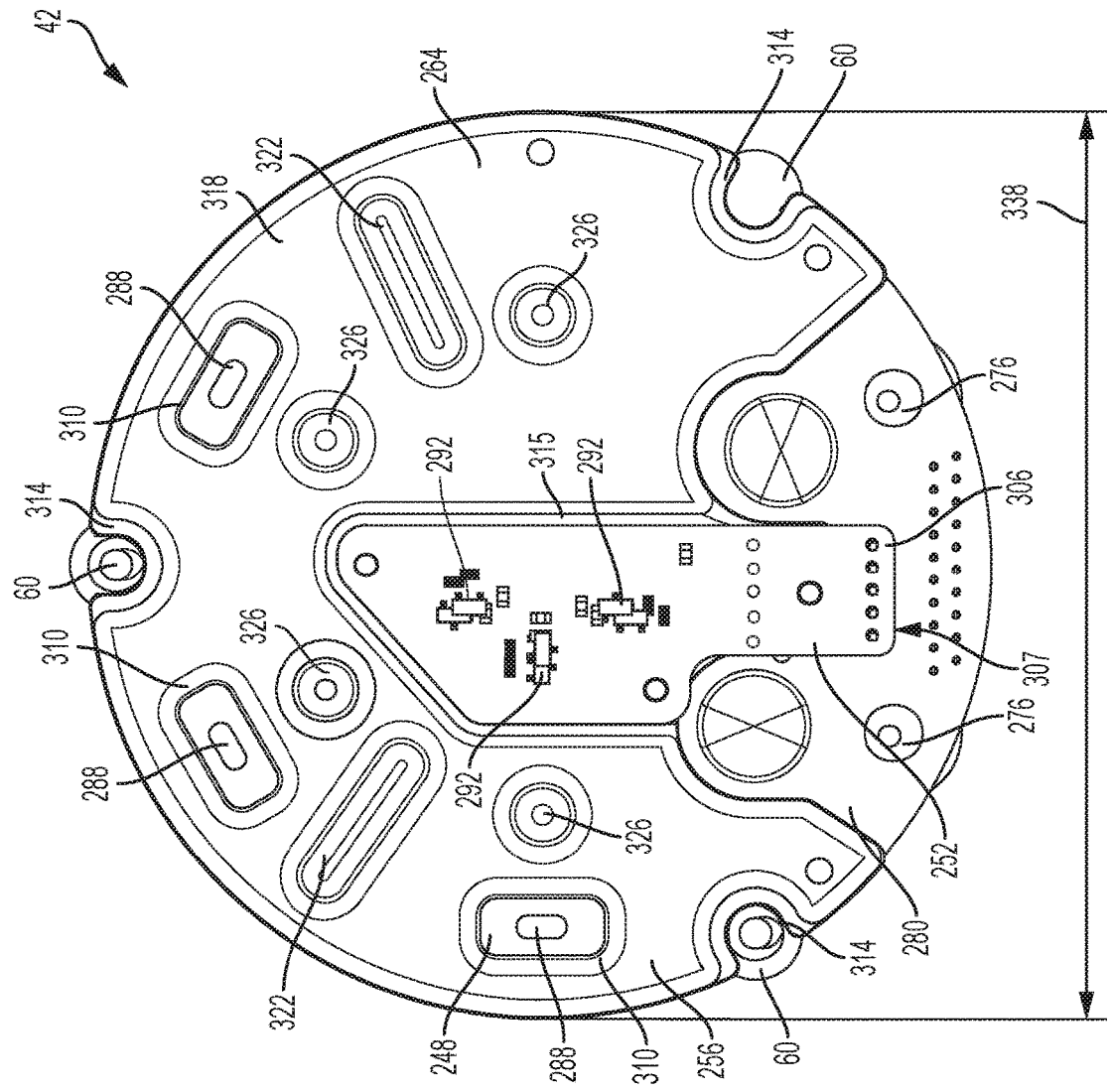
FIG. 23 is a rear view of a PCB assembly.

With reference to FIG. 23, the rotor position sensor board 252 includes a plurality of Hall-effect sensors 292, and the motor 34 includes a ring-shaped permanent magnet 296 mounted on the rotor shaft 226. The ring magnet 296 is affixed to the rotor shaft 226 and co-rotates with the rotor shaft 226, emanating a rotating a magnetic field that is detectable by the Hall-effect sensors 292. The ring magnet 296 is rotationally aligned with the magnets 233 of the rotor 50. Specifically, the hub portion 62 defines a central aperture 302 into which the bearing 234 for supporting the rotor shaft 226 is interference-fit and where the ring magnet 296 is received (FIGS. 4 and 7). In the illustrated embodiment, the rotor position sensor board 252 is received within a recess 315 formed on the second side 264 of the heat sink 256.

A connection portion 306 is provided at one end of the rotor position sensor board 252 to connect with a mating connection portion 307 on the power circuit board 248. In this manner, power is provided to the rotor position sensor board 252 via the mating connection terminals 306, 307, and the motor information feedback from the Hall-effect sensors 292 is transmitted to the motor controller 374 via the power circuit board 248. In some embodiments, the power circuit board 248 and the rotor position sensor board 252 may be combined on a single motor controller PCB (not shown).

Figure 26:
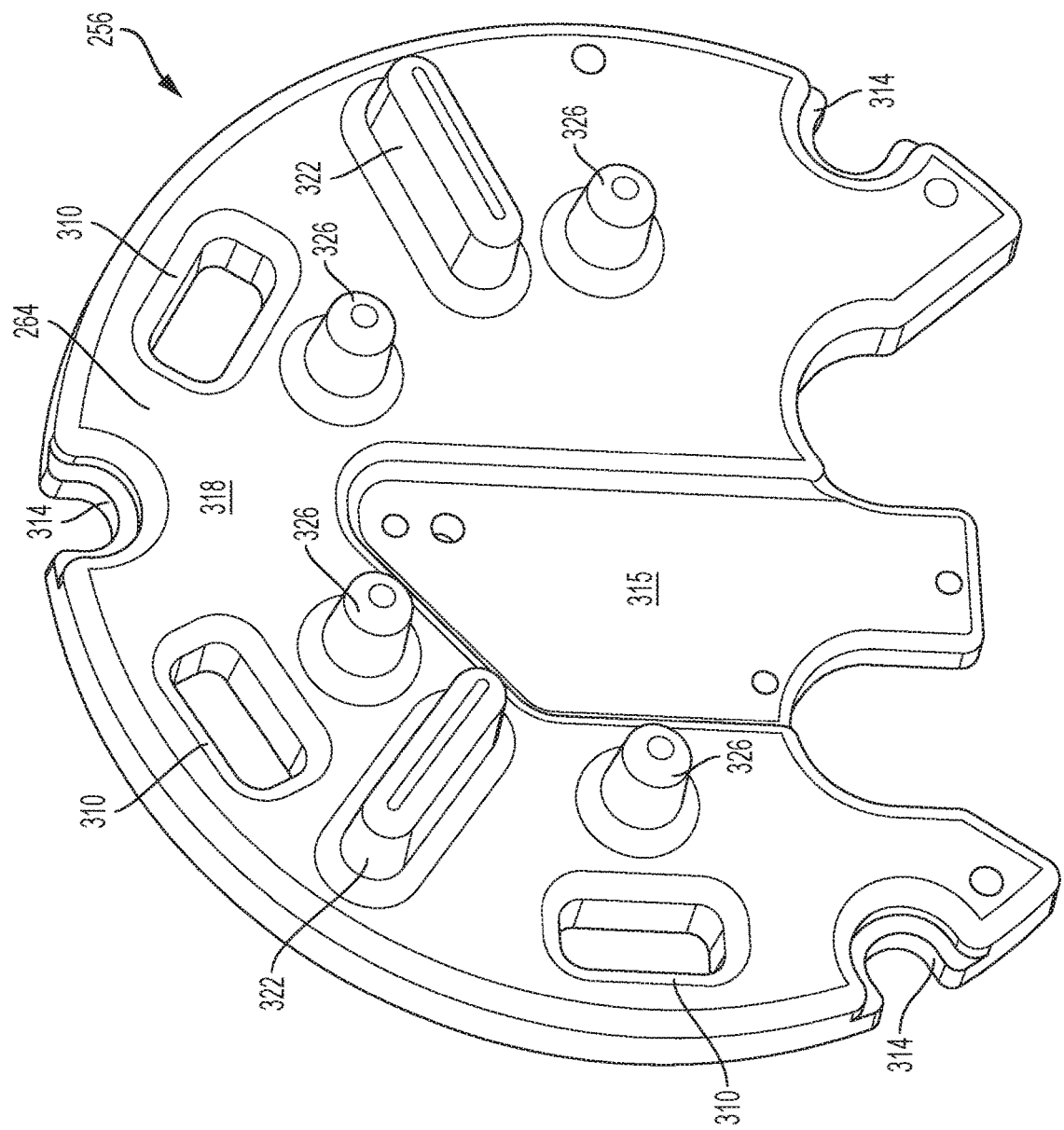
FIG. 26 is a perspective view of a heat sink of the PCB assembly of FIG. 23.

With reference to FIG. 26, the heat sink 256 includes holes 310 aligned with the corresponding holes 288 in the power circuit board 248 through which the terminals 198 pass and connect to the power circuit board 248, as mentioned above. Recesses 314 are also provided on the outer circumference of the heat sink 256 through which the fasteners 60 extend. In some embodiments, a low-pressure molding (not shown) is provided with the heat sink 256 to support the rotor position sensor board 252 proximate the connection portion 306, against the heat sink 256.

The opposite end of the rotor position sensor board 252 is fastened to the heat sink 256 to ensure that the rotor position sensor board 252 remains in contact with the heat sink 256 and to reduce the tolerance stack up with reference to the ring magnet 296. In some embodiments, the low-pressure molding also insulates solder joins for power leads and a ribbon cable connector from contaminations. In addition, the low-pressure molding may extend to the edges of the holes 310 in the heat sink 256 to provide electrical insulation between the terminals 198 and the heat sink 256. The heat sink 256 may also be hard-coat anodized or carbon coated to provide electrical isolation from the terminals 198.

The Hall-effect sensors 292 output motor feedback information, such as an indication (e.g., a pulse) when the Hall-effect sensors 292 detect a pole of the magnet 296 attached to the rotating shaft 226 of the motor 34. Based on the motor feedback information from the Hall-effect sensors 292, the motor controller 374 may determine the rotational position, velocity, and/or acceleration of the shaft 226.

The motor controller 374 also receives control signals from the user input. The user input may include, for example, a trigger switch, a forward/reverse selector switch, a mode selector switch, etc. In response to the motor feedback information and the user control signals, the motor controller 374 transmits control signals to the switches 272 to drive the motor 34. By selectively activating the switches 272, power from the power source is selectively applied to coils 134 to cause rotation of the shaft 226. In some embodiments, the motor controller 374 may also receive control signals from an external device such as, for example, a smartphone wirelessly through a transceiver (not shown).

The heat sink 256 includes a base 318 with fins 322 and posts 326 extending from the second side 264 of the heat sink 256. The fins 322 and the posts 326 can be utilized to improve the cooling capacity of the heat sink 256 and/or structurally support the heat sink 256 with respect to the rest of the motor assembly 26.

In some embodiments, the heat sink 256 defines a thickness 330 within a range of approximately 2 mm to approximately 6 mm. In some embodiments, the fins 322 and the posts 326 extend from the base 318 to define a dimension 334 within a range of approximately 11 mm to approximately 15 mm. In some embodiments, the heat sink 256 defines an outer diameter 338 within a range of approximately 65 mm to approximately 85 mm. In some embodiments, the outer diameter 338 of the heat sink 256 is approximately 75 mm.

With reference to FIG. 23, the printed circuit board 248 defines an outer diameter 338 within a range of approximately 65 mm to approximately 85 mm. In some embodiments, the outer diameter 338 of the printed circuit board 248 is approximately 75 mm. The printed circuit board 248 defines an area within a range of approximately 3300 $mm^2$ to approximately 5700 $mm^2$. The printed circuit board 248 defines a height, including the FETs 386, 390, within a range of about 5 mm to about 10 mm. The printed circuit board 248 defines a volume within a range of approximately 16,500 $mm^3$ to approximately 57,000 $mm^3$.

Figure 27:
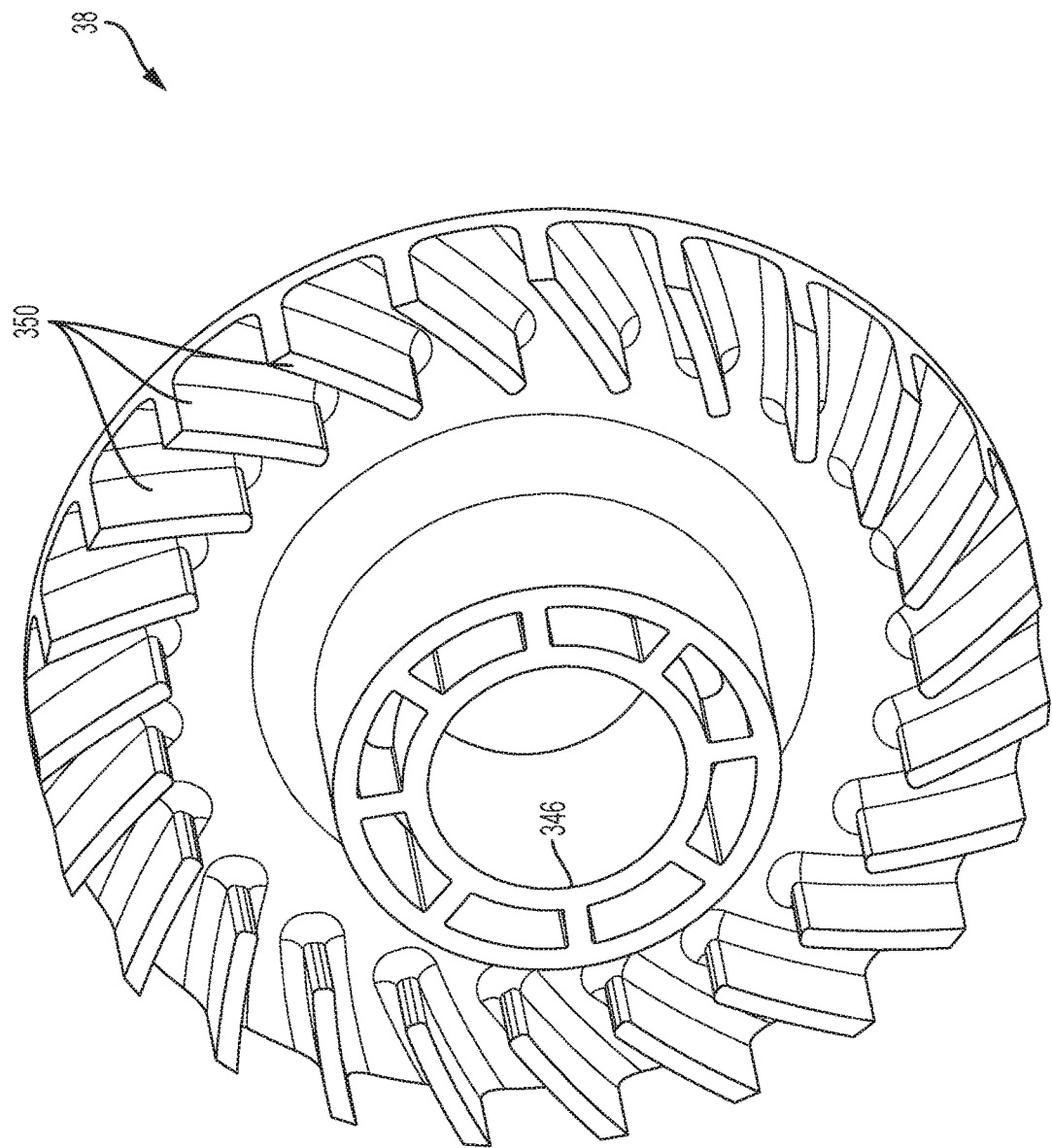
FIG. 27 is a perspective view of a fan of the motor assembly of FIG. 3.

With reference to FIG. 4, the heat sink 256 is positioned within the airflow generated by the fan 38. By positioning the PCB assembly 42 on the rear 70 of the motor housing 30, cooling of the PCB assembly 42 is maximized. With reference to FIGS. 6B and 27, the fan 38 is coupled to the rotor shaft 226 for co-rotation therewith. In particular, a fitting 342 is mounted around the rotor shaft 226, and the fitting 342 couples the fan 38 to the rotor shaft 226. The fan 38 includes a central aperture 346 and a set of fan blades 350.

Figure 28:
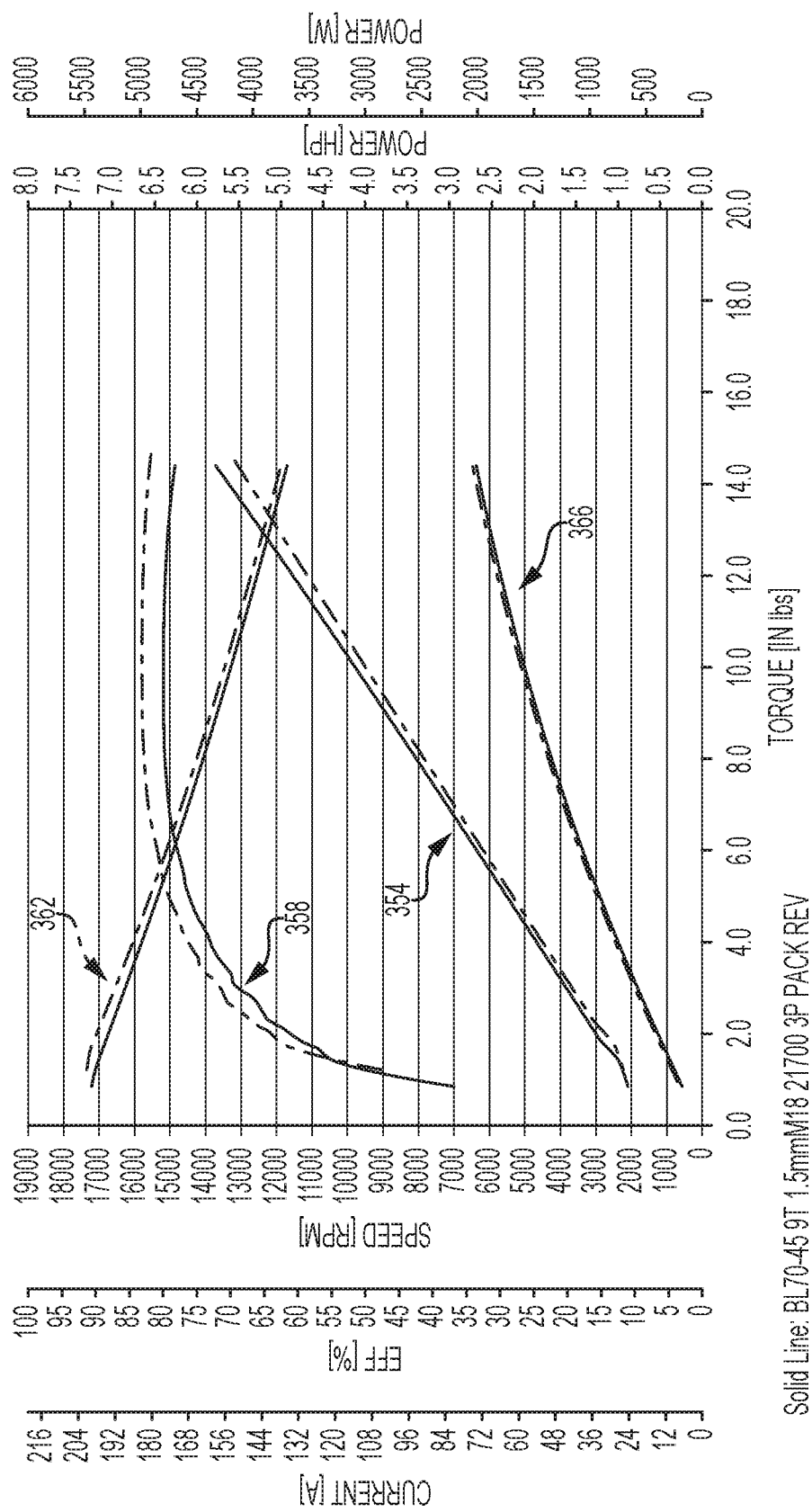
FIG. 28 is a graph of current, efficiency, speed, and power as a function of motor output torque for a high power tool system according to an embodiment of the invention.

With reference to FIG. 28, experimental results for current 354, efficiency 358, speed 362, and motor power output 366 are illustrated for the high power DC tool systems 14. The results are for forward and reverse operation of the high power DC tool system 14 with the diameter 240 of the stator 46 approximately 70 mm and the length 242 of the stator core 106 approximate 45 mm. In some embodiments, the peak power output of the motor assembly 26 (with the stator stack length 106 of approximately 45 mm) is within a range of approximately 2200 W to approximately 2600 W. In some embodiments, the peak power of the motor assembly 26 is approximately 2400 W during both forward operation (i.e., the green traces) and reverse operation (i.e., the red traces).

With reference to FIG. 1B, the combination 10 additionally includes a relay 398 in addition to the electronics assembly 22 and the motor assembly 26. The electronics assembly includes a motor controller 374, an inverter bridge 378, and a trigger assembly 382. As described above, with respect to FIGS. 3-7, the motor assembly 26 includes the motor 34 and the second PCB 252 including the Hall-effect sensor 292. The electronics assembly 22 may also include additional user inputs (not shown), for example, a mode selector switch, a speed dial, a clutch setting unit, etc. In some embodiments, the electronics assembly 22 may include a power switch (not shown) in addition to or in place of the trigger assembly 382.

In some embodiments, the motor controller 374 is implemented as a microprocessor with a separate memory. In other embodiments, the motor controller 374 may be implemented as a microcontroller (with memory on the same chip). In other embodiments, the motor controller may be implemented partially or entirely as, for example, a field programmable gate array (FPGA), an application specific integrated circuit (ASIC), hardware implemented state machine, etc., and the memory may not be needed or modified accordingly.

The motor controller 374 controls the operation of the motor 34 through the inverter bridge 378. With reference to FIG. 1B, the motor controller 374 is communicatively coupled to the trigger assembly 382 and the Hall-effect sensor 292. The trigger assembly 382 may include, for example, a potentiometer, a distance sensor, etc., to determine and provide an indication of the distance the trigger is pulled to the motor controller 374. The motor controller 374 determines a motor speed based on an input from the Hall-effect sensor 292. The motor controller 374 performs an open loop or closed loop control of the motor 34 through the inverter bridge 378 based on the signals received from the trigger assembly 382 and the Hall-effect sensor 292.

Figure 29:
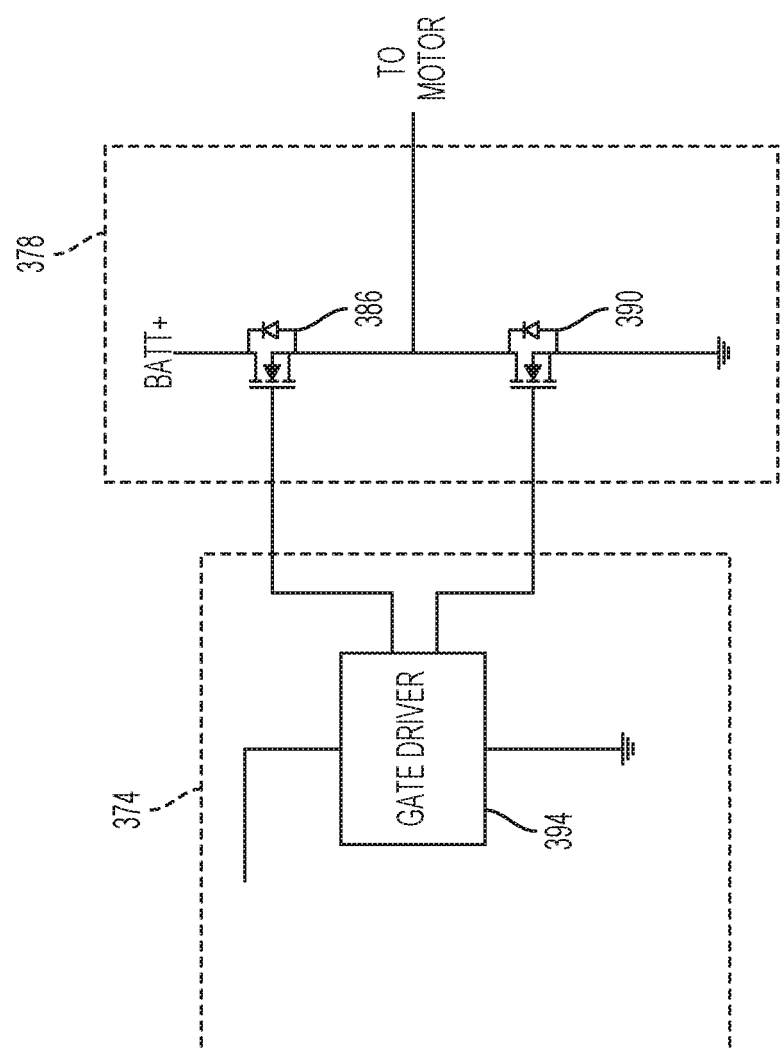
FIG. 29 is a block diagram of an inverter bridge of the electrical combination of FIGS. 1A-1B.

With reference to FIG. 29, the inverter bridge 378 controls the power supply to the three-phase (e.g., U, V, and W) motor 34 of the power tool 14. The inverter bridge 378 includes high-side FETs 386 and low-side FETs 390 for each phase of the motor 34. The high-side FETs 386 and the low-side FETs 390 are controlled by corresponding gate drivers 394 implemented in the motor controller 374.

In some embodiments, the inverter bridge 378 may include more than one high-side FET 386 and more than one low-side FET 390 per phase to provide redundant current paths for each phase. In addition, in some embodiments, the gate drivers 394 may be implemented on a separate integrated circuit provided on the inverter bridge 378. Although FIG. 29 illustrates only one set of a high-side FET 386 and a low-side FET 390, the inverter bridge 378 includes three sets of high-side FETs 386 and low-side FETs 390, one for each phase of the motor 34. In addition, the motor controller 374 includes three gate drivers 394, one for each phase of the motor 34.

The drain of the high-side FETs 386 is connected to the battery power supply, and the source of the high-side FETs 386 is connected to the motor 34 (e.g., phase coils 134 of the motor 34) to provide the battery power supply to the motor 34 when the high-side FETs 386 are closed. In other words, the high-side FETs 386 are connected between the battery power supply and the motor phase coils 134.

The drain of the low-side FETs 390 is connected to the motor 34 (e.g., phase coils 134 of the motor 34), and the source of the low-side FETs 390 is connected to ground. In other words, the low-side FETs 390 are connected between the motor phase coils 134 and ground. The low-side FETs 390 provide a current path between the motor phase coil and ground when closed.

When the FETs 386, 390 are closed (or ON), the FETs 386, 390 allow a current flow through the phase coils 134. In contrast, when the FETs 386, 390 are open (or OFF), the FETs 386, 390 prevent a current flow through the phase coils 134. The FETs 386, 390 of the illustrated constructions are characterized by relatively high drain-source breakdown voltage (e.g., between 30 V to 50 V), relatively high continuous drain current (e.g., between 300 A to 600 A), relatively high pulsed drain current (e.g., over 1200 A), and a drain-source on-state resistance between 0.3 mΩ and 0.9 mΩ.

In contrast, FETs used in existing power tools were not rated for such high voltage and current characteristics. Accordingly, such existing power tools would not be capable of handling such high current and voltage characteristics. In addition, FETs used in the existing power tools were driven with lower current. As such, FETs having an internal resistance below 1.5 mΩ could not be used in existing power tools to drive the motor. Because the FETS 386, 390 have relatively small resistance compared to FETs of existing power tools, the heat dissipation by the inverter bridge 378 is significantly reduced.

The gate drivers 394 provide a gate voltage to the FETs 386, 390 to control the FETs 386, 390 to open or close. The gate drivers 394 receive a power supply (e.g., a low-voltage power supply) from the battery pack 18. In some embodiments, the motor controller 374 and the gate drivers 394 may control only the low-side FETs 390 to operate the motor 34. In other embodiments, the motor controller 374 and the gate drivers 394 may control only the high-side FETs 386 to operate the motor 34. In yet other embodiments, the motor controller 374 and the gate drivers 394 alternate between controlling the high-side FETs 386 and the low-side FETs 390 to operate the motor 34 and to distribute the thermal load between the FETs 386, 390.

In some embodiments, the inverter bridge 378 may also include a current sensor (not shown) provided in the current path to detect a current flowing to the motor 34. The output of the current sensor is provided to the motor controller 374. The motor controller 374 may control the motor 34 further based on the output of the current sensor.

As described above, the relay 398 is provided between the battery pack 18 and the electronics assembly 22. When the relay 398 is closed, the relay 398 allows a current to flow through to the electronics assembly 22, and, when the relay 398 is open, the relay 398 prevents a current from flowing to the electronics assembly 22. The relay 398 provides an under-voltage protection to the FETs 386, 390 and may also prevent a current flow through to the FETs 386, 390 in a failure condition of the motor controller 374. The relay 398 may include an electromechanical relay or a semiconductor based solid state relay.

The relay 398 is controlled by the motor controller 374 and the trigger assembly 382. For example, the relay 398 may include a logic circuit (not shown) that receives an input from the motor controller 374 and the trigger assembly 382. The relay 398 may close to allow a discharging current to flow through only when both inputs are high. That is, the relay 398 may close only when the trigger is actuated, the motor controller 374 is functioning, and the motor controller 374 indicates there are no faults in the power tool 14. The relay 398 may open when either of the inputs is low. For example, the relay 398 may prevent a discharging current to flow through when either the trigger is not actuated, when the motor controller 374 has failed, or when the motor controller 374 indicates a fault condition in the power tool 14.

In some embodiments, the motor controller 374 performs a FET check at the start of every trigger pull. The motor controller 374 successively turns on each FET 386, 390 to ensure all FETs 386, 390 are functioning. When the motor controller 374 detects that all FETs 386, 390 are functioning, the motor controller 374 continues normal operation of the power tool 14. When the motor controller 374 detects that one of the FETs 386, 390 has failed, the motor controller 374 may temporarily or permanently disable the power tool 14 to prevent the operation of the power tool 14.

Figure 30:
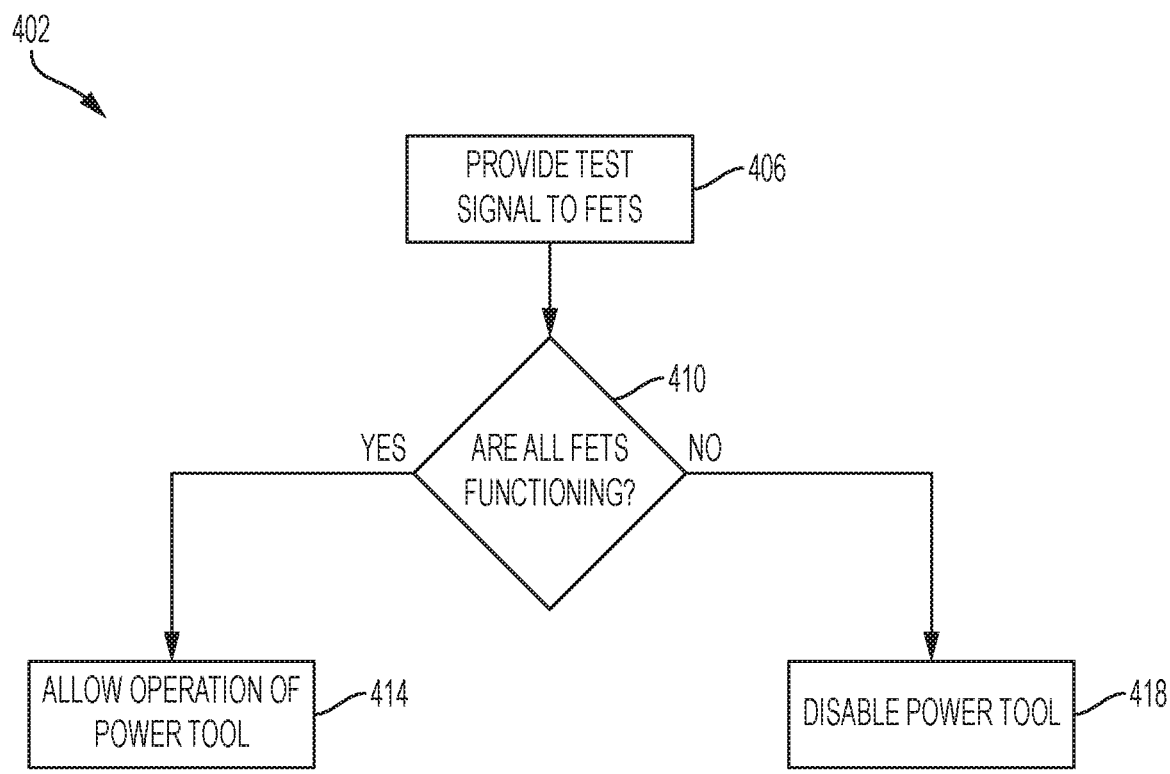
FIG. 30 is a flowchart of a method of checking FETs of the electrical combination of FIGS. 1A-1B.

FIG. 30 is a flowchart illustrating one example method 402 of checking FETs 386, 390. The method 402 includes providing a test signal to the all the FETs 386, 390 (at block 406). As described above, the motor controller 374 successively turns on each FET 386, 390. The method 402 also includes determining whether all the FETs 386, 390 are functioning (at block 410). The motor controller 374 determines whether the FETs 386, 390 are functioning or have failed based on the test signals. For example, the motor controller 374 may monitor an input and output of the FETs 386, 390 to determine whether the FETs 386, 390 are functioning when the test signal is provided.

When the motor controller 374 determines that all FETs 386, 390 are functioning, the motor controller 374 allows an operation of the power tool 14 (at block 414). For example, the motor controller 374 continues to provide a high signal to the relay 398 to allow normal operation of the power tool 14. When the motor controller 374 determines that at least one of the FETs 386, 390 has failed, the motor controller 374 disables the power tool 14 (at block 418). The motor controller 374 may temporarily or permanently disable the power tool 14. For example, the motor controller 374 provides a low signal to the relay 398 to prevent a discharge current from flowing to the FETs 386, 390.

Existing power tools rely on stall current to limit the current drawn by the power tool 14. However, in the illustrated constructions, because the current flowing through the FETs 386, 390 is higher in the illustrated power tools 14 and the impedance offered by the FETs 386, 390 (and by other components in the system 10, especially the battery pack 18 and the motor 34) is lower, stall current can no longer be relied upon because the higher current may cause the FETs 386, 390 to fail. Accordingly, a hysteretic current control is used to limit current consumption of the power tool 14. In short, the motor controller 374 reduces the PWM cycle to the FETs 386, 390 when the current exceeds a predetermined threshold.

Figure 31A:
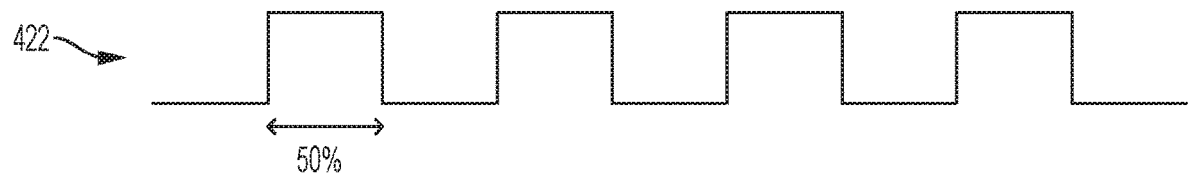
FIGS. 31A-31C illustrate timing diagrams of a voltage signal provided to the inverter bridge of FIG. 29.
Figure 31B:
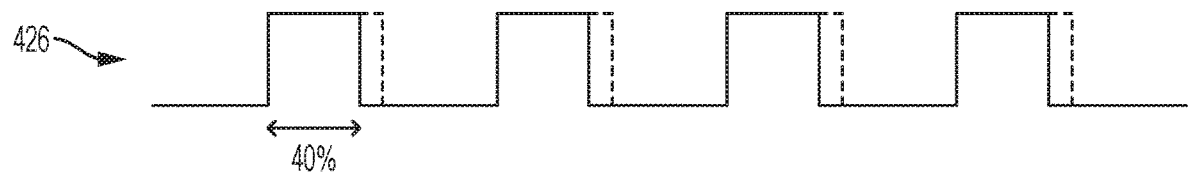
Figure 31C:
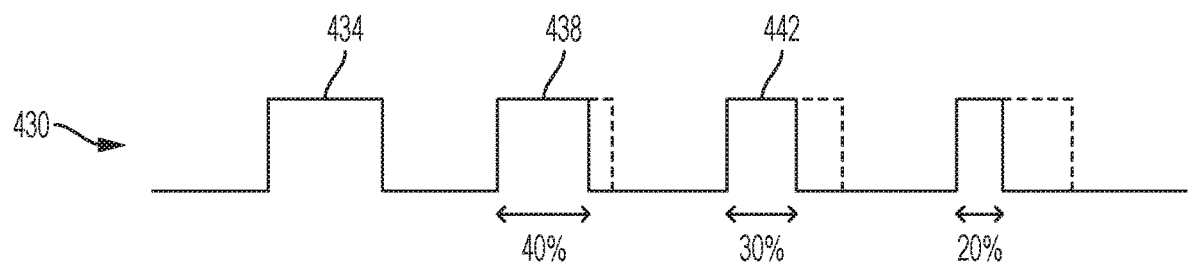

FIGS. 31A-31C illustrates a timing diagram of a voltage signal provided to the inverter bridge 378. FIG. 31A shows a PWM signal 422 during a normal operation of the power tool 14. As can be seen, the PWM signal 422 provided to the inverter bridge has a constant duty cycle (e.g., 50%). In some embodiments, the duty cycle of the PWM signal 422 may vary with the distance the trigger is pulled.

FIG. 31B shows a PWM signal 426 during a hysteretic current control operation of the power tool 14. When the motor controller 374 determines that a current flowing (or to flow) to the motor 34 exceeds a predetermined current threshold, the motor controller 374 varies (e.g., reduces) the duty cycle of the PWM signal 426 to limit the current. For example, the motor controller 374 may decrease the duty cycle to 40%. The motor controller 374 may return to normal operation when the current is within a normal range.

FIG. 31C shows a PWM signal 430 during the hysteretic current control operation when the motor controller 374 controls the duty cycle as a function of the current. For example, for each positive voltage signal of the PWM signal 434, the motor controller 374 turns the voltage signal off when the current exceeds the predetermined threshold. Accordingly, each subsequent positive voltage signal may have a different duty cycle. For example, the first positive voltage signal 434 may have a 50% duty cycle when the current does not exceed the predetermined threshold. For the second positive voltage signal 438, the motor controller 374 may turn off the signal once the current exceeds the predetermined threshold, which may result in, for example, an 40% duty cycle. Similarly, for a third positive voltage signal 442, the duty cycle may be further reduced to 30% based on the current exceeding the predetermined threshold earlier.

Figure 32:
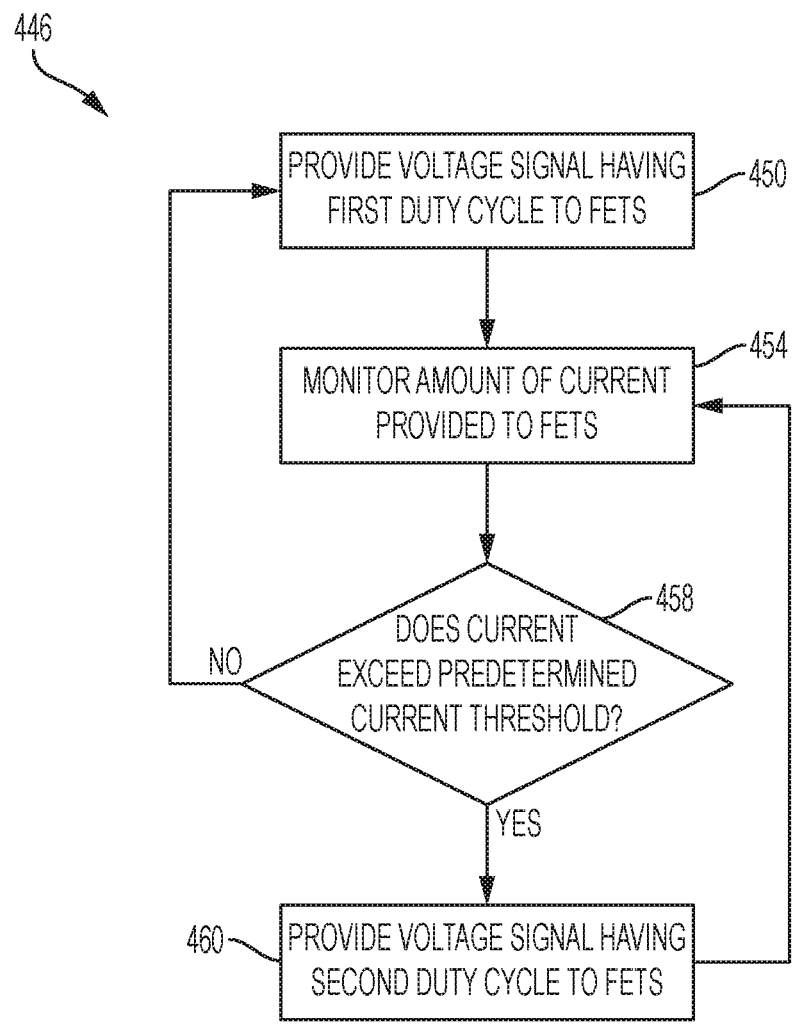
FIG. 32 is a flowchart of a method of hysteretic current control.
Figure 33:
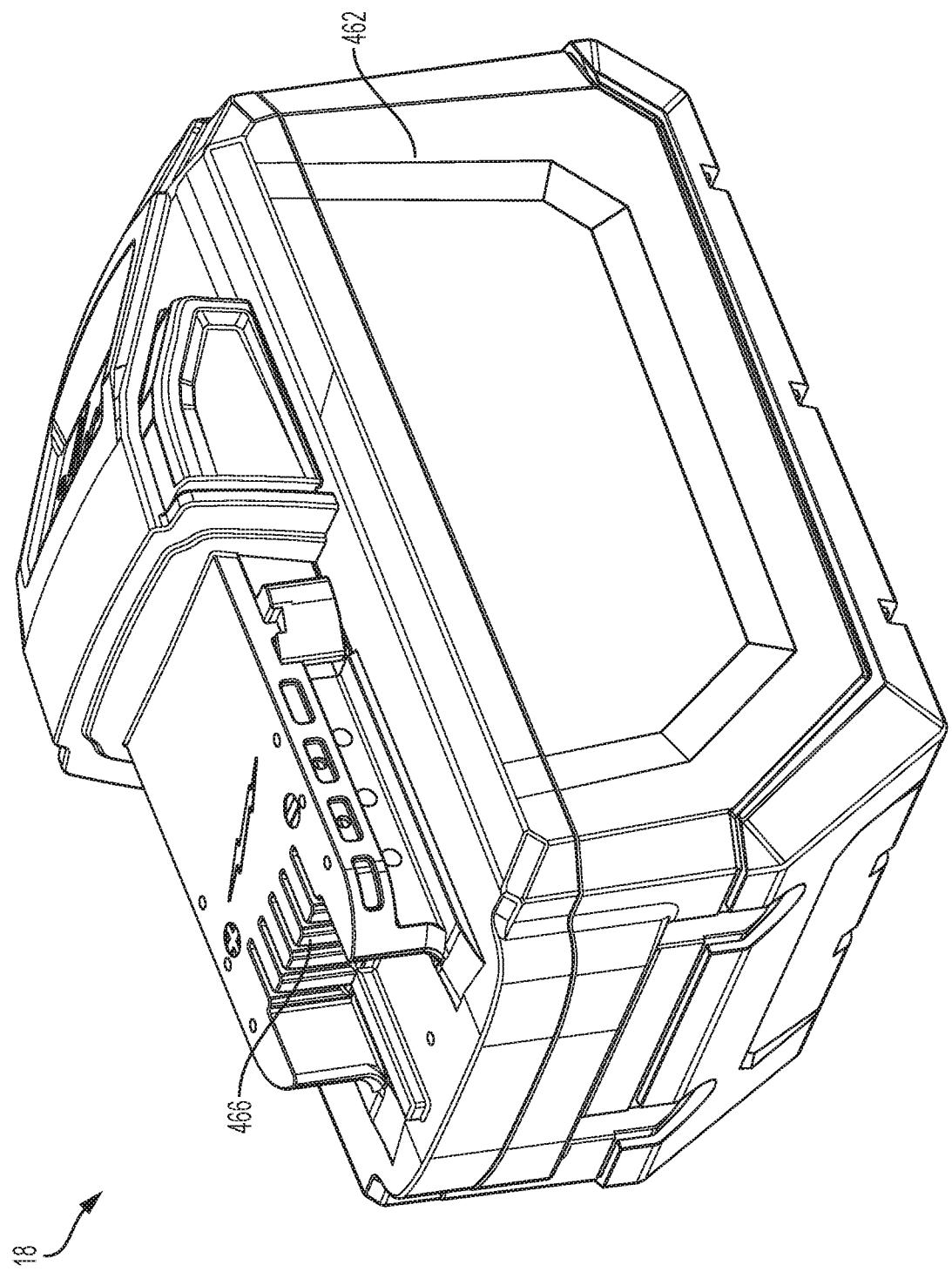
FIG. 33 is a top perspective view of the battery pack of FIG. 2A in accordance with some embodiments.
Figure 34:
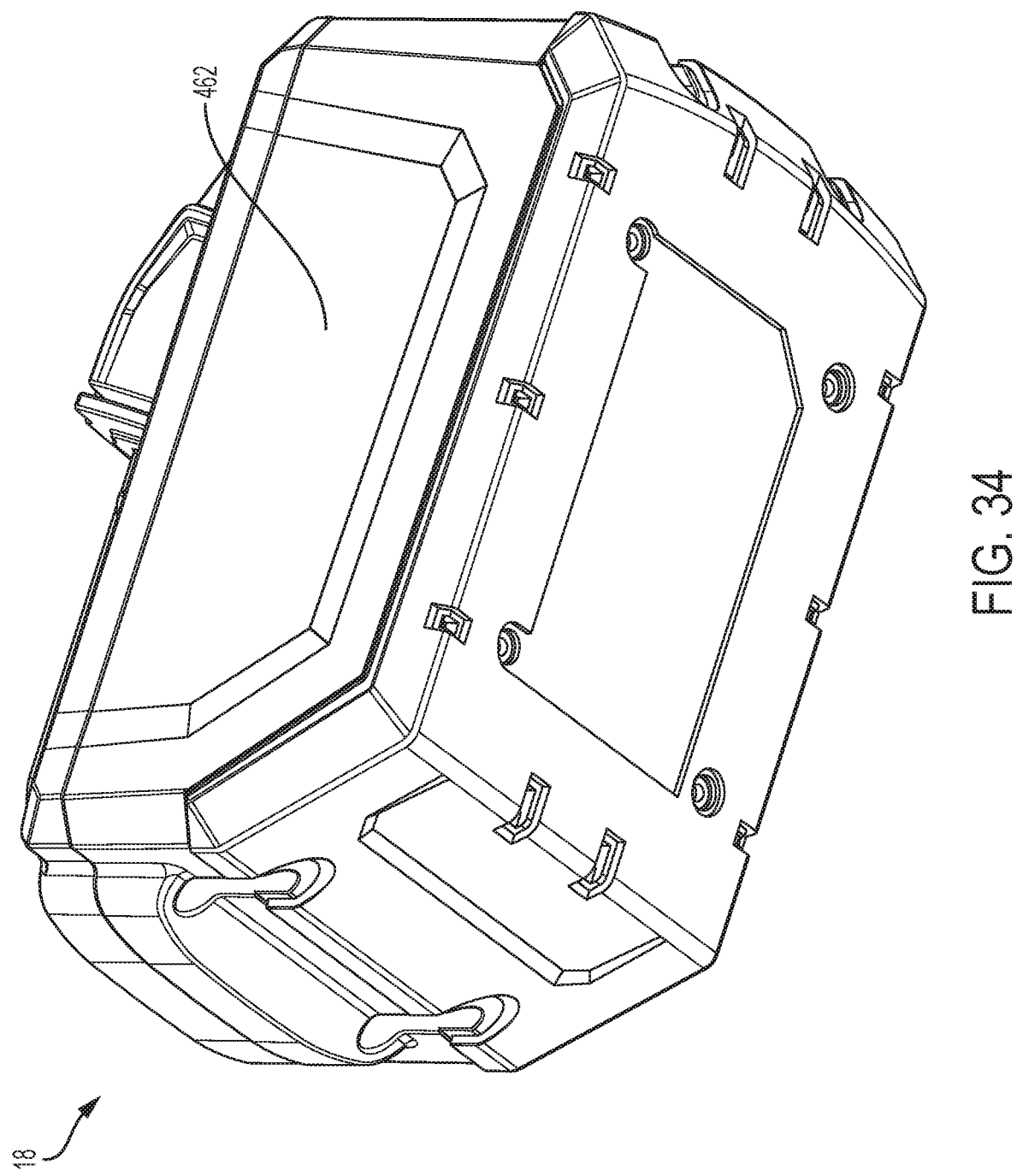
FIG. 34 is a bottom perspective view of the battery pack of FIG. 33.
Figure 35:
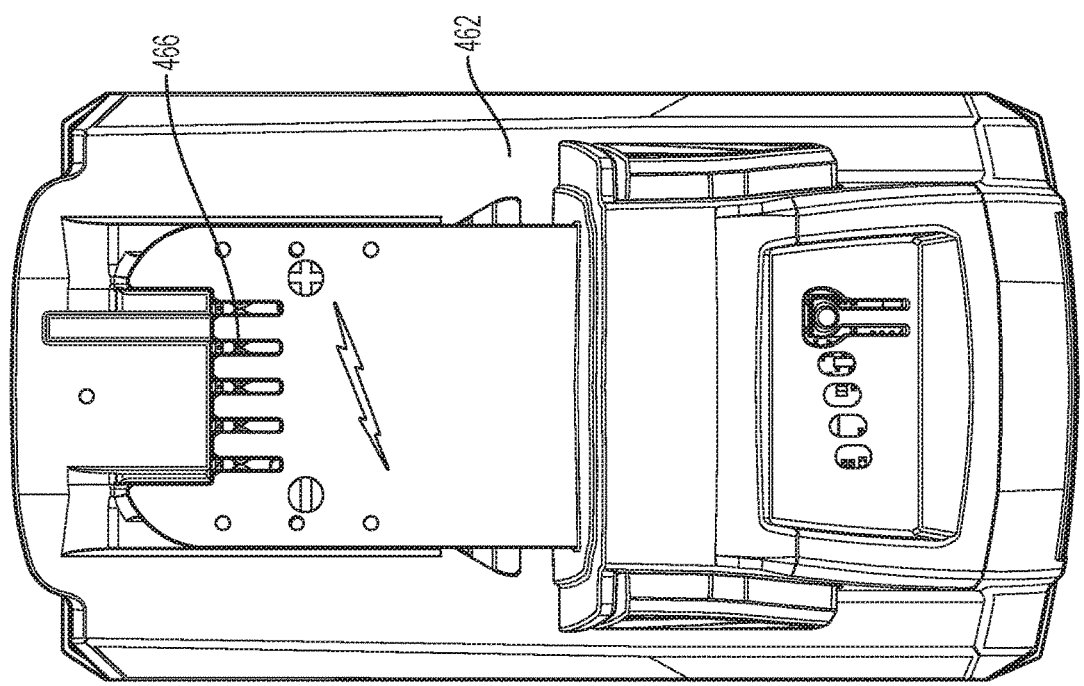
FIG. 35 is a top plan view of the battery pack of FIG. 33.
Figure 36:
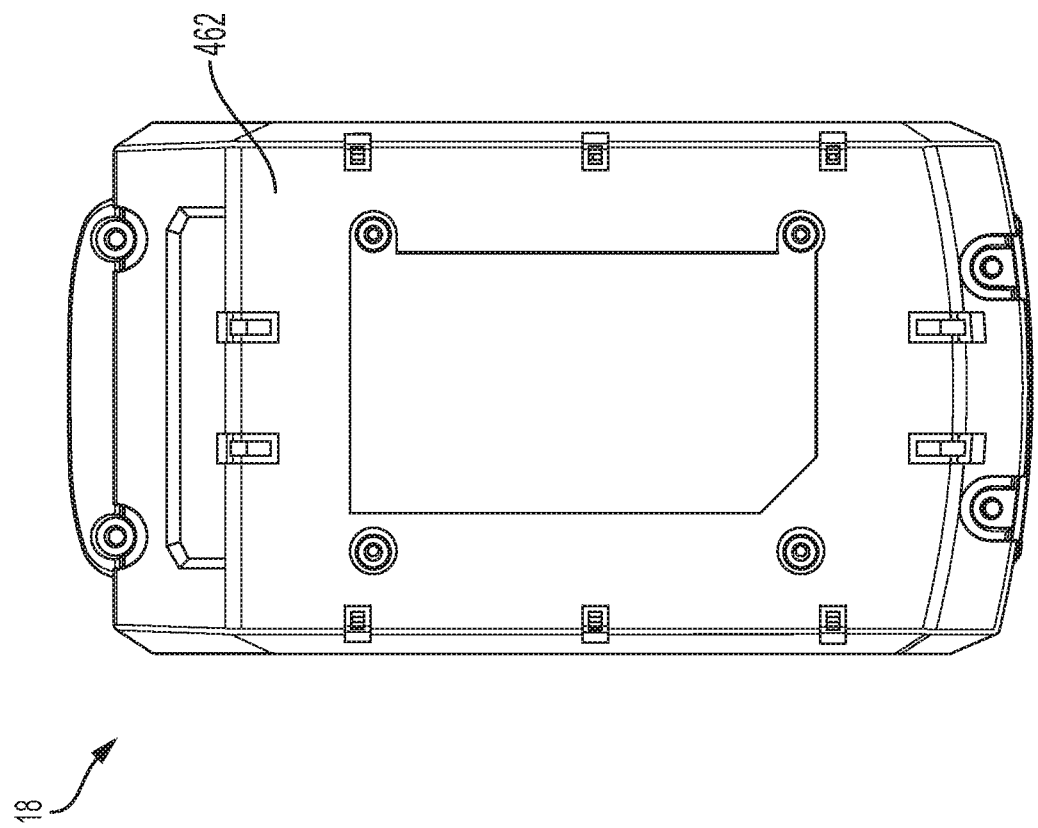
FIG. 36 is a bottom plan view of the battery pack of FIG. 33.

FIG. 32 is a flowchart illustrating one example method 446 of hysteretic current control. The method 446 includes providing a voltage signal having a first duty cycle to the FETs 386, 390 (at block 450). As described above, the first duty cycle may be 100% or may be in proportion to the distance to which the trigger is pulled. The method 446 also includes monitoring the current provided to the FETs 386, 390 (at block 454). The monitored current may be an instantaneous current, a slow moving current average, a fast moving current average, etc. The method 446 further includes determining whether the current is above a predetermined current threshold (at block 458). In some embodiments, the predetermined current threshold is within the range of approximately 140 A to 280 A.

When the current exceeds the predetermined current threshold, the method 446 includes providing a voltage signal having a second duty cycle, lower than the first duty cycle, to the FETs (at block 460). As described above, the duty cycle may be reduced as a function of the current. For example, the duty cycle may be reduced to 80% or 60% of the duty cycle in proportion to the distance to which the trigger is pulled. When the current does not exceed the predetermined threshold, the method 426 continues providing the voltage signal having the first duty cycle to the FETs 386, 390. In addition, the method 426 continues to monitor the amount of current provided to the FETs 386, 390.

The relay 398 and the inverter bridge 378 define power electronics of the power tool 14. A printed circuit board including the motor controller 374 defines control electronics of the power tool 14. The power electronics and the control electronics may be distributed within the power tool housing. The printed circuit board including the motor controller 374 defines a length within a range of approximately 40 mm to approximately 60 mm, a width within a range of approximately 25 mm to approximately 40 mm, and a height (including of all fixed non-wire components) within a range of approximately 5 mm to approximately 15 mm. The printed circuit board including the motor controller 374 defines an area within a range of 1000 mm² to 2400 mm² and a volume within a range of approximately 5000 mm³ to approximately 36000 mm³.

The relay 398 (not including the plugs) defines a length within a range of approximately 45 mm to 65 mm, a width within a range of approximately 30 mm to 50 mm, and a volume within the range of 54,000 mm³ and 180,000 mm. Put together, the power electronics have an area within the range of approximately 5200 mm² to approximately 10,500 mm². Put together, the power electronics have a volume within the range of approximately 48,500 mm³ to approximately 150,000 mm³.

In some embodiments, 10-gauge wire is used to connect the power source to the inverter bridge 378. 10-gauge wire offers improved thermal load capabilities.

FIGS. 33-62 illustrate several embodiments of the battery pack 18. With reference to FIGS. 33-42, a battery pack 18 having a 5S3P configuration (a set of 5 cells in series, 3 sets in parallel) is illustrated in accordance with some embodiments. The battery pack 18 includes a battery pack housing 462 and a terminal block 466 provided on the battery pack housing 462. The battery pack housing 462 encloses the components of the battery pack 18 including battery cells, a battery controller, etc. When the battery pack 18 is attached to the power tool 14, the terminal block 466 is coupled to a terminal block (not shown) of the power tool 14. The battery pack 18 provides discharge current to the power tool 14 through the terminal block 466.

With reference to FIGS. 43-52, a battery pack 18A having a 5S2P configuration is illustrated in accordance with some embodiments. With reference to FIGS. 53-62, a battery pack 18B having a 5S1P configuration is illustrated in accordance with some embodiments.

Figure 63:
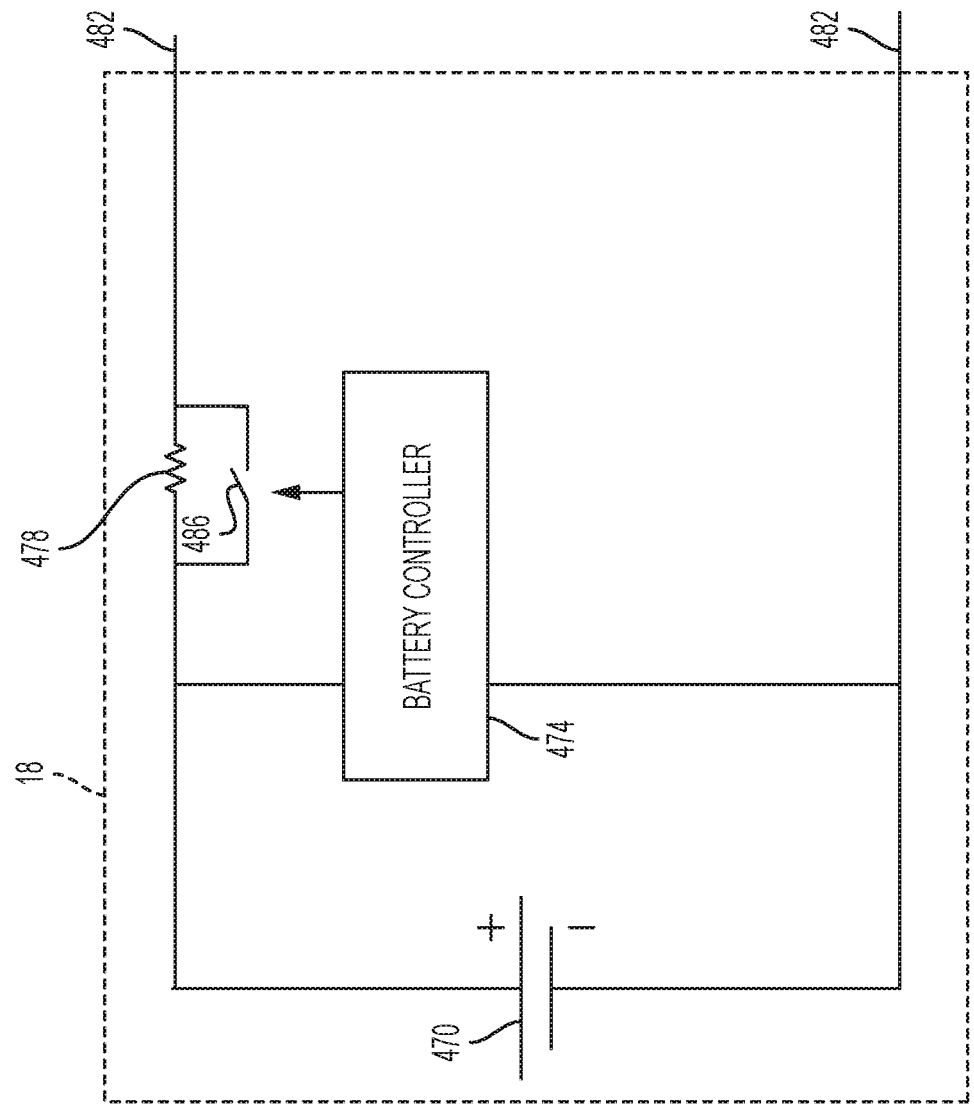
FIG. 63 is a block diagram of the battery pack of FIG. 2A.

FIG. 63 is a simplified block diagram of the battery pack 18. The battery pack 18 includes the battery cells 470, a battery controller 474, a resistor 478, and battery pack terminals 482. The battery controller 474 may be implemented in ways similar to the motor controller 374. The battery controller 474 communicates with the motor controller 374 through the terminal block 466.

The battery pack 18 may include one or more battery cell strings connected in parallel, each having a number (e.g., five or more) of battery cells connected in series to provide a desired discharge output (e.g., nominal voltage (e.g., between about 16V and about 20V) and current capacity). Accordingly, the battery pack 18 may include "5S1P" (see FIGS. 53-62), "5S2P" (see FIGS. 43-52), "5S3P" (see FIGS. 33-42), etc., configurations. In other embodiments, other combinations of battery cells 470 are also possible.

Each battery cell 470 may have a nominal voltage between 3 V and 5 V and may have a nominal capacity between 3 Ah and 5 Ah. The battery cells 470 may be any rechargeable battery cell chemistry type, such as, for example, Lithium (Li), Lithium-ion (Li-ion), other lithium-based chemistry, nickel-cadmium (NiCd), nickel-metal hydride (NiMH), etc.

The battery pack 18 provides relatively higher current than existing battery packs. However, this higher current output may damage a motor controller during a start-up time of the power tool 14. To prevent this damage to the motor controller, the battery pack 18 includes the resistor 478 to initially provide a reduced current at start up. The battery pack 18 provides two current paths to the battery pack terminals 482.

Figure 73:
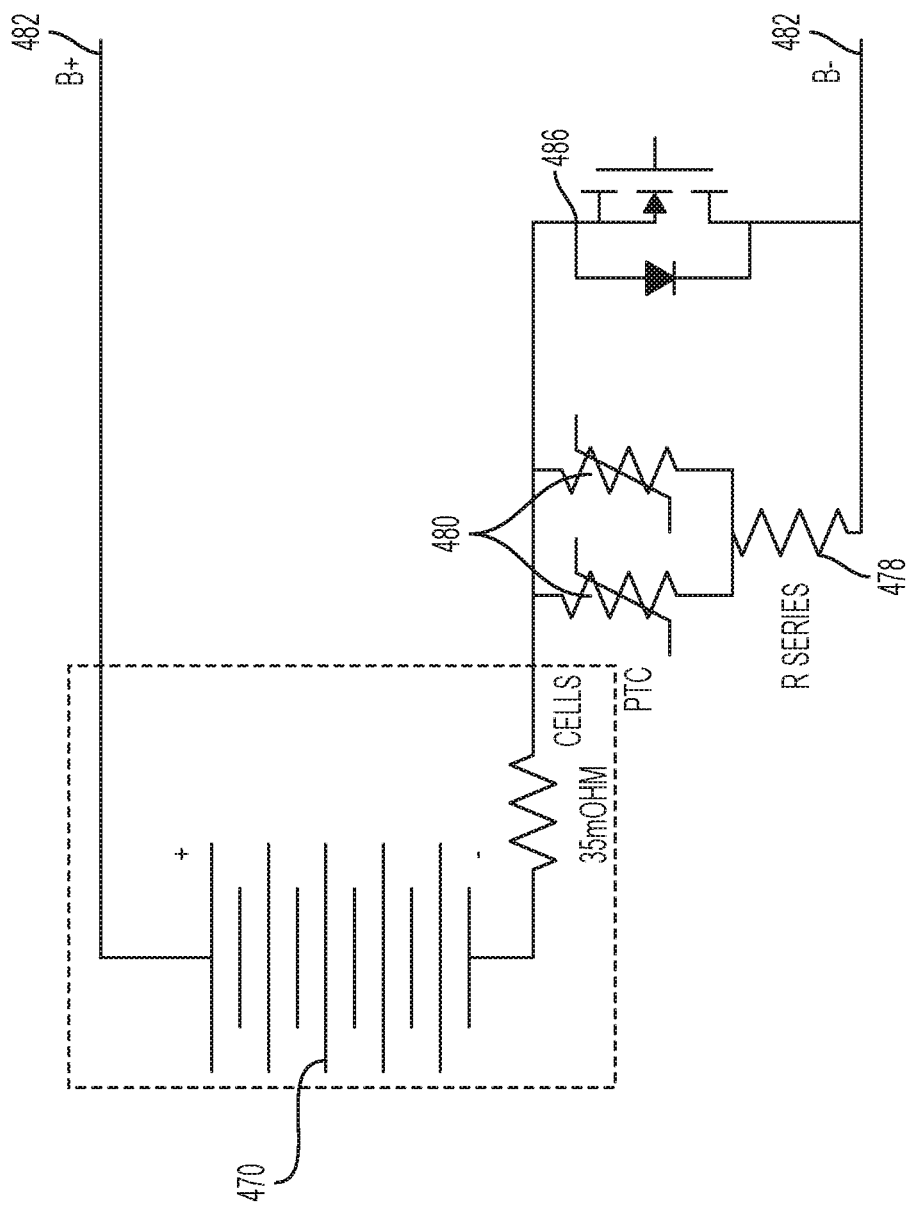
FIG. 73 is a block diagram of a connection between battery cells and battery pack terminals of the battery pack of FIG. 2A.

FIG. 73 is a block diagram showing the two paths between the battery cells 470 and the battery pack terminals 482. In the first current path, the battery cells 470 are connected to the battery pack terminals 482 through the resistor 478 and positive thermal coefficient (PTC) elements 480 (FIG. 64A). The resistor 478 is a high-resistance resistor used to reduce the amount of current flow in the first current path. Each PTC element 480 is a temperature-dependent resistor, the resistance of which increases as its temperature increases. Accordingly, if the connection between the battery cells 470 and the battery pack terminals 482 is shorted for a period of time (e.g., due to a malfunction) causing the current to flow though the PTC elements 480 and produce heat, the resistance of the PTC elements 480 will increase until the PTC elements 480 essentially act as an open circuit to prevent the battery pack 18 and/or the power tool 10 from overheating.

In the second path, the battery cells 470 are connected to the battery pack terminals through a switch 486 (FIG. 64B). The switch 486 may be implemented as a bi-polar junction transistor (BJT), a field effect transistor (FET), etc., having a lower resistance than the resistor 478. The battery controller 474 provides the control signals to open or close the switch 486. When the battery pack 18 is coupled to the power tool 10 and the trigger is not pulled and/or for a brief period of time after the trigger is pulled, the switch 486 acts as an open circuit, and current is delivered through the resistor 478 and the PTC elements 480 to power the power tool electronics without causing overheating. Alternatively, when the trigger is pulled and/or after the brief period of time after the trigger is pulled, the transistor acts as a short circuit, with the current from the battery cells 470 bypassing the resistor 478 and the PTC elements 480 to provide power to the power tool 10.

FIG. 65 is a flowchart of one example method 490 of operating the battery pack 18. The method 490 includes connecting the resistor 478 in a current path of the battery pack 18 (at block 494). In operation, upon insertion of the battery pack 18 (or after the battery pack 18 has been idle on the power tool 10), the resistor 478 is connected between the battery cells 470 and the battery pack terminals 482 by opening the switch 486. Accordingly, due to the higher resistance of this path, the battery pack 18 provides reduced current to start-up the power tool and the motor controller.

The method 490 also includes determining that a predetermined amount of time has elapsed after a trigger activation (at block 498) and removing the resistor 478 from the current path when the predetermined amount of time has elapsed after the trigger activation (at block 502). When the trigger is pulled and after a predetermined time period (e.g., 1-2 ms), the switch 486 is closed to short out the resistor 478 of the current path. Due to the lower resistance of this path, the battery pack 18 provides high current to operate the power tool 14.

Figure 77:
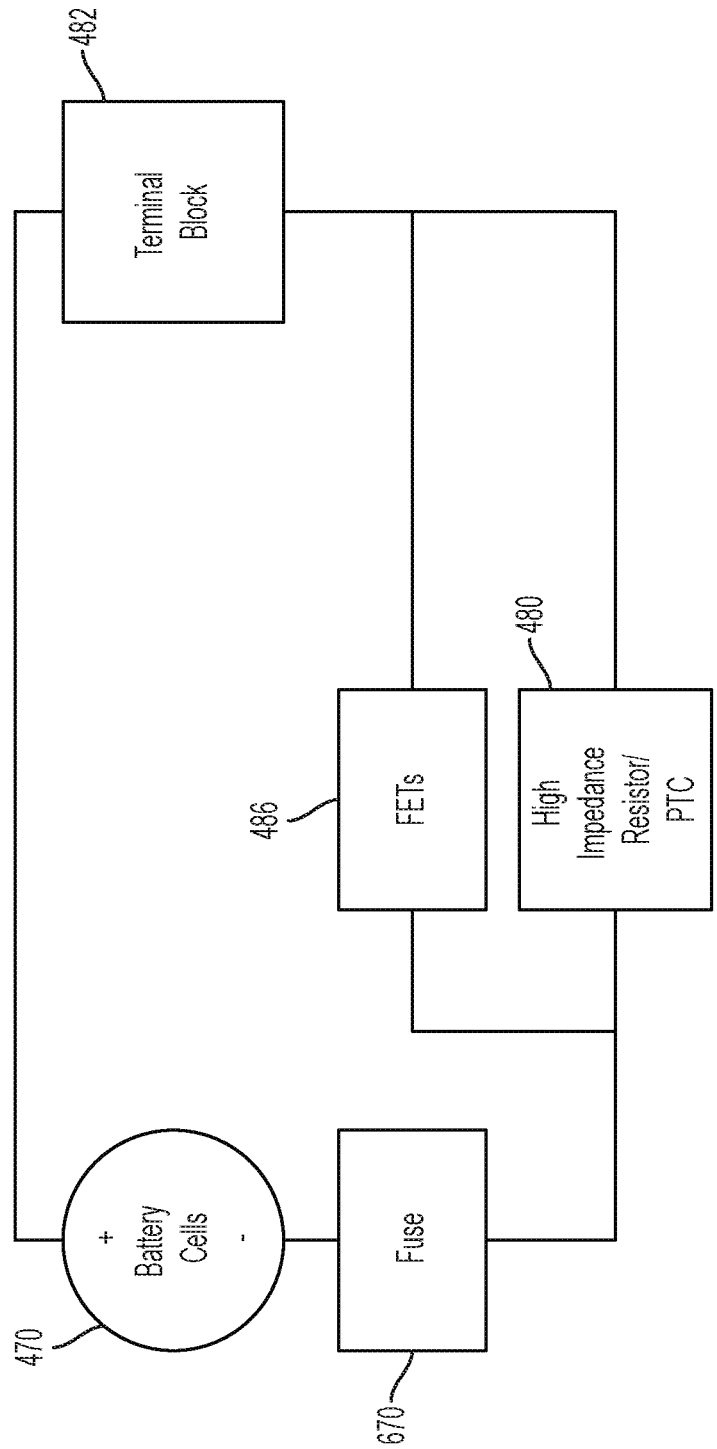
FIG. 77 is a block diagram of a connection between battery cells and battery pack terminals of the battery pack of FIG. 2A.
Figure 78:
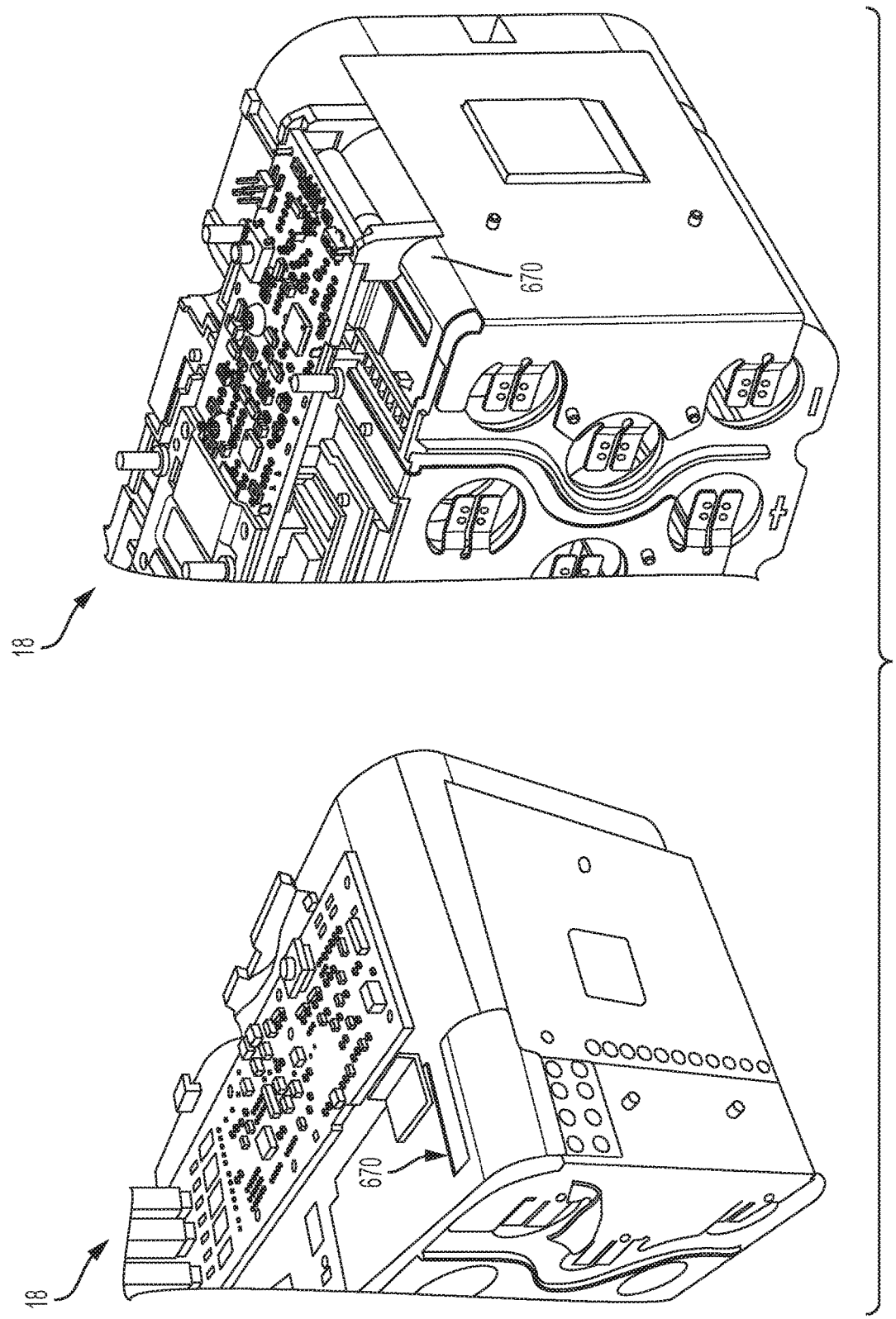
FIG. 78 is a perspective view of the battery pack of FIG. 2A illustrating a fuse connected to the negative terminals of battery cells.

In some embodiments, additionally or alternatively, protection may be provided to the battery pack 18 by using a fuse in the current path of the battery pack 18. Referring to FIG. 77, a fuse 670 is coupled between the negative terminals of the battery cells 470 and the terminal block 482. The fuse 670 may be a Copper alloy such as a FAS 680 Copper-Tin alloy or an EFTEC copper alloy that is conducive to welding and has high thermal and electrical conductivity. As shown in FIG. 78, the fuse 670 may be welded or soldered to the bus bar connecting the negative terminals of the battery cells 470. The fuse 670 is connected to the circuit board including the resistor 478, the PTC elements 480, and the switch 482.

The bus bar connecting the positive terminals of the battery cells 470 is provided underneath the battery pack terminals 482, while the negative terminals of the battery cells 470 are provided on the opposite side of the battery pack 18 from the battery pack terminals 482. The negative side of the battery pack 18 also has a large sense resistor and a heat sink (e.g., copper) for the FET. Placement of the fuse 670 on the negative side of the battery cells 470 thus allows heat generated during a hard short (e.g., 80 milliohms and below) of the fuse 670 to sink into the heat sink and to be isolated from the battery pack terminals 482.

In some embodiments, the battery pack terminals 482 may be placed closer to the bus bar connecting the negative terminals of the battery cells 470 and on the opposite side of the battery pack 18 from the positive terminals of the battery pack 18. In these embodiments, the fuse 670 may be connected to the positive terminals of the battery cells 470.

Figure 66:
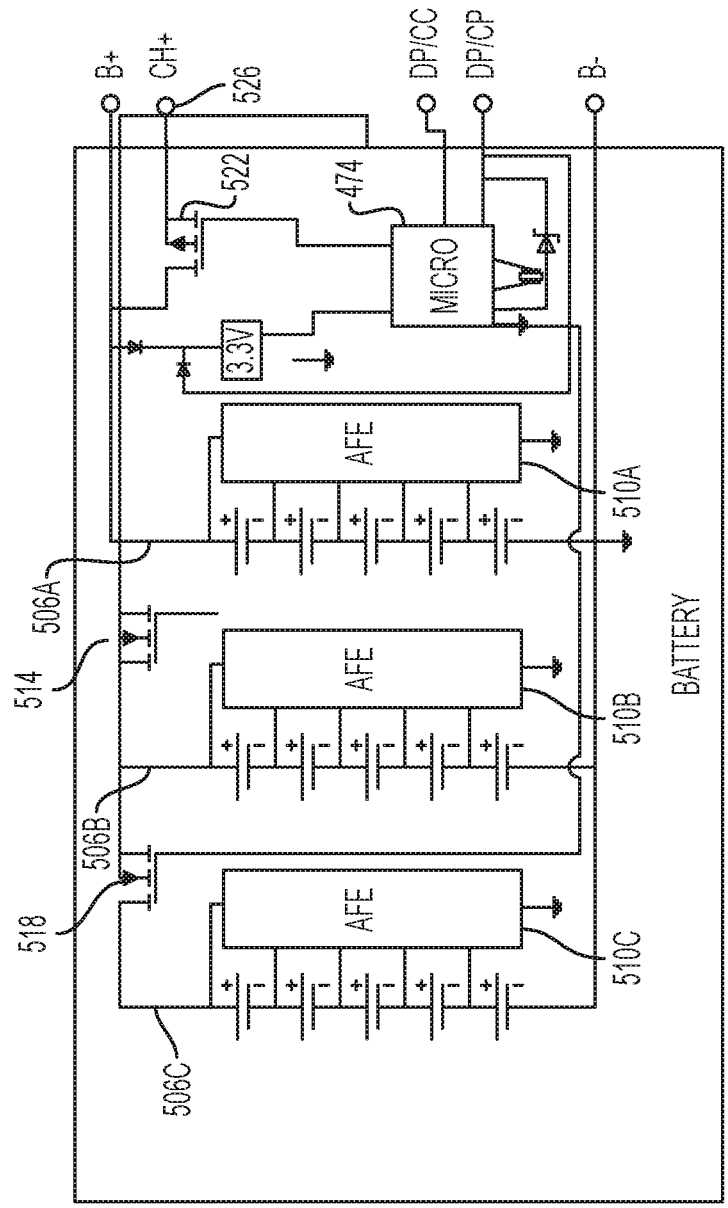
FIG. 66 is a block diagram of the battery pack of FIG. 33 according to one embodiment.

In some embodiments, the power tool 14 may implement a cell string switching mechanism to limit damage to the motor controller due to higher current. FIG. 66 is a simplified block diagram of one example of a 5S3P configuration of the battery pack 18.

In the illustrated construction, the battery pack 18 includes three cell strings 506A-506C of five series connected battery cells. Each cell string 506A-506C is individually monitored by one of analog front ends 510A-510C. The second cell string 506B and the third cell string 506C are connected to the battery pack terminals 482 through a first switch 514 and a second switch 518 respectively.

When closed, the first switch 514 connects the second cell string 506B to the battery pack terminals 482 and, when open, disconnects the second cell string 506B from the battery pack terminals 482. Similarly, when closed, the second switch 518 connects the third cell string 506C to the battery pack terminals 482 and, when open, disconnects the third cell string 506C from the battery pack terminals 482 when open. The first switch 514 and the second switch 518 are controlled to open and close by the battery controller 474.

In some embodiments, a discharging switch (not shown) may be connected in a discharging path of the battery pack 18 between the cell strings 506A-506C and the battery pack terminals 482. In addition, the battery pack 18 may also include a charging switch 522 connected between the cell strings 506A-506C and a charging terminal 526 of the battery pack 18.

Figure 67:
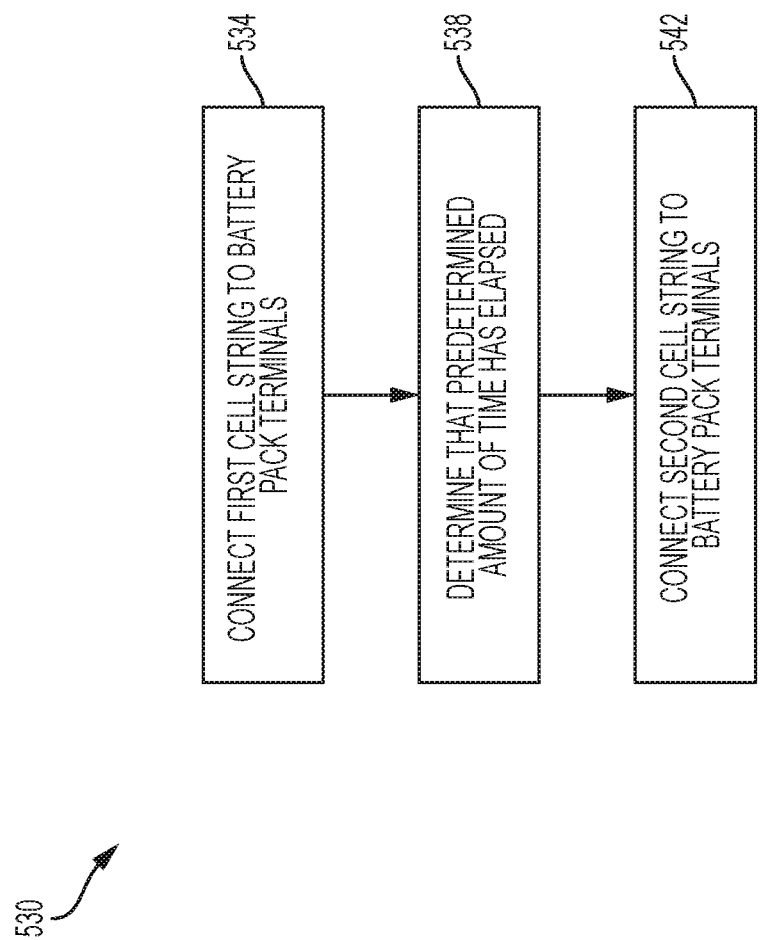
FIG. 67 is a flowchart of a method of switching cell strings of the battery pack of FIG. 66.

FIG. 67 is a flowchart of a method 530 of switching cell strings 506A-506C according to one embodiment. The method 530 includes connecting, using the battery controller 474, a first cell string 506A to the battery pack terminals 482 during start-up (at block 534). For example, the battery controller 474 opens the first switch 514 and the second switch 518 and closes the discharging switch to connect only the first cell string 506A to the power tool 14 and, thus, provide a reduced current to power up the motor controller.

The method 530 also includes determining that a predetermined amount of time has elapsed (at block 438) and connecting the second cell string 506B when the predetermined amount of time has elapsed (at block 542). The battery controller 474 may start a timer after start-up and when the timer expires (e.g., after 200 ms), the battery controller 474 may close the first switch 514 and the second switch 518 to connect the second cell string 506B and the third cell string 506C to the battery pack terminals 482. The battery controller 474 may close the first switch 514 and the second switch 518 around the same time or may close the second switch 518 a second predetermined amount of time after closing the first switch 514.

Figure 68:
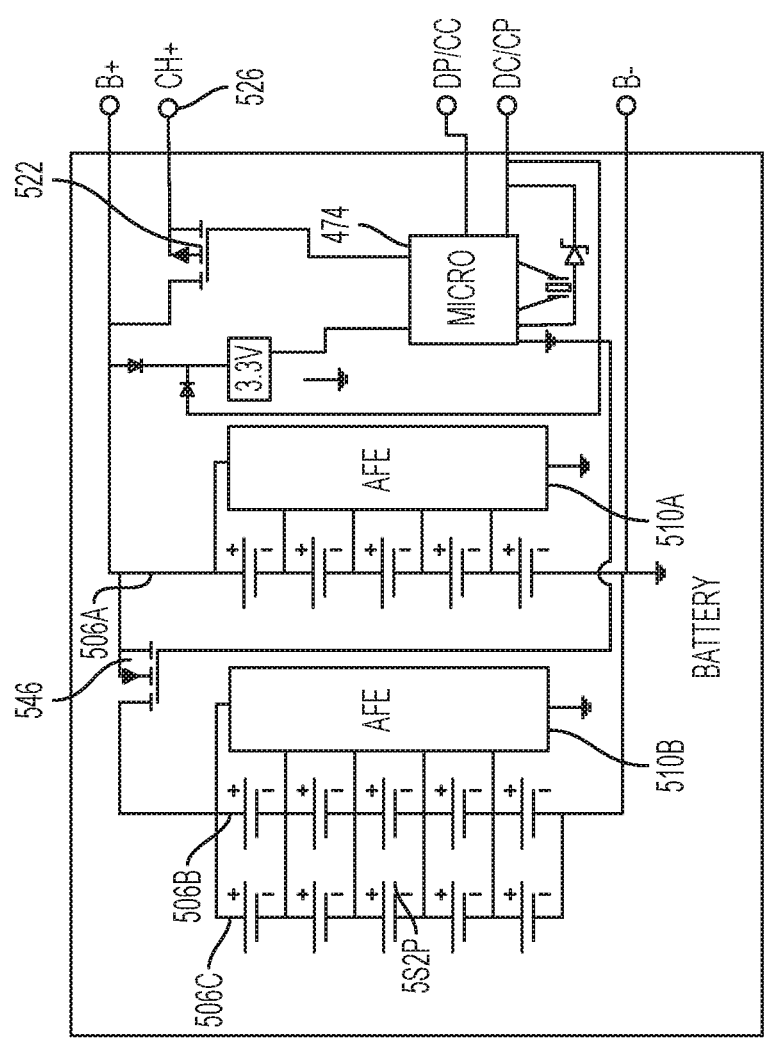
FIG. 68 is a block diagram of the battery pack of FIG. 33 according to one embodiment.

FIG. 68 is a simplified block diagram of another example of a 5S3P configuration of the battery pack 18. In the example illustrated, the first cell string 506A is monitored by the first analog front end 510A, and the second cell string 506B and the third cell string 506C are monitored by the second analog front end 510B, thereby reducing the number of analog front ends 458. The second cell string 506B and the third cells string 510C are connected to the battery pack terminals 482 through a first switch 546. When closed, the first switch 546 connects the second cell string 506B and the third cell string 506C to the battery pack terminals 482 and, when open, disconnects the second cell string 506B and the third cell string 506C from the battery pack terminals 482. The first switch 546 is controlled to open and close by the battery controller 474.

Figure 69:
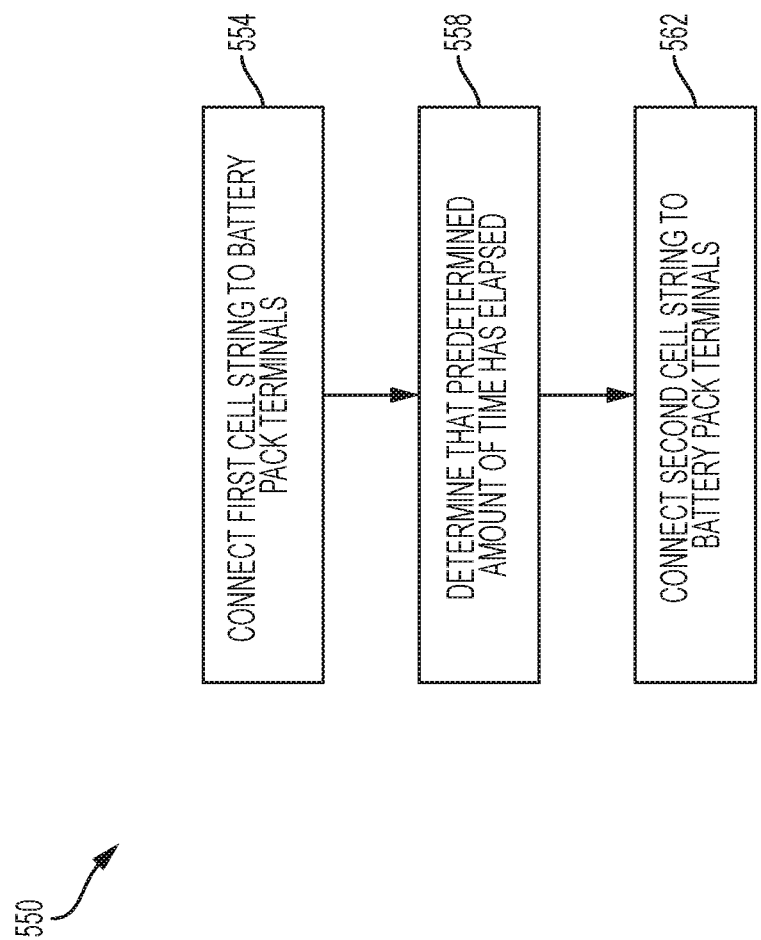
FIG. 69 is a flowchart of a method of switching cell strings of the battery pack of FIG. 68.

FIG. 69 is a flowchart of a method 550 of switching cell strings 506A-506C according to another embodiment. The method 550 includes connecting, using the battery controller 474, a first cell string 506A to the battery pack terminals 482 during start-up (at block 554). For example, the battery controller 474 opens the first switch 546 and closes the discharging switch to connect only the first cell string 506A to the power tool 10 and provide a reduced amount of current to power up the motor controller 374.

The method 550 also includes determining that a predetermined amount of time has elapsed (at block 558) and connecting the second cell string 506B when the predetermined amount of time has elapsed (at block 562). The battery controller 474 may start a timer after start-up and when the timer expires (e.g., after 200 ms), the battery controller 474 may close the first switch 546 to connect the second cell string 506B and the third cell string 506C to the battery pack terminals 482.

Figure 70:
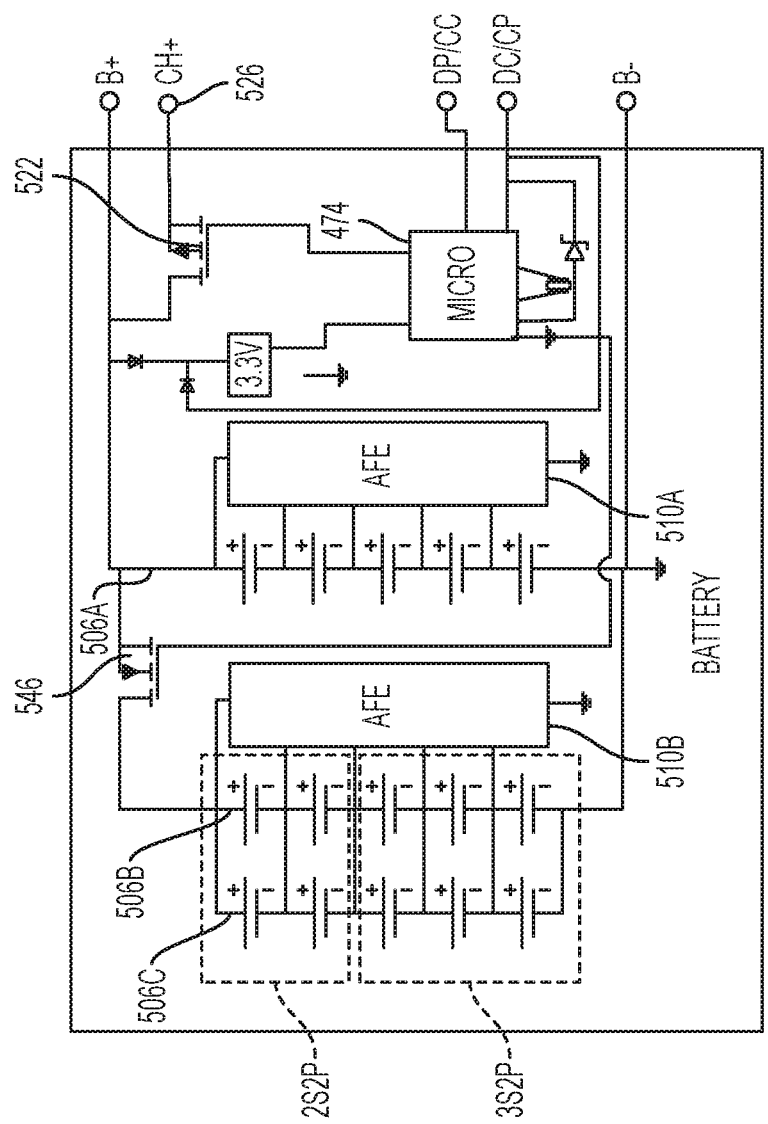
FIG. 70 is a block diagram of the battery pack of FIG. 33 according to one embodiment.

FIG. 70 is a simplified block diagram of another example of a 5S3P configuration of the battery pack 18. In the example illustrated, the 5S3P configuration is similar to the 5S3P configuration shown in FIG. 68. However, the 5S2P configuration formed by the second cell string 506B and the third cell string 506C includes a second switch (not shown) dividing the 5S2P configuration into a 3S2P configuration and a 2S2P configuration. That is, when the second switch is open, only the 3S2P configuration is connected between the first switch 498 and ground. When the second switch is closed, the 5S2P configuration formed by the second cell string 506B and the third cell string 506C is connected between the first switch 498 and ground. As described above, the first switch 546 and the second switch are controlled by the battery controller 474 to selectively connect the first cell string 506A, the 3S2P configuration, and the 5S2P configuration to the battery pack terminals 482.

FIG. 71 is a flowchart of a method 562 of switching cell strings 506A-506C according to another embodiment. The method 562 includes connecting, using the battery controller 474, a first cell string 506A and a first configuration of battery cells to the battery pack terminals 482 during start-up (at block 566). For example, the battery controller 474 opens the second switch and closes the first switch 546 and the discharging switch to connect only the first cell string 506A and the 3S2P configuration to the power tool 14 to provide a reduced amount of current to power up the motor controller 374.

The method 562 also includes determining that a predetermined amount of time has elapsed (at block 570) and connecting the second cell string 506B when the predetermined amount of time has elapsed (at block 574). The battery controller 474 may start a timer after start-up and when the timer expires (e.g., after 200 ms), the battery controller 474 may close the second switch to connect the 5S2P configuration formed by the second cell string 506B and the third cell string 506C to the battery pack terminals 482.

In some embodiments, the battery pack terminals 482 may be made of F-Tec terminal to offer better thermal distribution capabilities and durability.

Battery packs having cells with Lithium-ion chemistry may be subject to shipping regulations. Such shipping regulations may limit the voltage and/or power capacity of the battery pack being shipped. In order to comply with such regulations, battery packs 18 may be shipped with subcores and/cell strings 506A-506C of the battery cells 470 disconnected from each other. Battery packs 18 may include a switch, as described below, which connects the subcores or cell strings 506A-506C together when the battery pack 18 is in use. A similar switch and switching arrangement is described and illustrated in U.S. Provisional Patent Application No. 62/435,453, filed Dec. 16, 2016, the entire contents of which is hereby incorporated by reference.

The battery pack 18 includes a switch 578 extending from the housing 462. The switch 578 is configured to be in a first position and a second position. When in the first (e.g., "OFF") position, electrical components (for example, the subcores or the cell strings 506A-506C) of the battery pack 18 contained within the housing 462 electrically disconnected from each other. When in the second (e.g., "ON") position, electrical components (for example, the subcores or the cell strings 506A-C) are electrically connected to each other. The switch 578 may be manipulated by a user from the first position to a second position by pressing the switch 578.

Figure 72A:
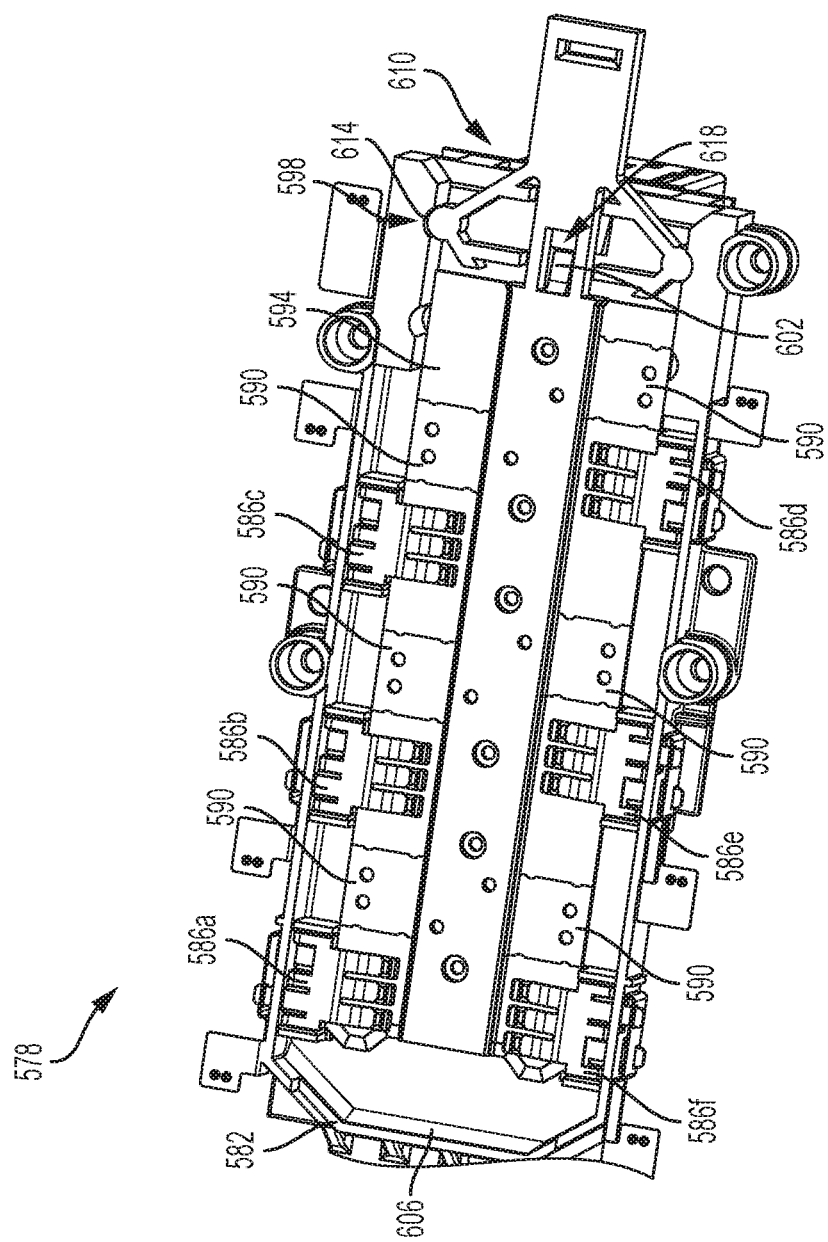
FIGS. 72A-72B are perspective view of a switch of the battery pack of FIG. 2A.
Figure 72B:
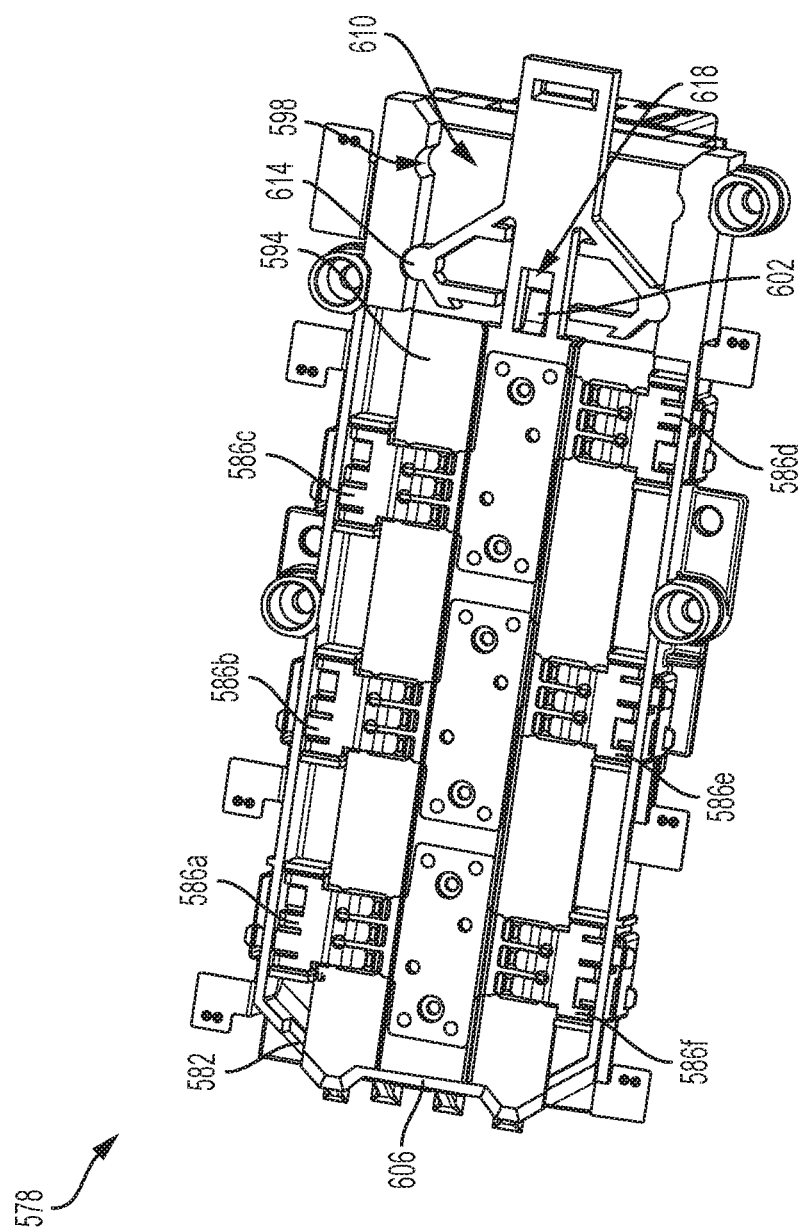

FIGS. 72A-72B illustrate the switch 578 in accordance with some embodiments. As discussed above, the switch 578 is configured to be in the first position (FIG. 72A) and the second position (FIG. 72B). The switch 578 includes a shell 582, terminals 586a, 586b, . . . , 586n, a conductive bus 590, and a non-conductive layer 594. The shell 582 may be formed of plastic or a similar material. The shell 582 is slidingly coupled to the housing 462, while the conductive bus 590 and non-conductive layer 594 are coupled, or integral to, the housing 462, such that the shell 582 is slidingly coupled to the conductive bus 590 and non-conductive layer 594. The shell may include one or more recesses 598, a front stop member 602, and a rear stop member 606.

Although illustrated as having six terminals 586a-586f, in other embodiments (not shown), the battery pack 18 may have fewer or more terminals 586. Each terminal 586 has a first end coupled to the shell 582 and electrically coupled to the subcores (for example, via subcore terminals). Each terminal 586 has a second end configured to slidingly contact, when the switch 578 is in the off position, the non-conductive layer 594 and, when the switch 578 is in the on position, the conductive bus 590.

As illustrated in FIGS. 72A-72B, in some embodiments, the conductive bus 590 and non-conductive layer 594 are coupled to a user-interface (e.g., a portion projecting out of the housing and configured to be operable by the user) via a protective member 610 having one or more projections 614 and forming an aperture 618. The projections 614 engage with the one or more recesses 598 of the shell 582 to prevent unwanted movement between the first position and the second position. The front stop member 602 is positioned within the aperture 618 and engages the protective member 610 to prevent the conductive bus 590 and non-conductive layer 594 from surpassing the first position, when moving from the second position to the first position. The rear stop member 606 prevents the conductive bus 590 and non-conductive layer 594 from surpassing the second position, when moving from the first position to the second position.

Figure 37:
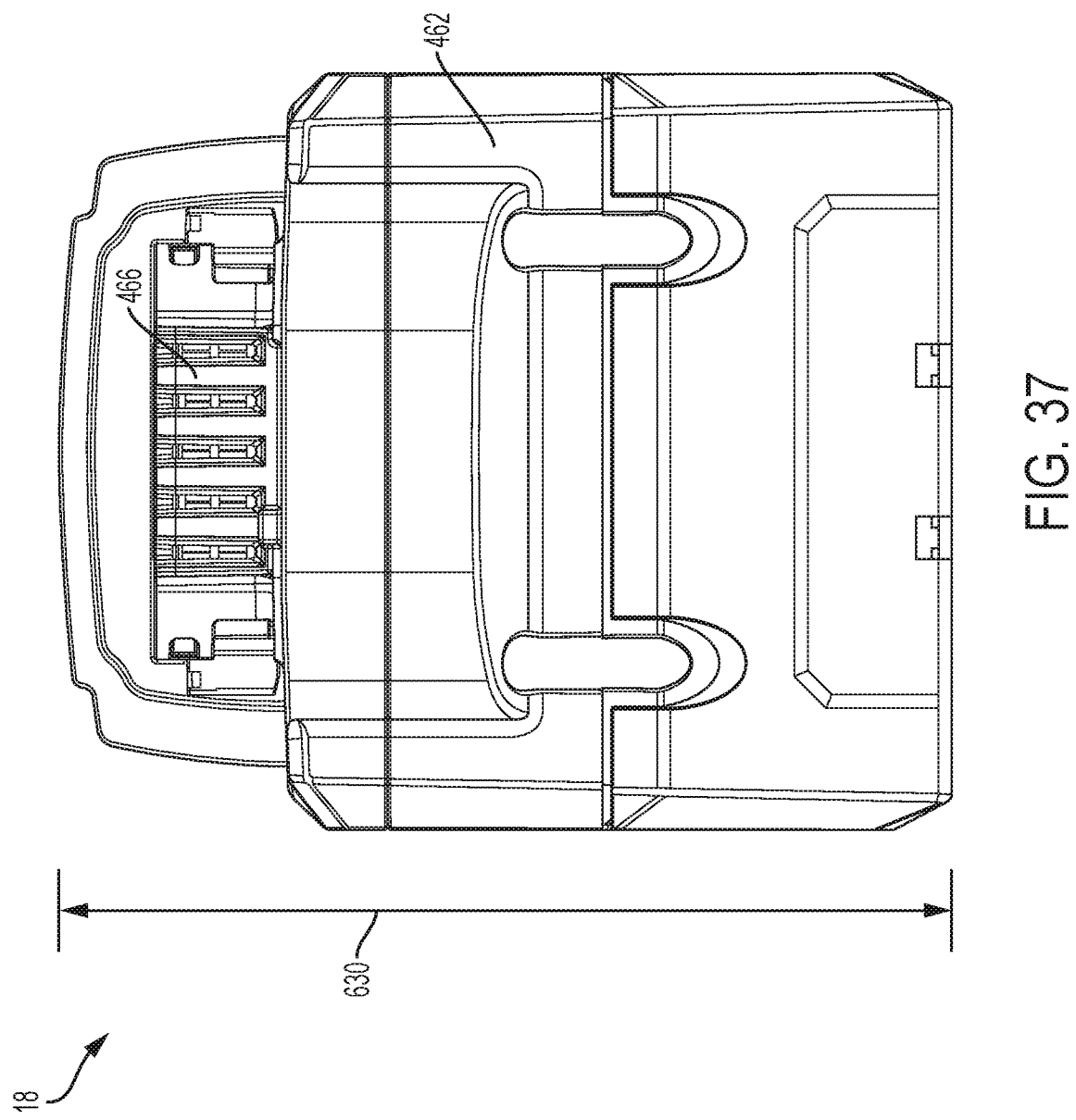
FIG. 37 is a front plan view of the battery pack of FIG. 33.
Figure 38:
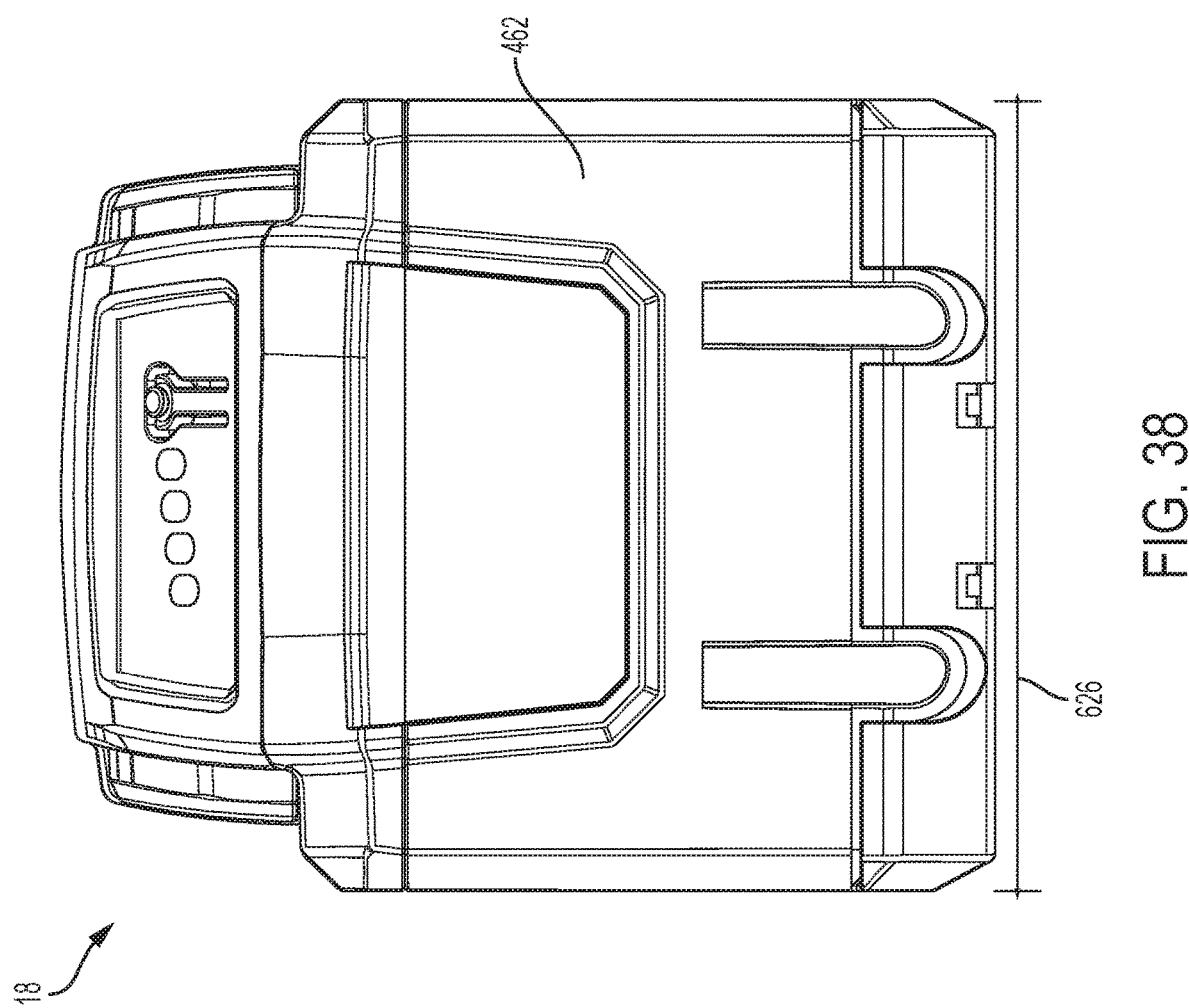
FIG. 38 is a rear plan view of the battery pack of FIG. 33.
Figure 39:
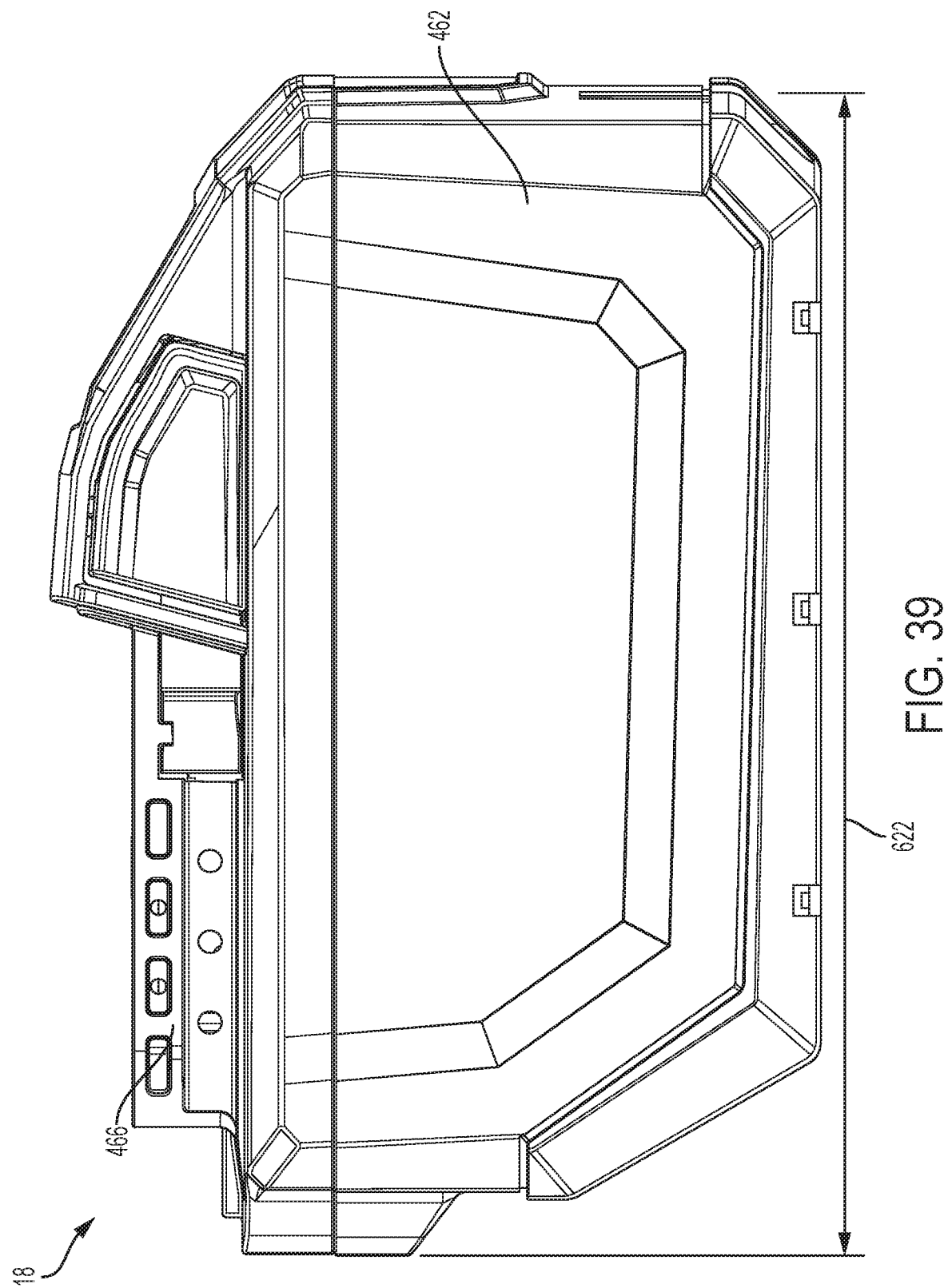
FIG. 39 is a side plan view of the battery pack of FIG. 33.
Figure 40:
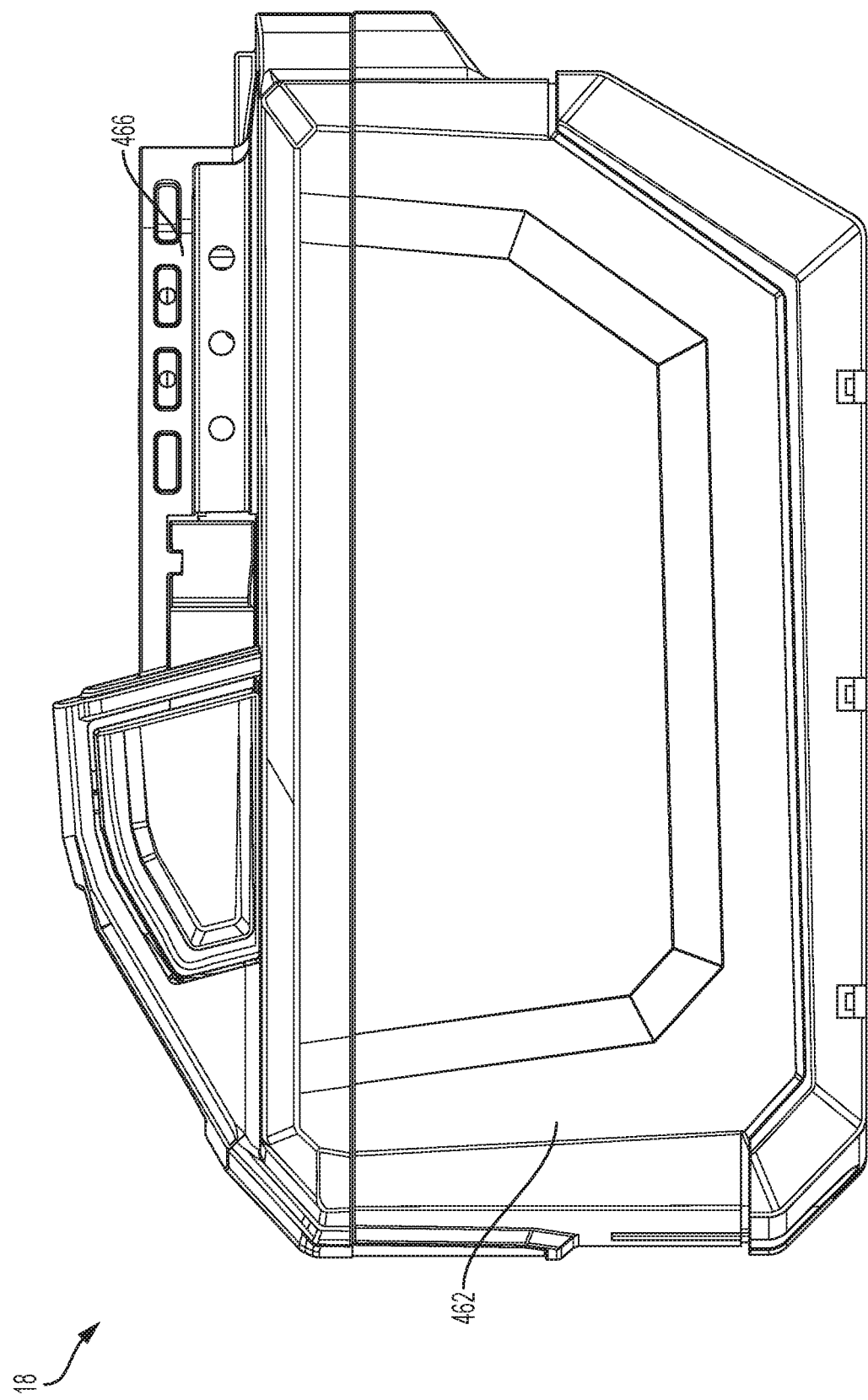
FIG. 40 is a side plan view of the battery pack of FIG. 33.
Figure 41:
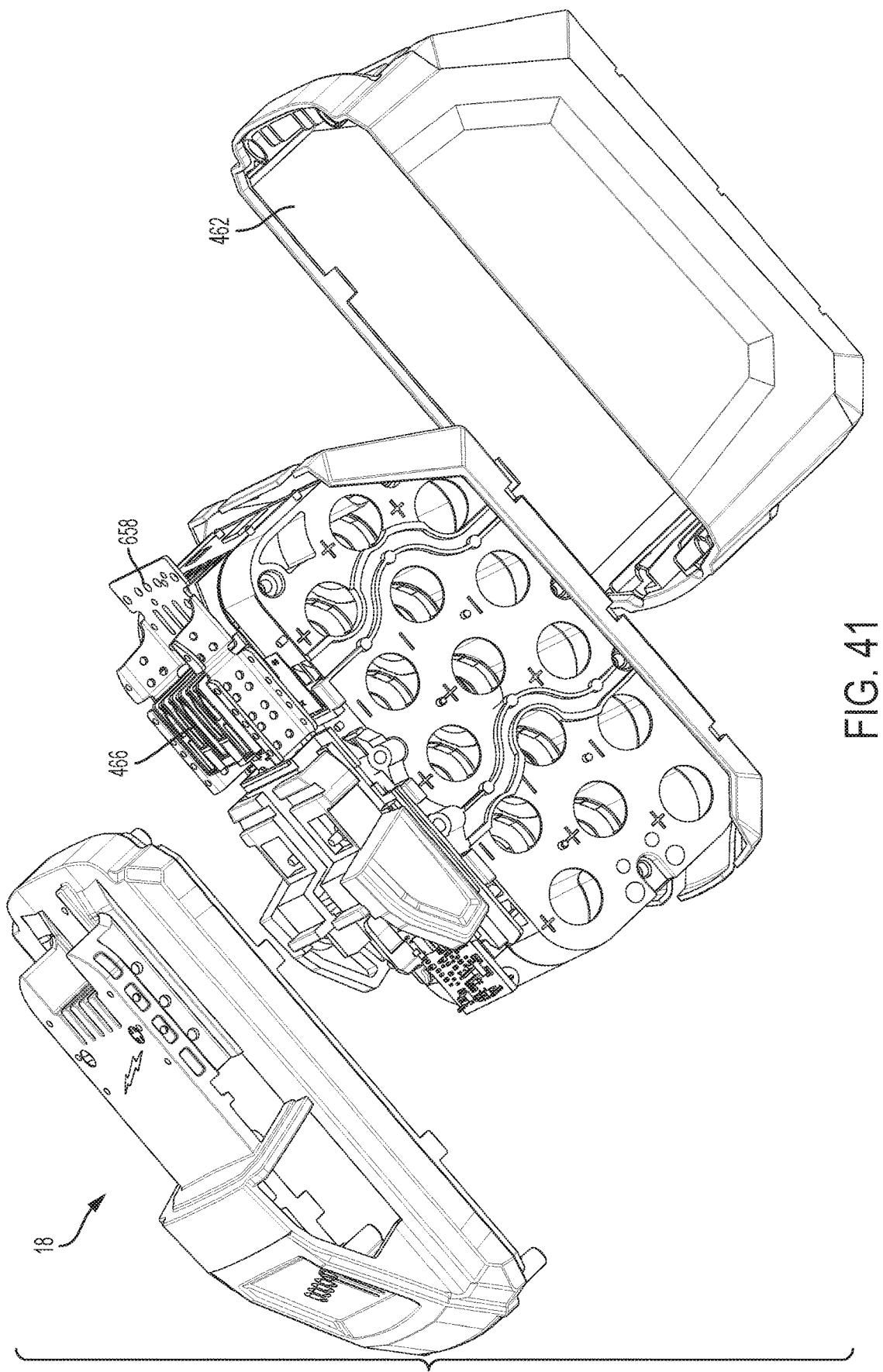
FIG. 41 is an exploded view of the battery pack of FIG. 33.
Figure 42:
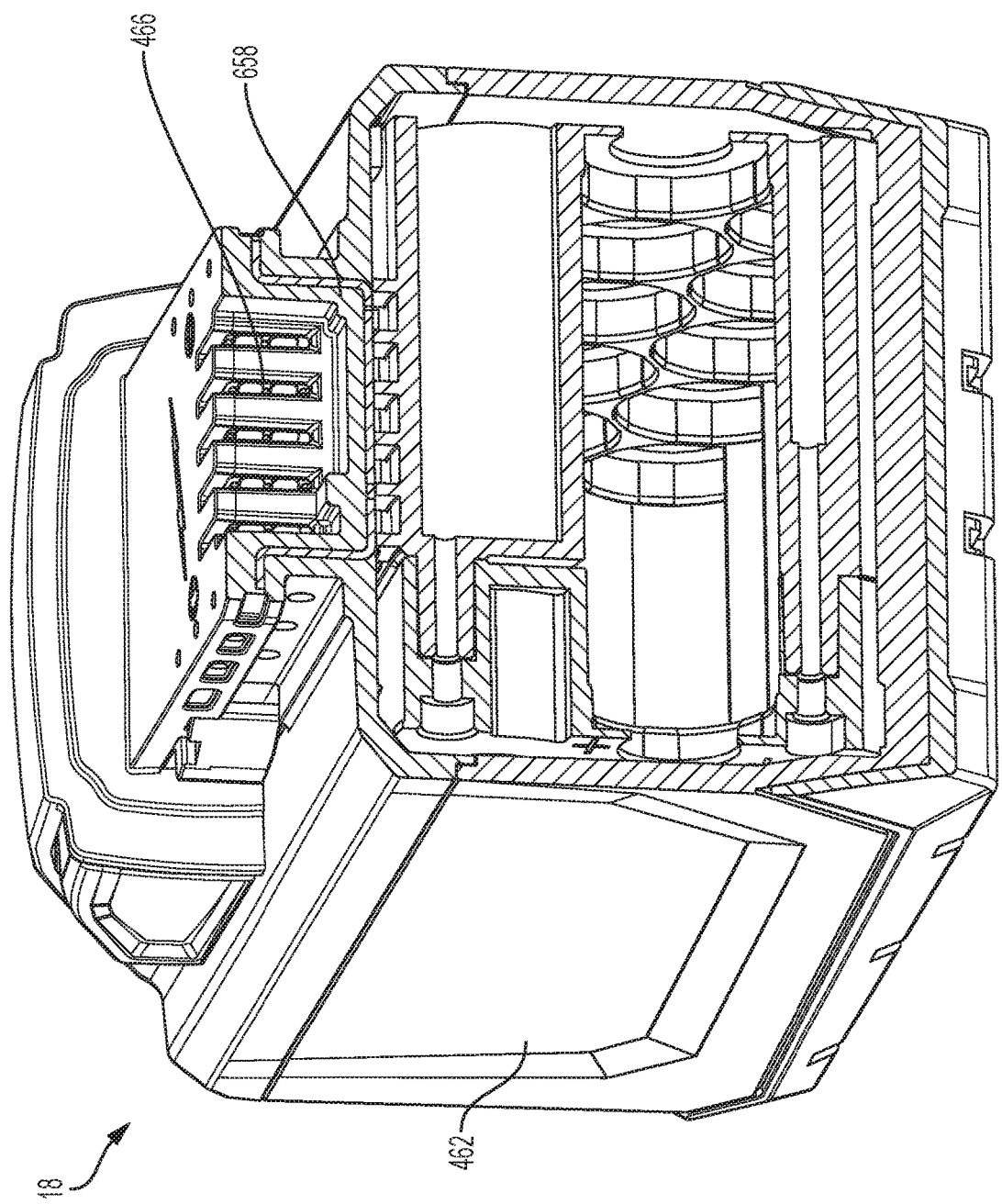
FIG. 42 is a cross-sectional view of the battery pack of FIG. 33.
Figure 43:
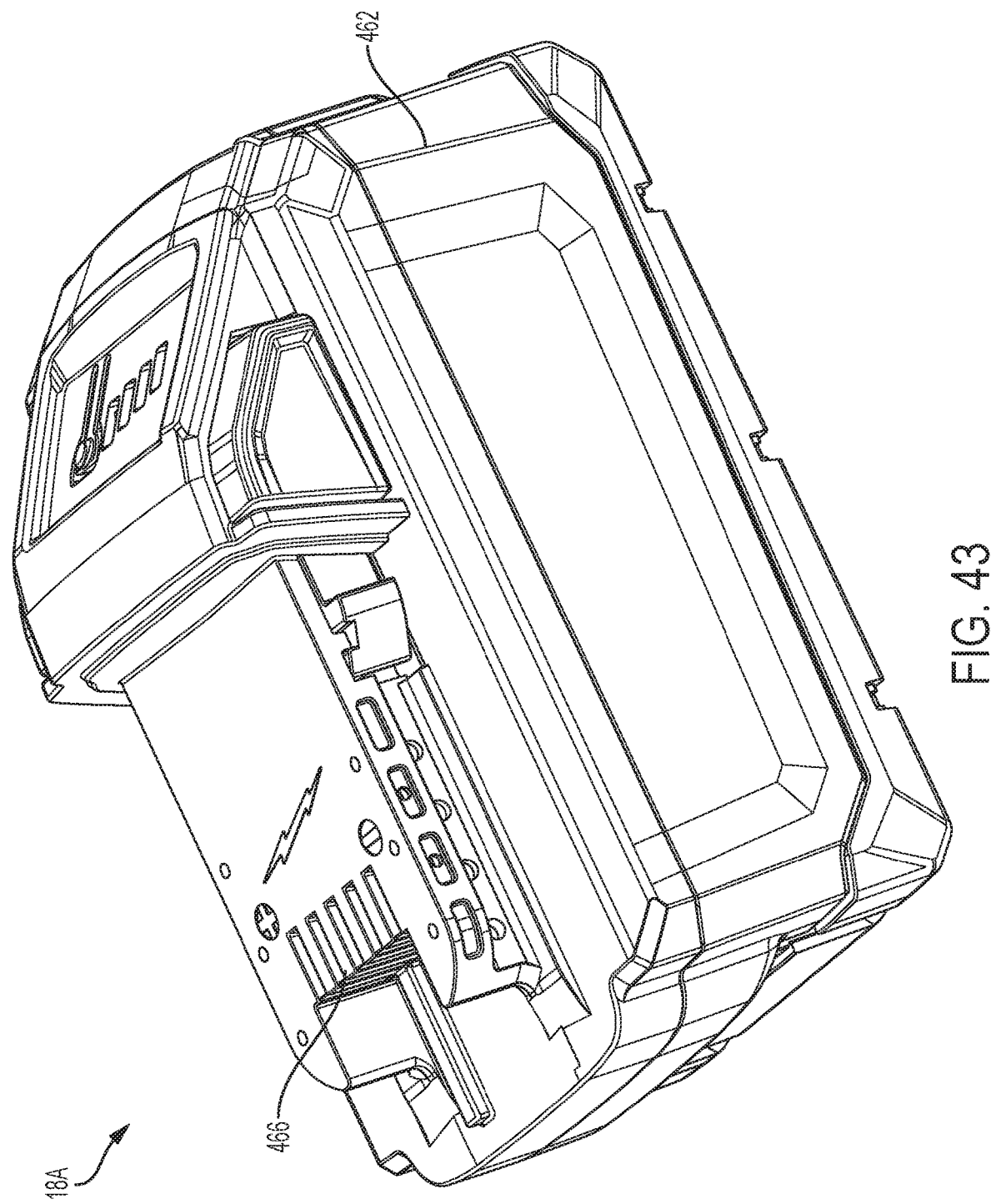
FIG. 43 is a top perspective view of the battery pack of FIG. 2A in accordance with some embodiments.
Figure 44:
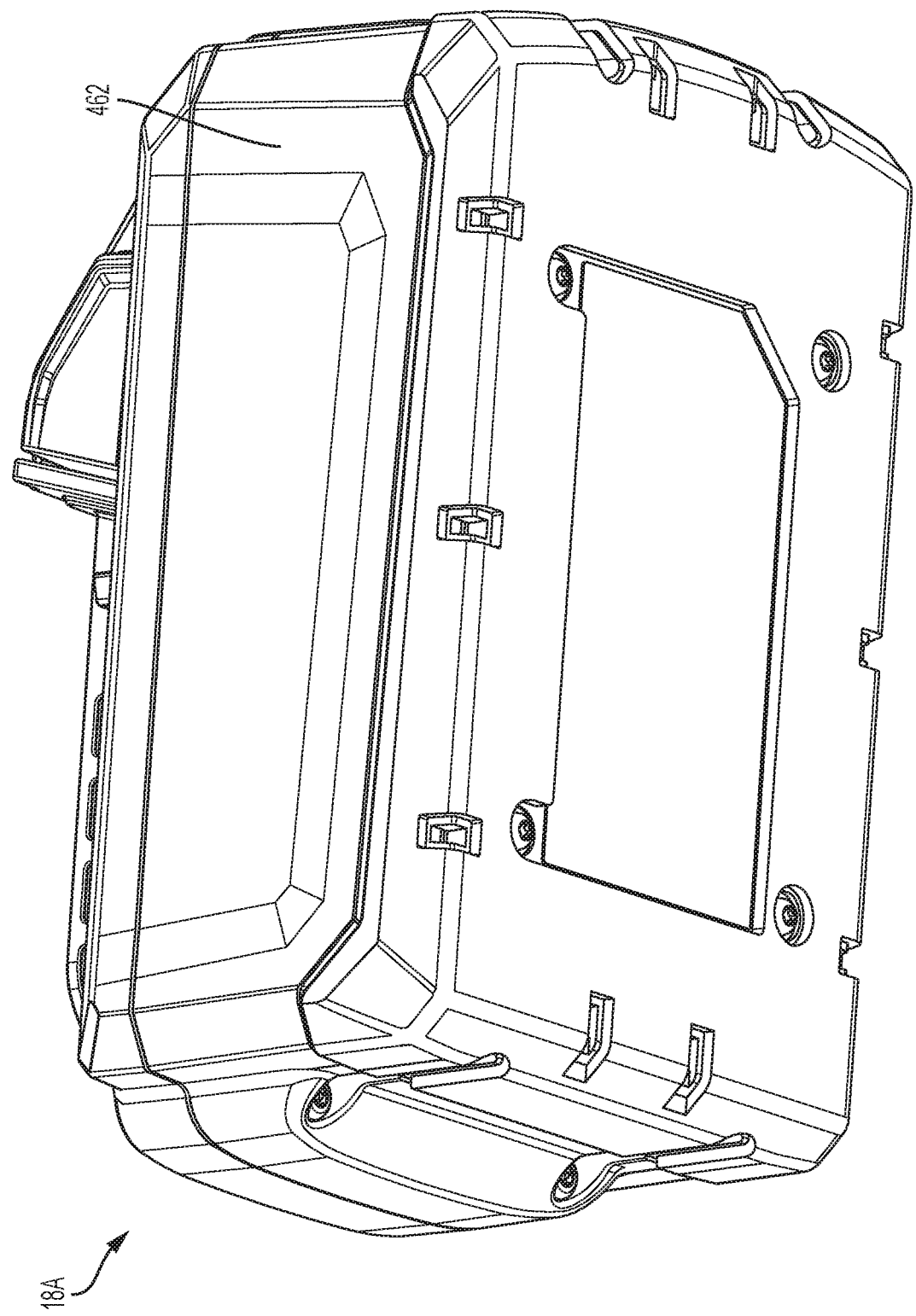
FIG. 44 is a bottom perspective view of the battery pack of FIG. 43.
Figure 45:
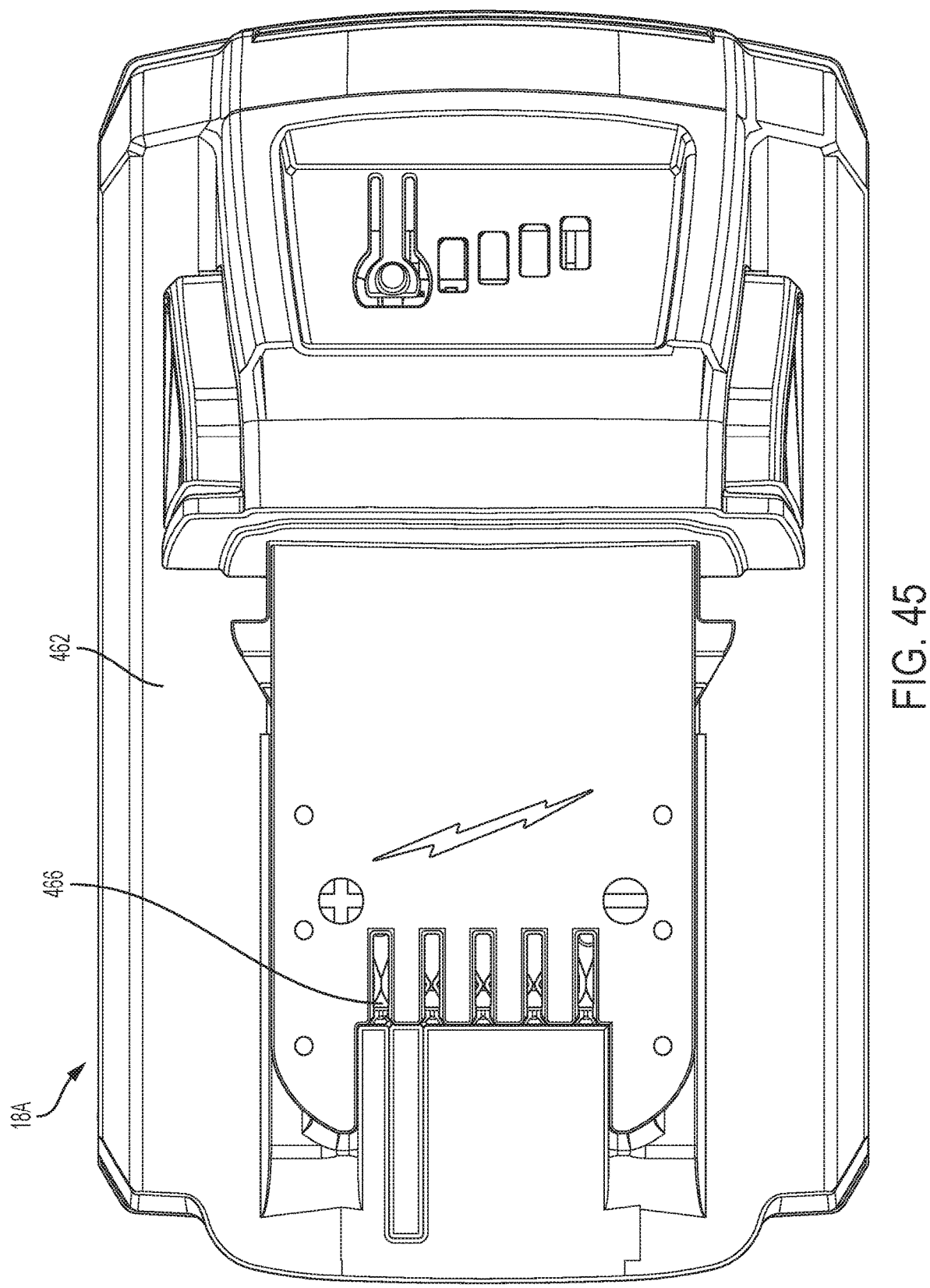
FIG. 45 is a top plan view of the battery pack of FIG. 43.
Figure 46:
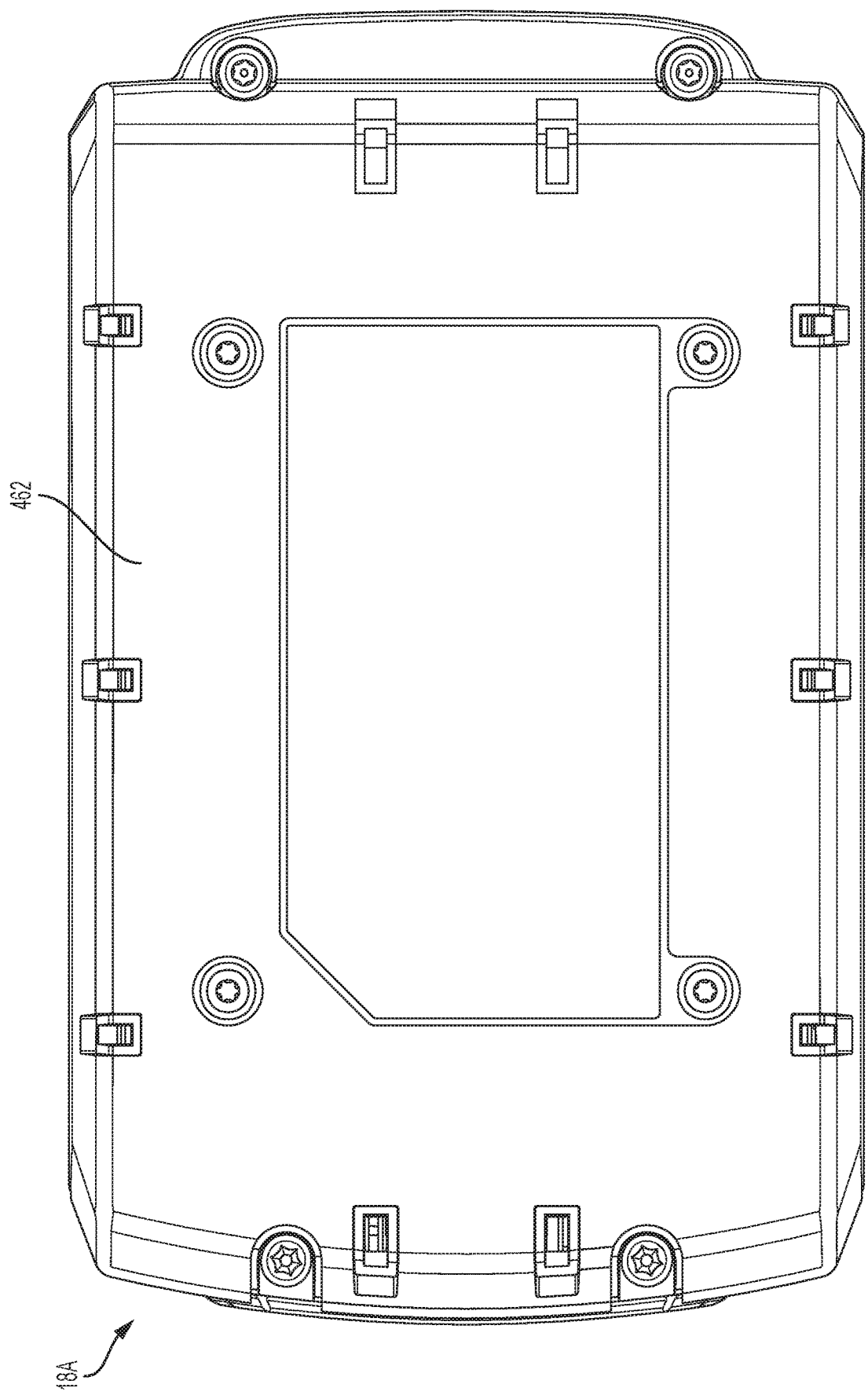
FIG. 46 is a bottom plan view of the battery pack of FIG. 43.

With reference to FIG. 39, the battery pack 18 defines a length 622 within a range of approximately 140 mm to approximately 155 mm. In some embodiments, the length 622 is approximately 152.25 mm. With reference to FIG. 38, the battery pack 18 defines a width 626 within a range of approximately 75 mm to approximately 90 mm. In some embodiments, the width 626 is approximately 84 mm. With reference to FIG. 37, the battery pack 18 defines a height 630 within a range of approximately 90 mm to approximately 110 mm. In some embodiments, the height 630 is approximately 99 mm. The volume of the battery pack 18 is between about 945,000 mm$^3$ to about 1,534,500 mm$^3$ (e.g., about 1,022,954 mm$^3$). The total weight of the battery pack 18 is within a range of approximately 3 lbs. to approximately 4 lbs. In some embodiments, the total weight of the battery pack 18 is approximately 3.426 lbs. (about 1,554 grams (g)).

In some other embodiments, the width may increase about 1 mm to about 3 mm to about 85 mm to about 87 mm. In such embodiments, the total weight of the battery pack 18 may increase to about 3.48 lbs. to about 3.5 lbs. (about 1,579 g to about 1,588 g).

The battery pack 18 has an AC internal resistance (ACIR) within a range of approximately 18 milliohms to approximately 23 milliohms. The battery pack 18 has a DC internal resistance (DCIR) within a range of approximately 15 mΩ to approximately 25 mΩ. In some embodiments, the DCIR of the battery pack 18 is about 21 mΩ.

Figure 47:
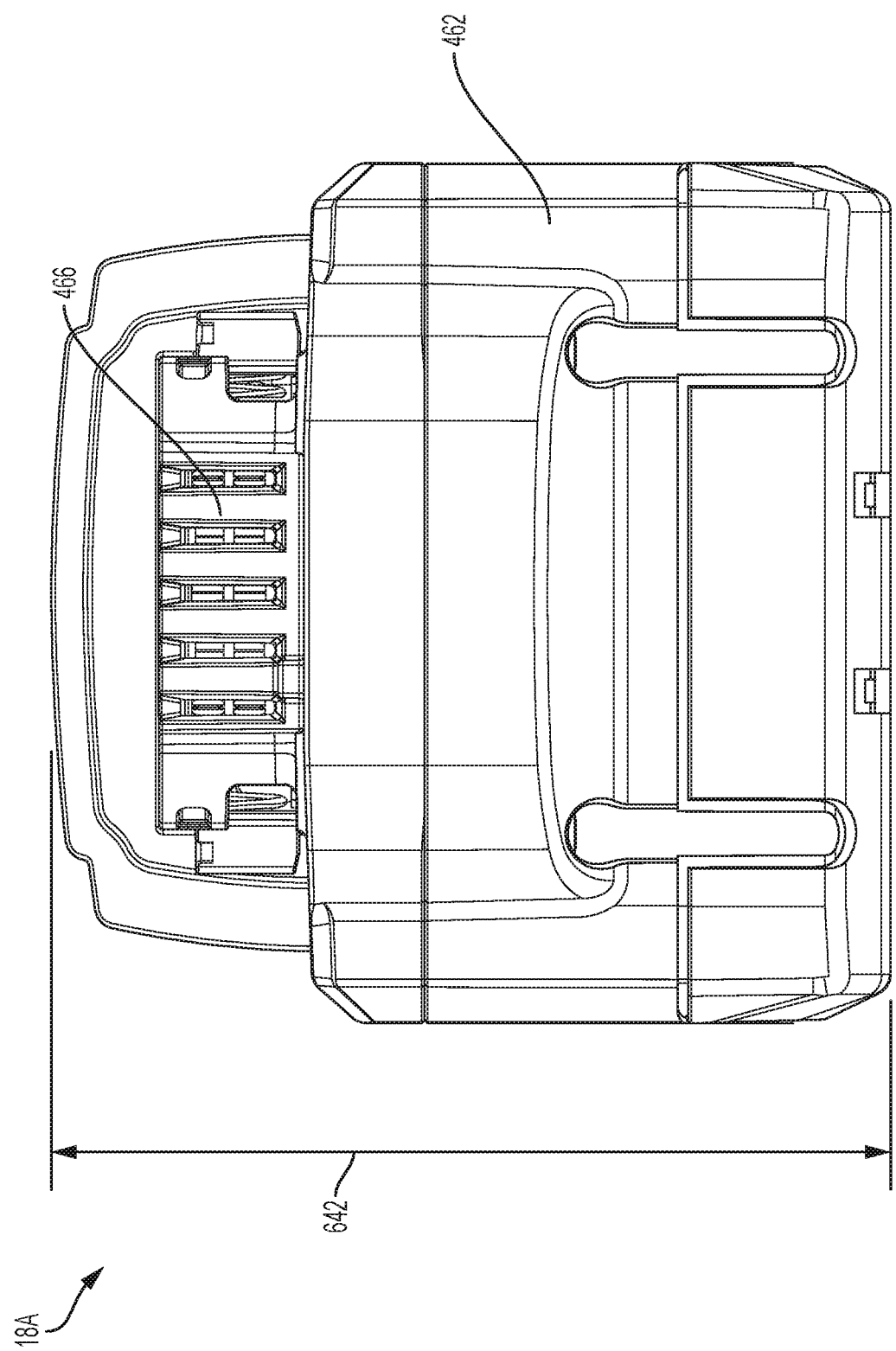
FIG. 47 is a front plan view of the battery pack of FIG. 43.
Figure 48:
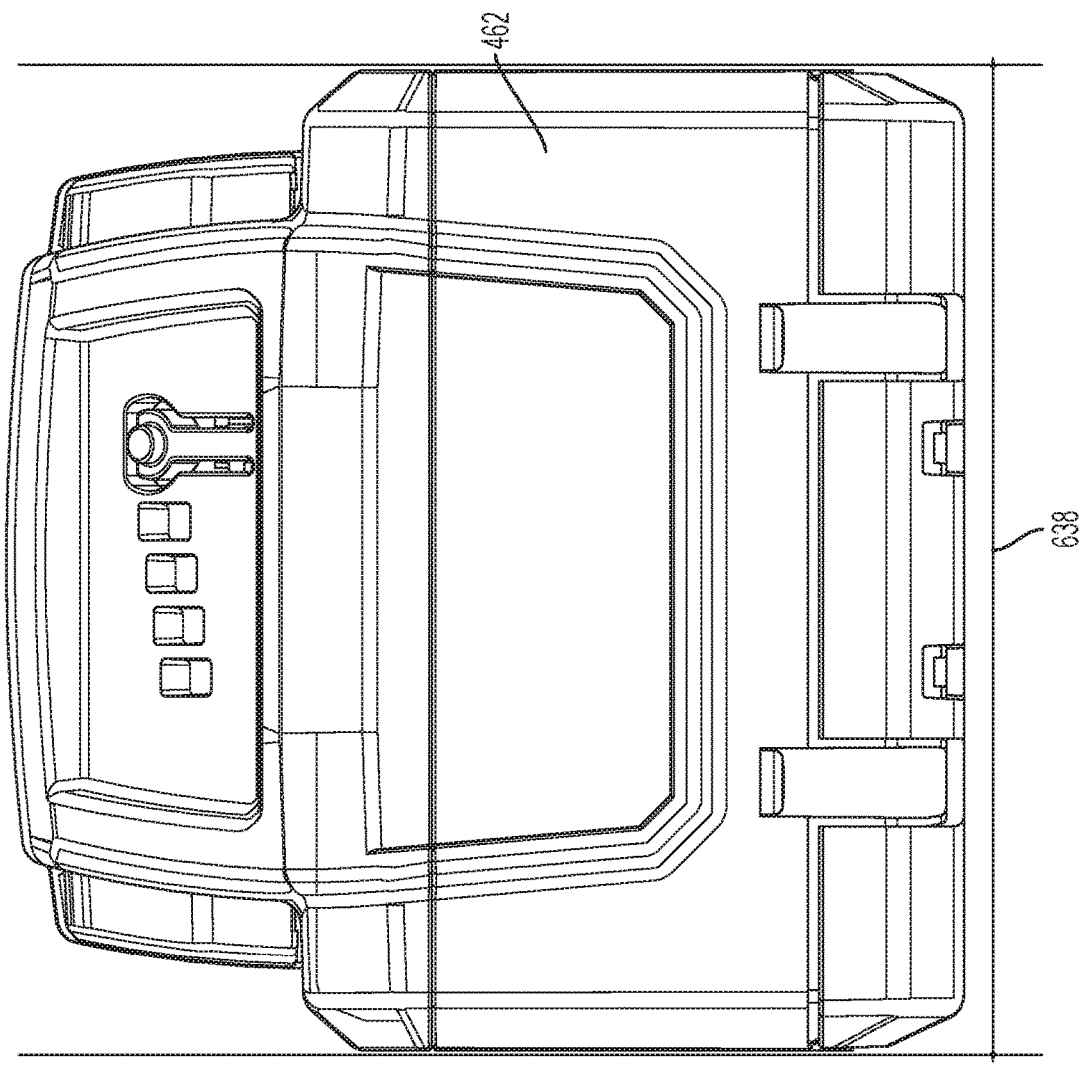
FIG. 48 is a rear plan view of the battery pack of FIG. 43.
Figure 49:
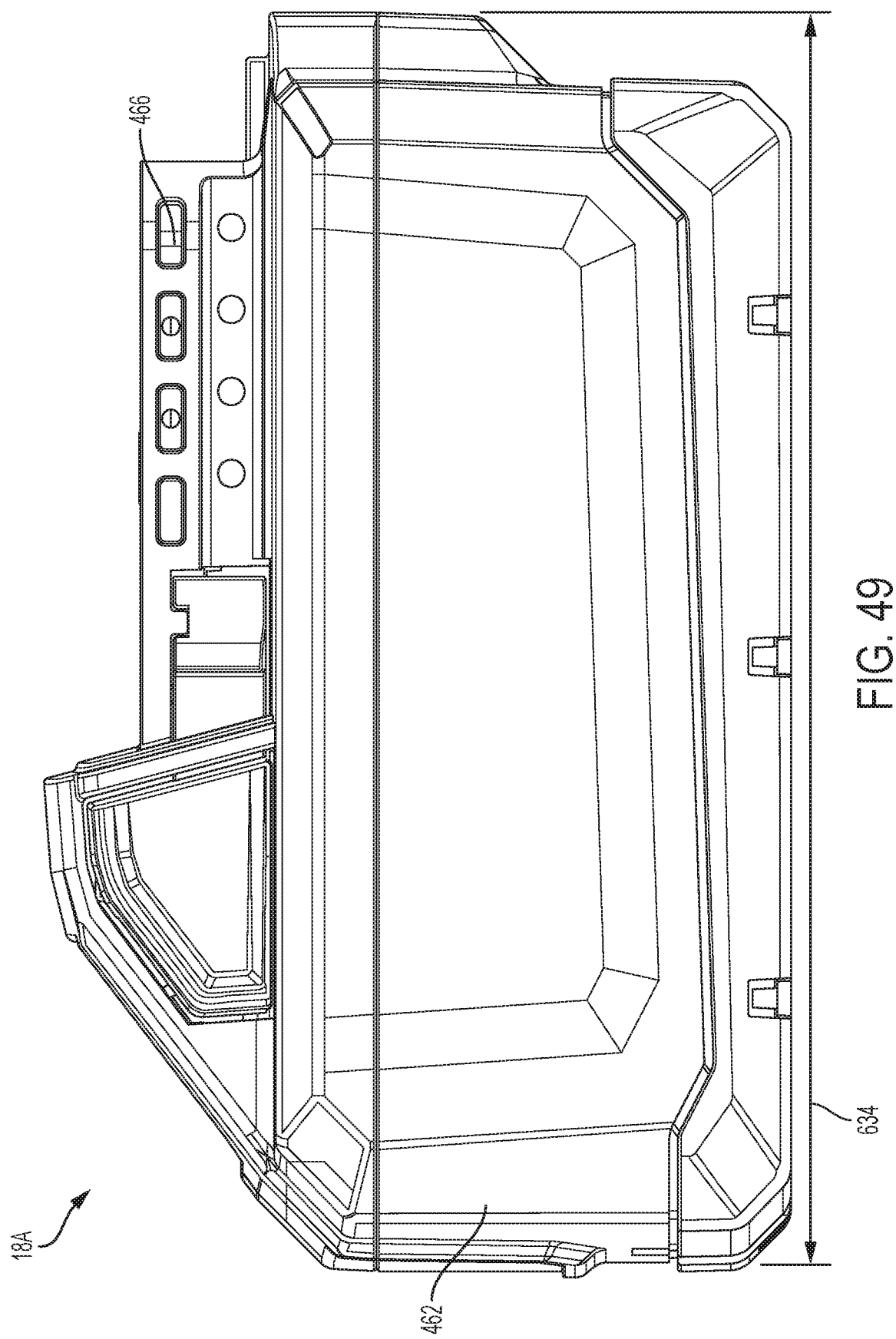
FIG. 49 is a side plan view of the battery pack of FIG. 43.
Figure 50:
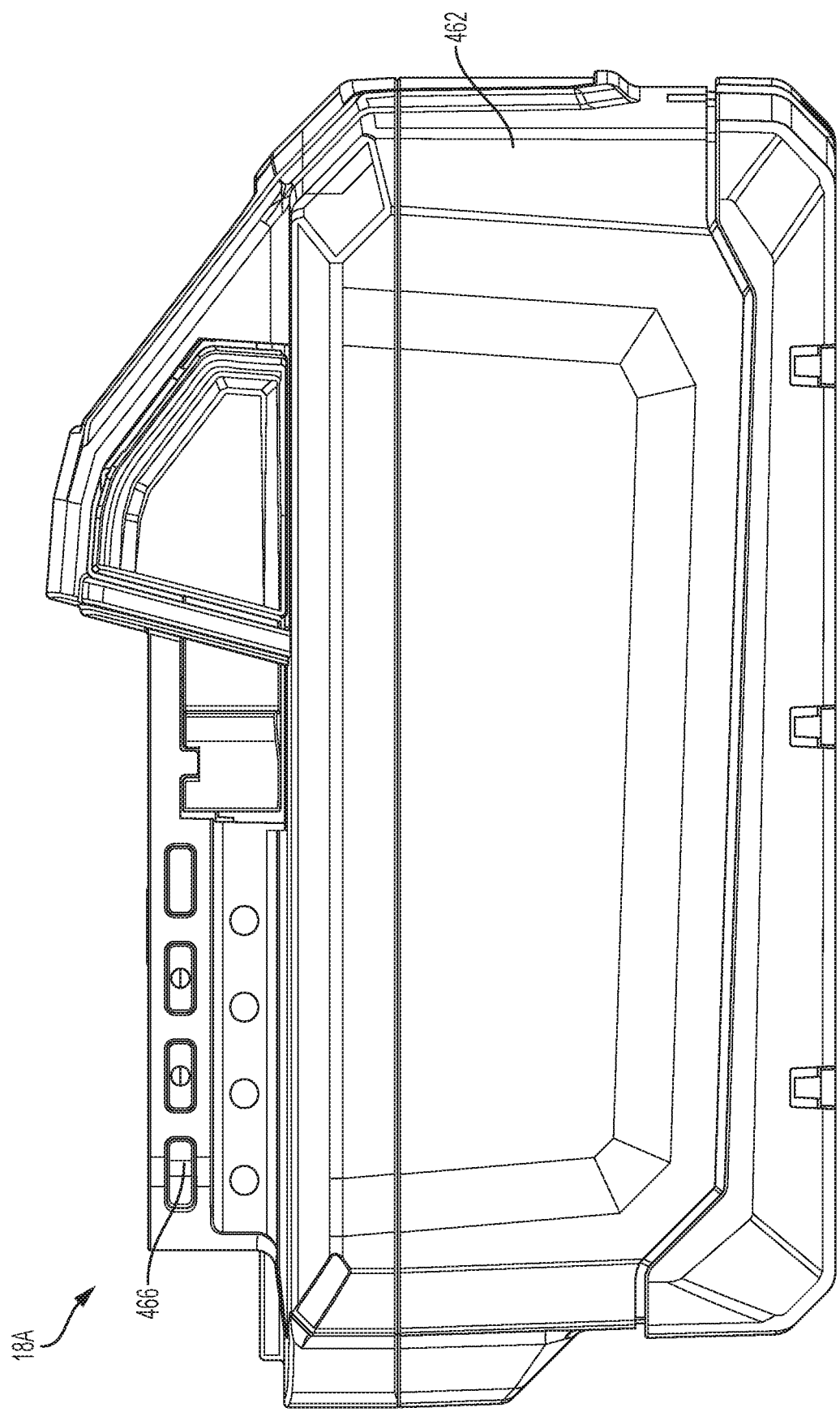
FIG. 50 is a side plan view of the battery pack of FIG. 43.
Figure 51:
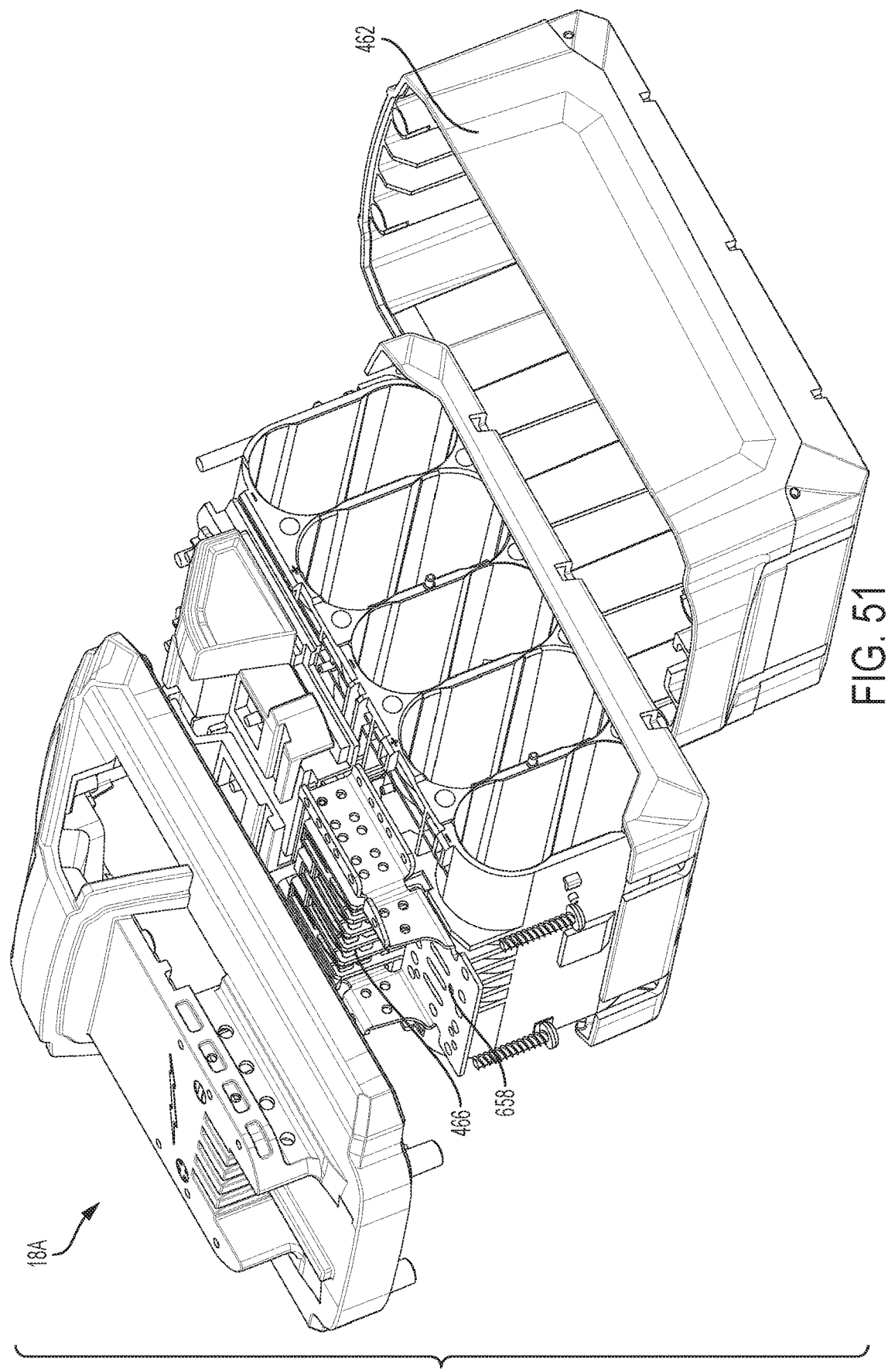
FIG. 51 is an exploded view of the battery pack of FIG. 43.
Figure 52:
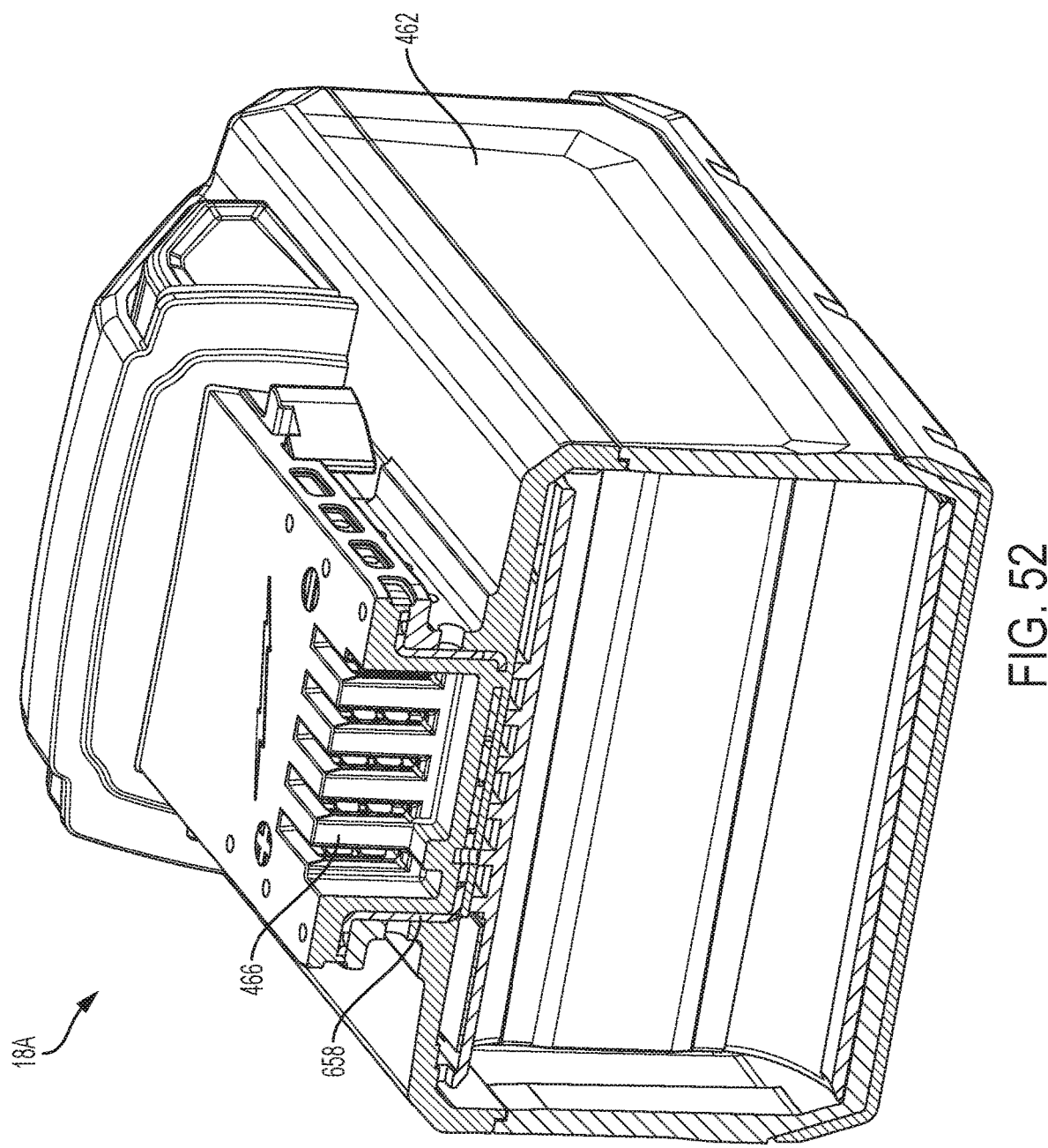
FIG. 52 is a cross-sectional view of the battery pack of FIG. 43.

With reference to FIG. 49, the battery pack 18A defines a length 634 within a range of approximately 130 mm to approximately 145 mm. In some embodiments, the length 634 is approximately 138.9 mm. With reference to FIG. 48, the battery pack 18A defines a width 638 within a range of approximately 75 mm to approximately 90 mm. In some embodiments, the width 638 is approximately 84 mm. With reference to FIG. 47, the battery pack 18A defines a height 642 within a range of approximately 75 mm to approximately 85 mm. In some embodiments, the height 642 is approximately 81.9 mm. The volume of the battery pack 18 is between about 730,000 mm$^3$ to about 1,110,000 mm$^3$ (e.g., about 766,202 mm$^3$). The total weight of the battery pack 18A is within a range of approximately 2 lbs. to approximately 3 lbs. In some embodiments, the total weight of the battery pack 18A is approximately 2.3 lbs. (about 1049.5 grams).

The battery pack 18A has an ACIR within a range of approximately 25 milliohms to approximately 30 milliohms. The battery pack 18A has a DCIR within a range of approximately 27 mΩ to approximately 37 mΩ. In some embodiments, the DCIR of the battery pack 18A is about 32 mΩ.

Figure 53:
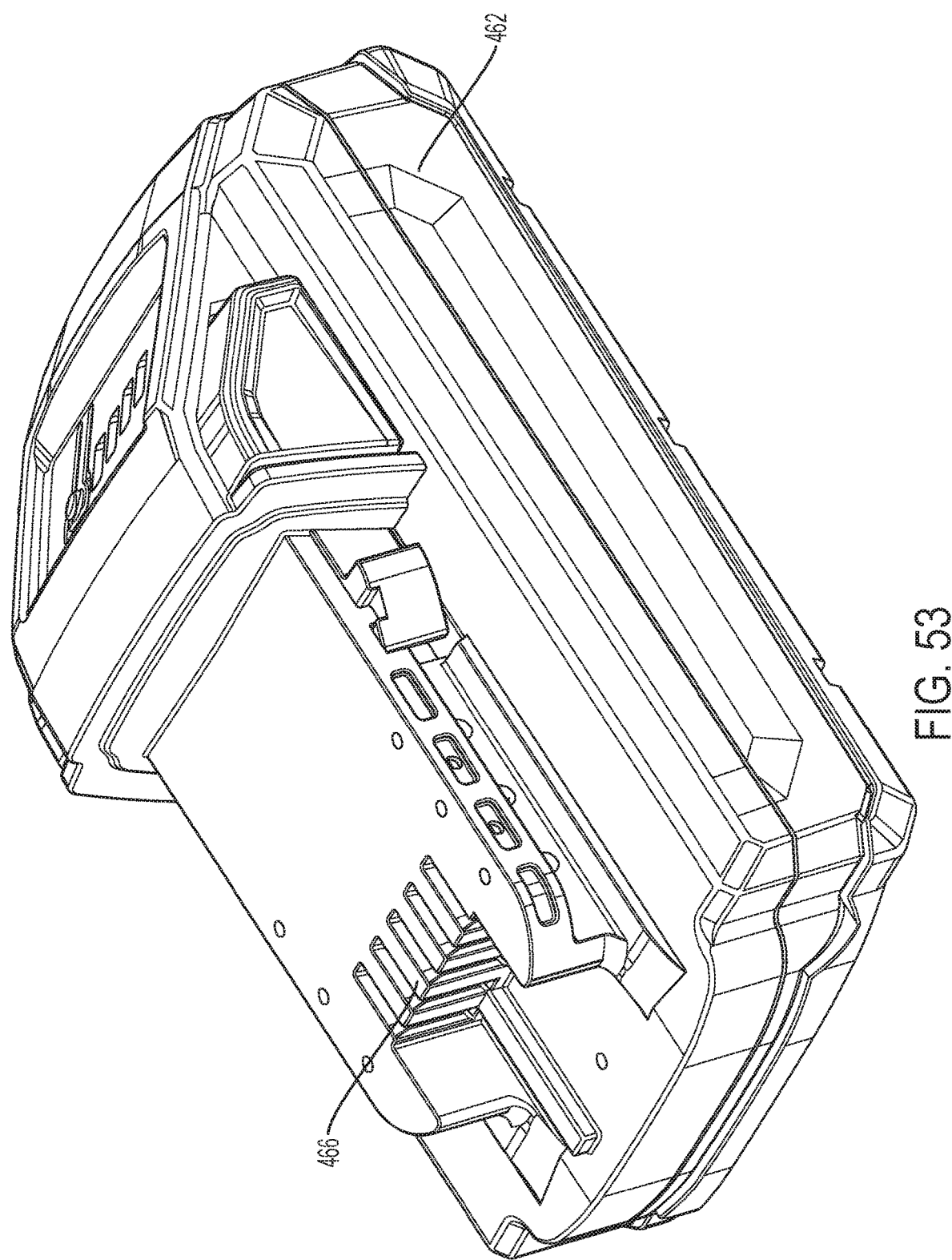
FIG. 53 is a top perspective view of the battery pack of FIG. 2A in accordance with some embodiments.
Figure 54:
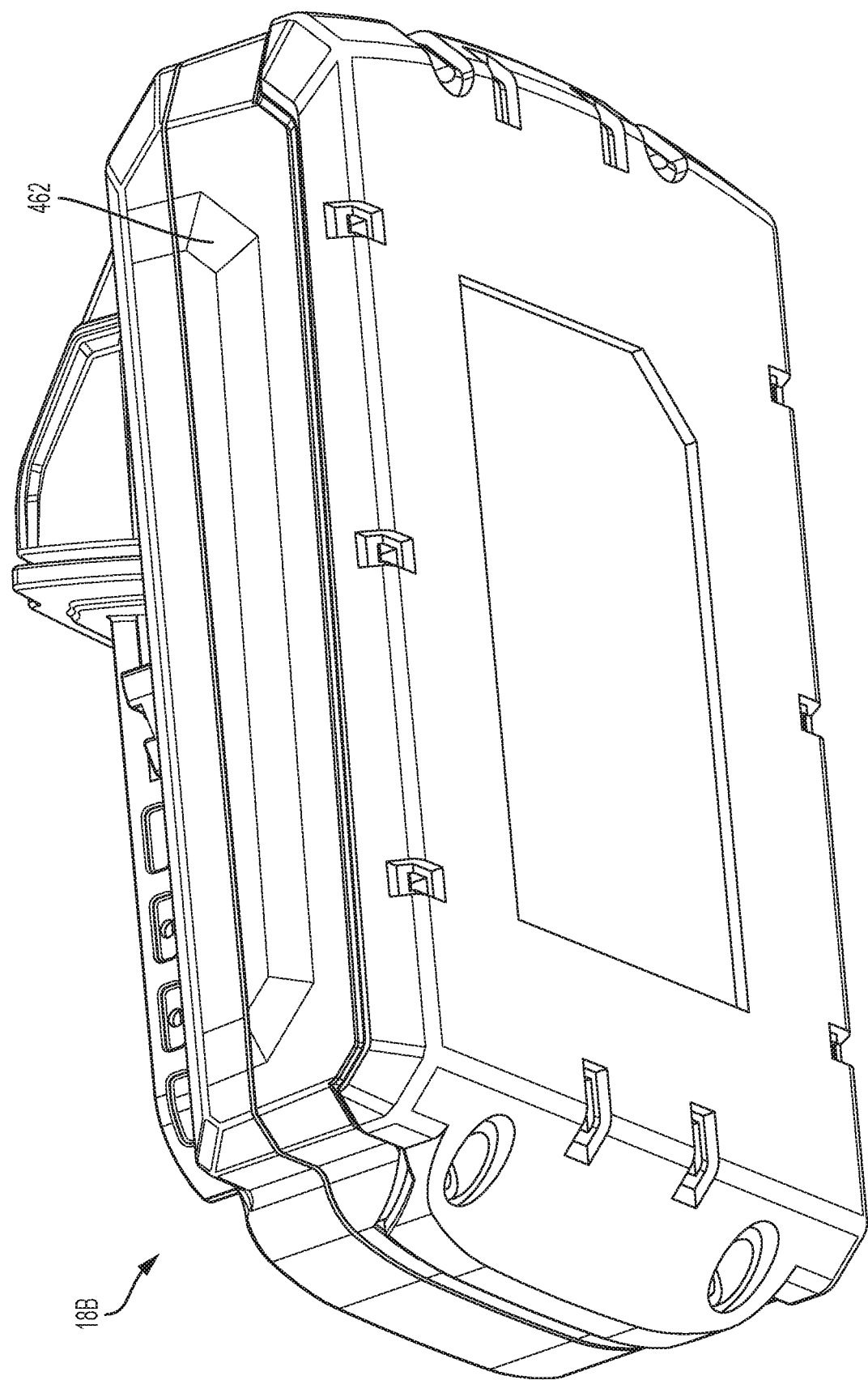
FIG. 54 is a bottom perspective view of the battery pack of FIG. 53.
Figure 55:
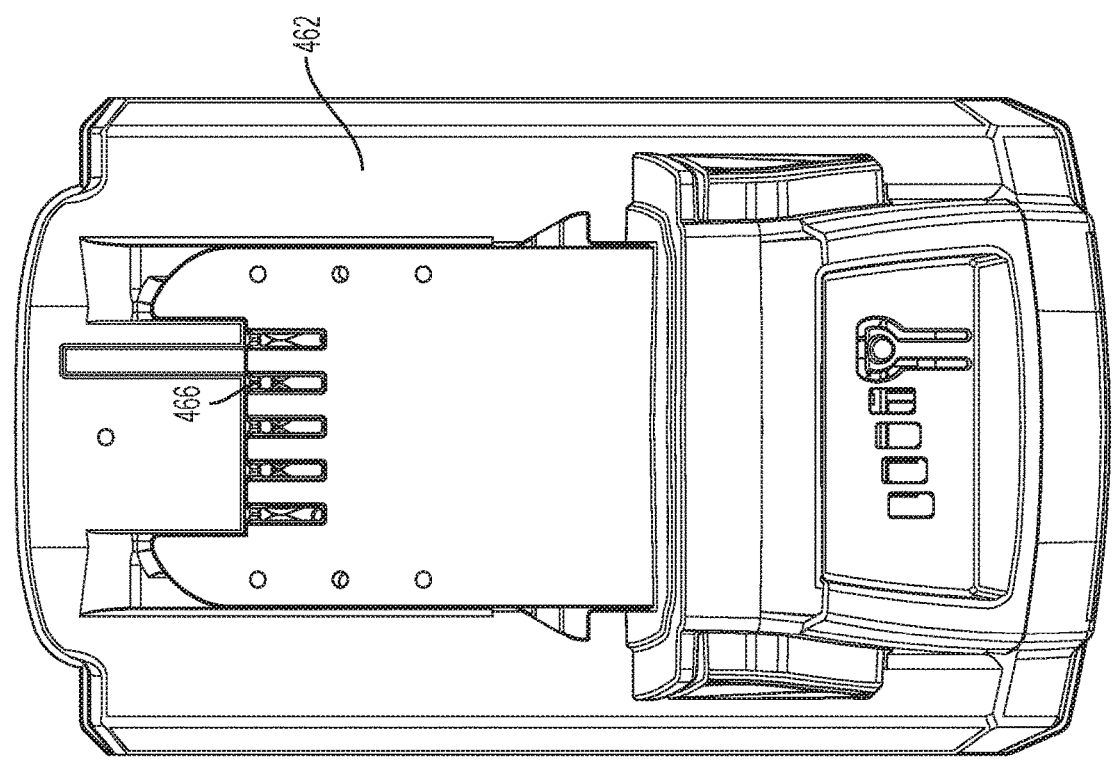
FIG. 55 is a top plan view of the battery pack of FIG. 53.
Figure 56:
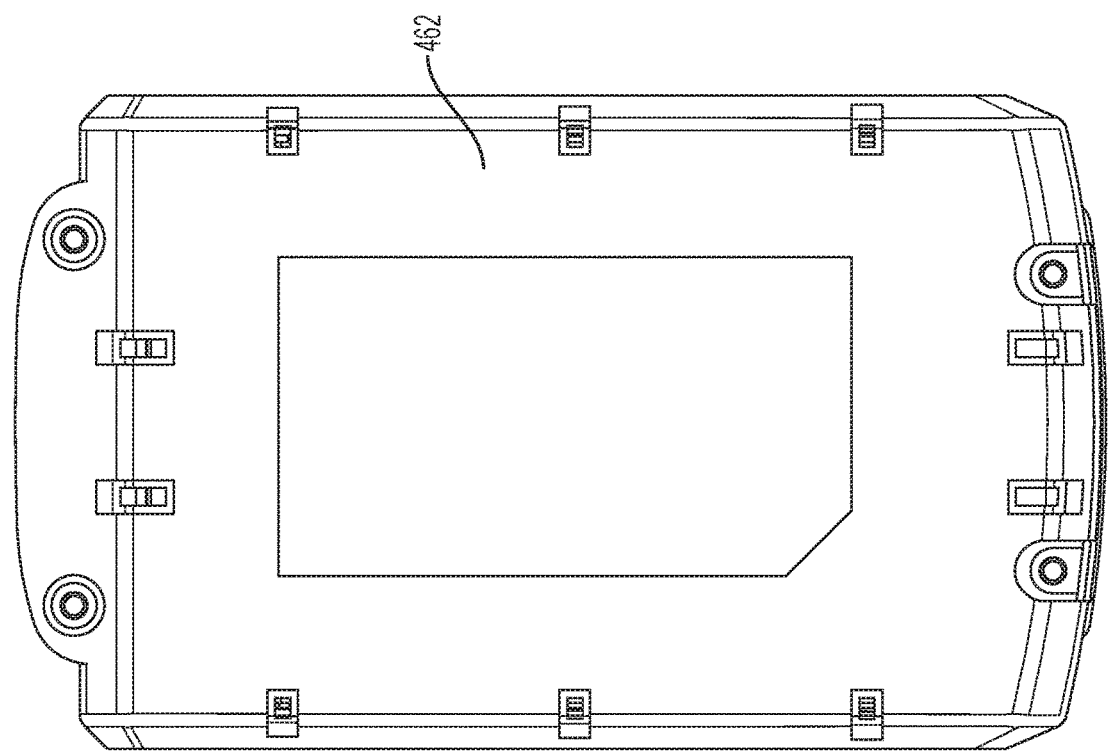
FIG. 56 is a bottom plan view of the battery pack of FIG. 53.
Figure 57:
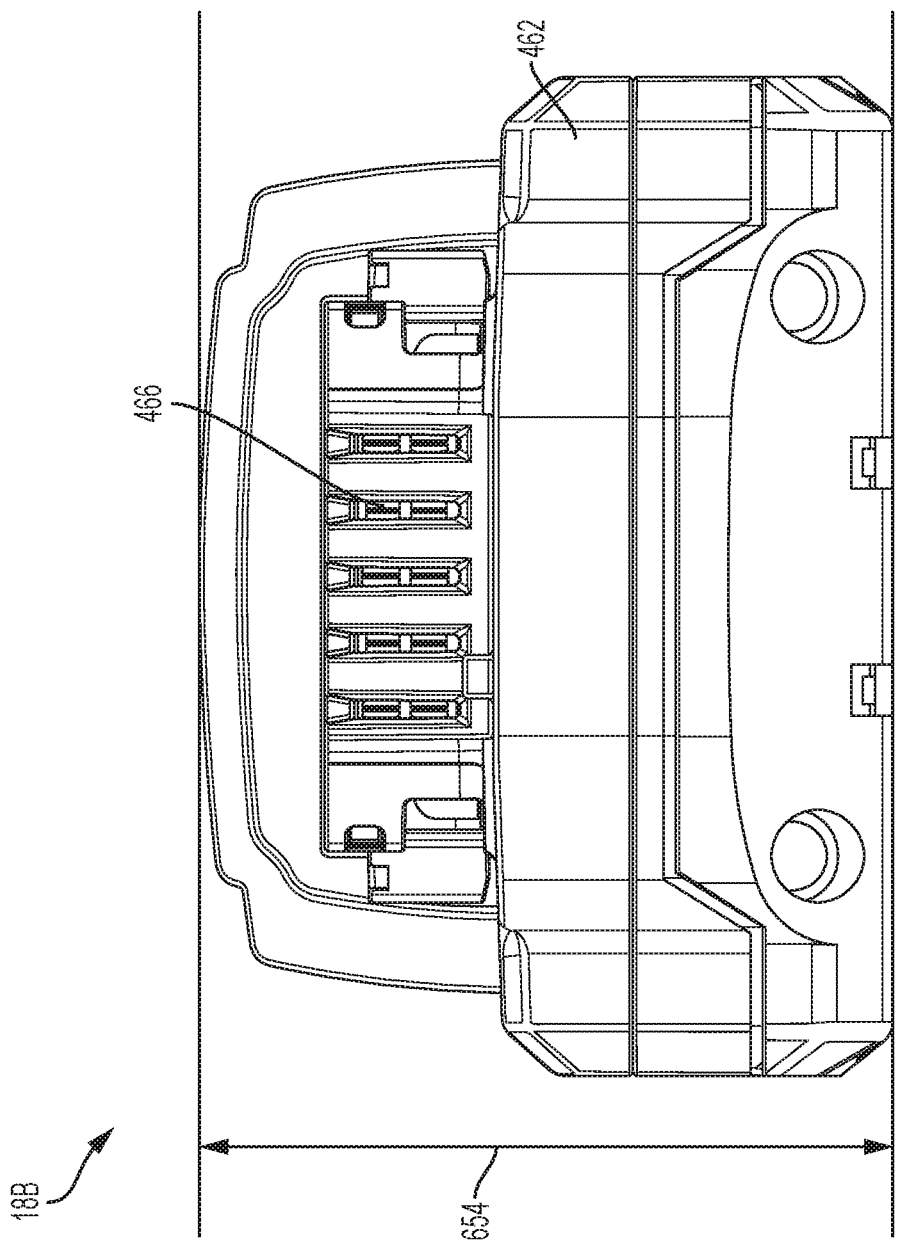
FIG. 57 is a front plan view of the battery pack of FIG. 53.
Figure 58:
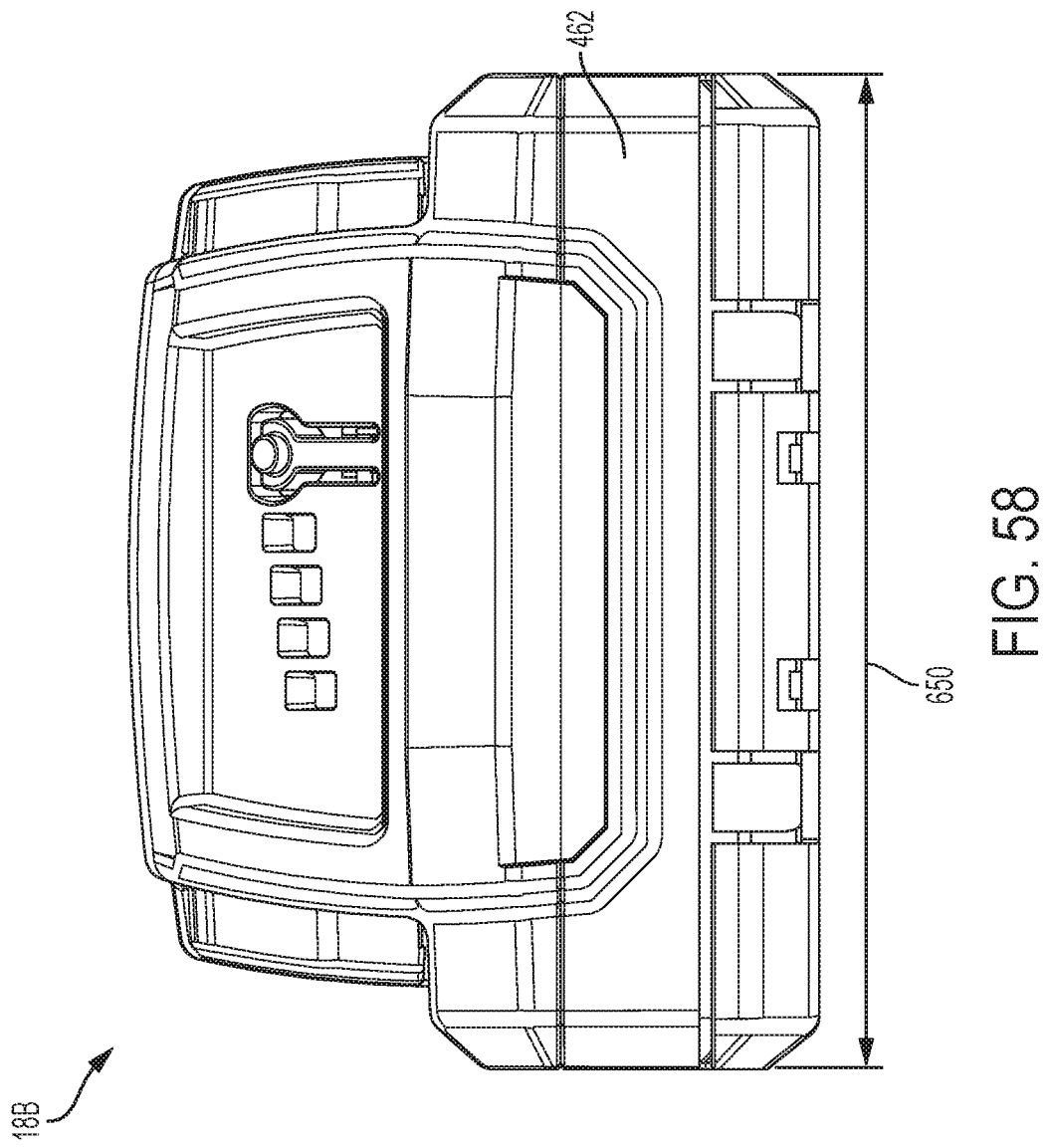
FIG. 58 is a rear plan view of the battery pack of FIG. 53.
Figure 59:
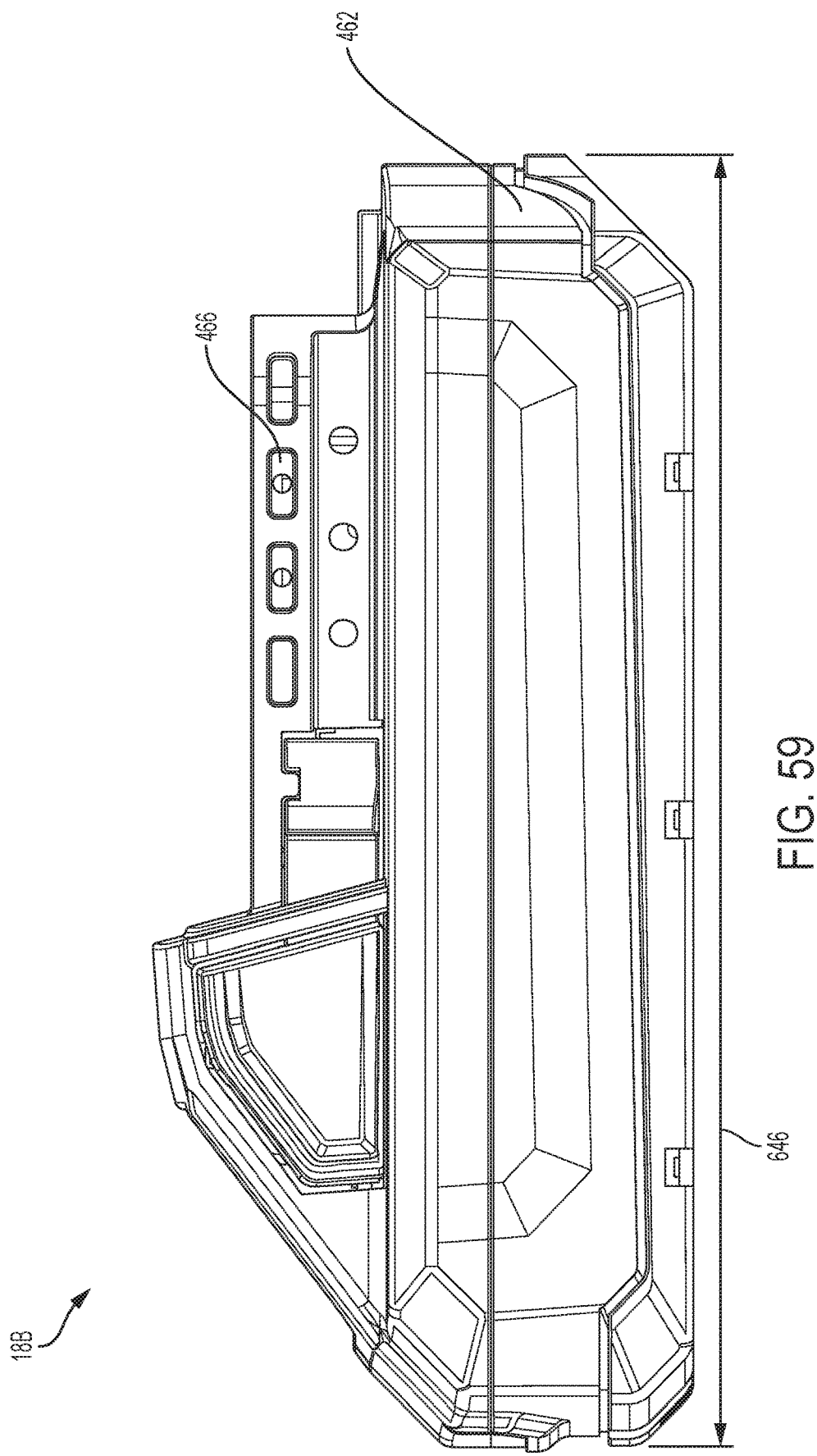
FIG. 59 is a side plan view of the battery pack of FIG. 53.
Figure 60:
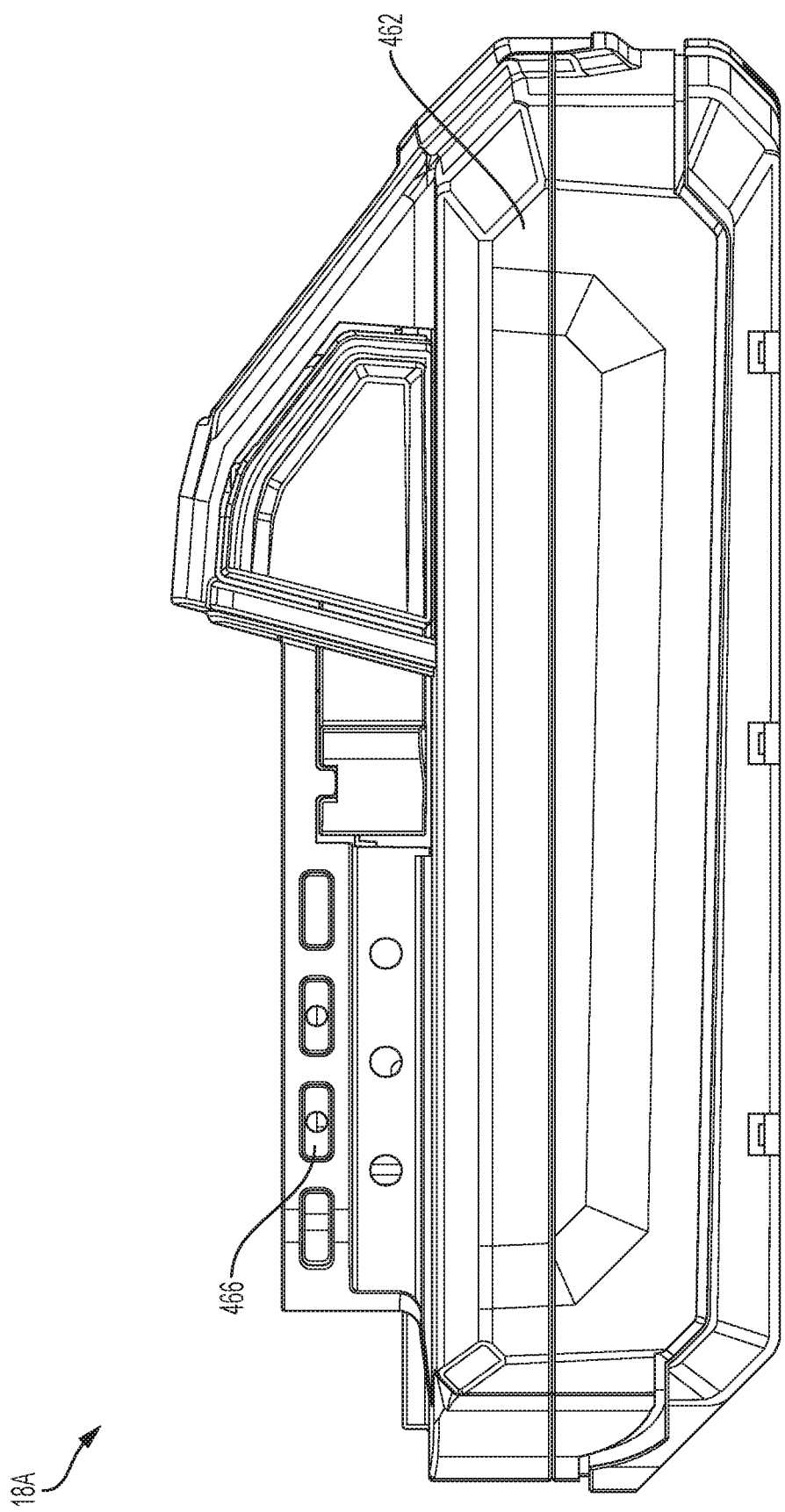
FIG. 60 is a side plan view of the battery pack of FIG. 53.
Figure 61:
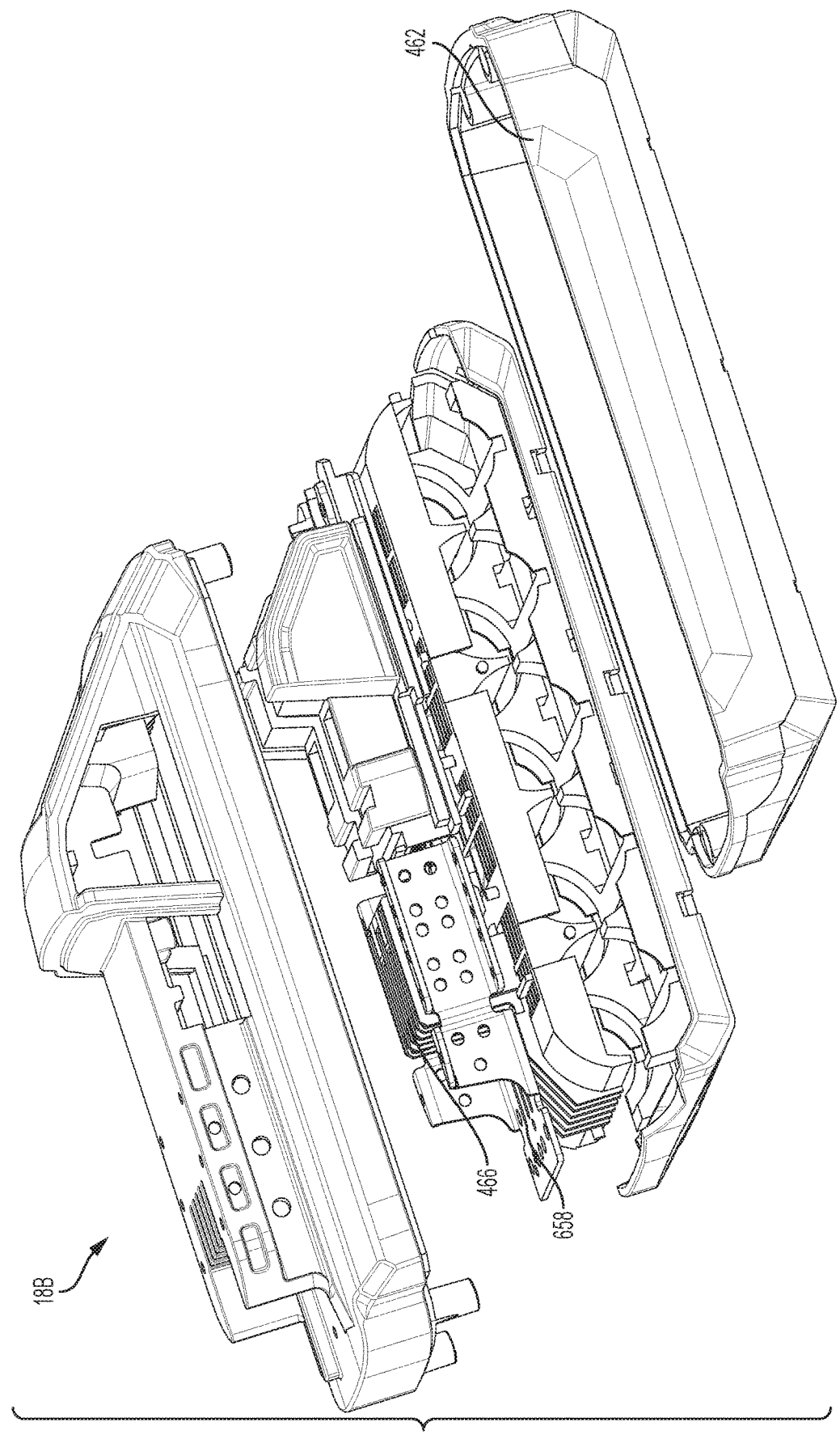
FIG. 61 is an exploded view of the battery pack of FIG. 53.
Figure 62:
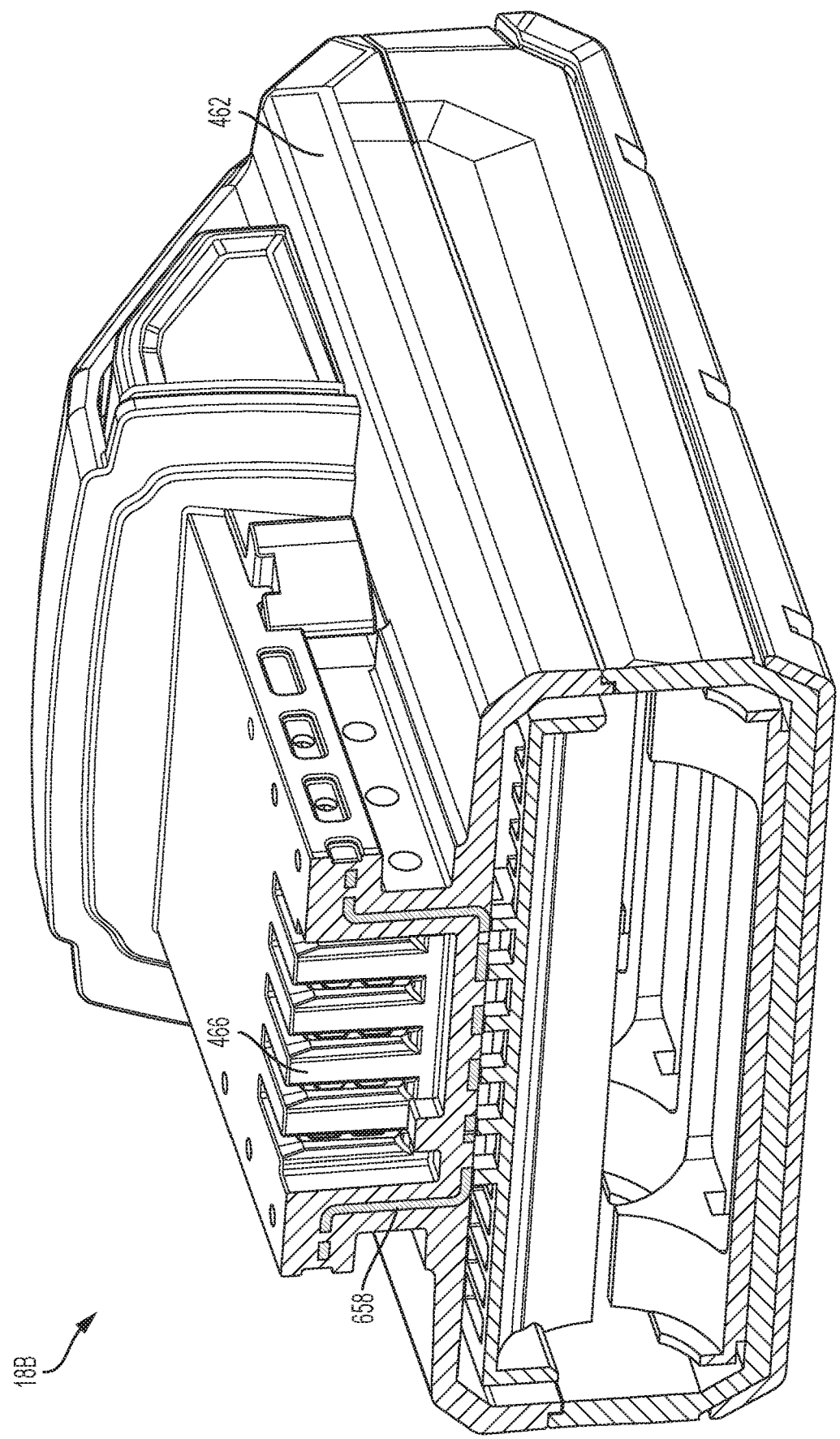
FIG. 62 is a cross-sectional view of the battery pack of FIG. 53.

With reference to FIG. 53, the battery pack 18B defines a length 646 within a range of approximately 130 mm to approximately 145 mm. In some embodiments, the length 646 is approximately 139.9 mm. The battery pack 18B defines a width 650 within a range of approximately 75 mm to approximately 90 mm. In some embodiments, the width 650 is approximately 84 mm. The battery pack 18B defines a height 654 within a range of approximately 50 mm to approximately 65 mm. In some embodiments, the height 654 is approximately 58.27 mm. The volume of the battery pack 18 is between about 487,500 mm$^3$ to about 848,250 mm$^3$ (e.g., about 507,384 mm³). The total weight of the battery pack 18B is within a range of approximately 1 lbs. to approximately 1.5 lbs. In some embodiments, the total weight of the battery pack 18B is approximately 1.2 lbs. (about 546 grams).

The battery pack 18B has an ACIR within a range of approximately 45 milliohms to approximately 55 milliohms. The battery pack 18B has a DCIR within a range of approximately 59 mΩ to approximately 69 mΩ. In some embodiments, the DCIR of the battery pack 18B is about 64 mΩ.

In comparison, an existing battery pack has a length of about 130 mm, a width of about 79 mm, and a height of about 86.5 mm. Such a battery pack has a weight of about 2.4 lbs.

Figure 74:
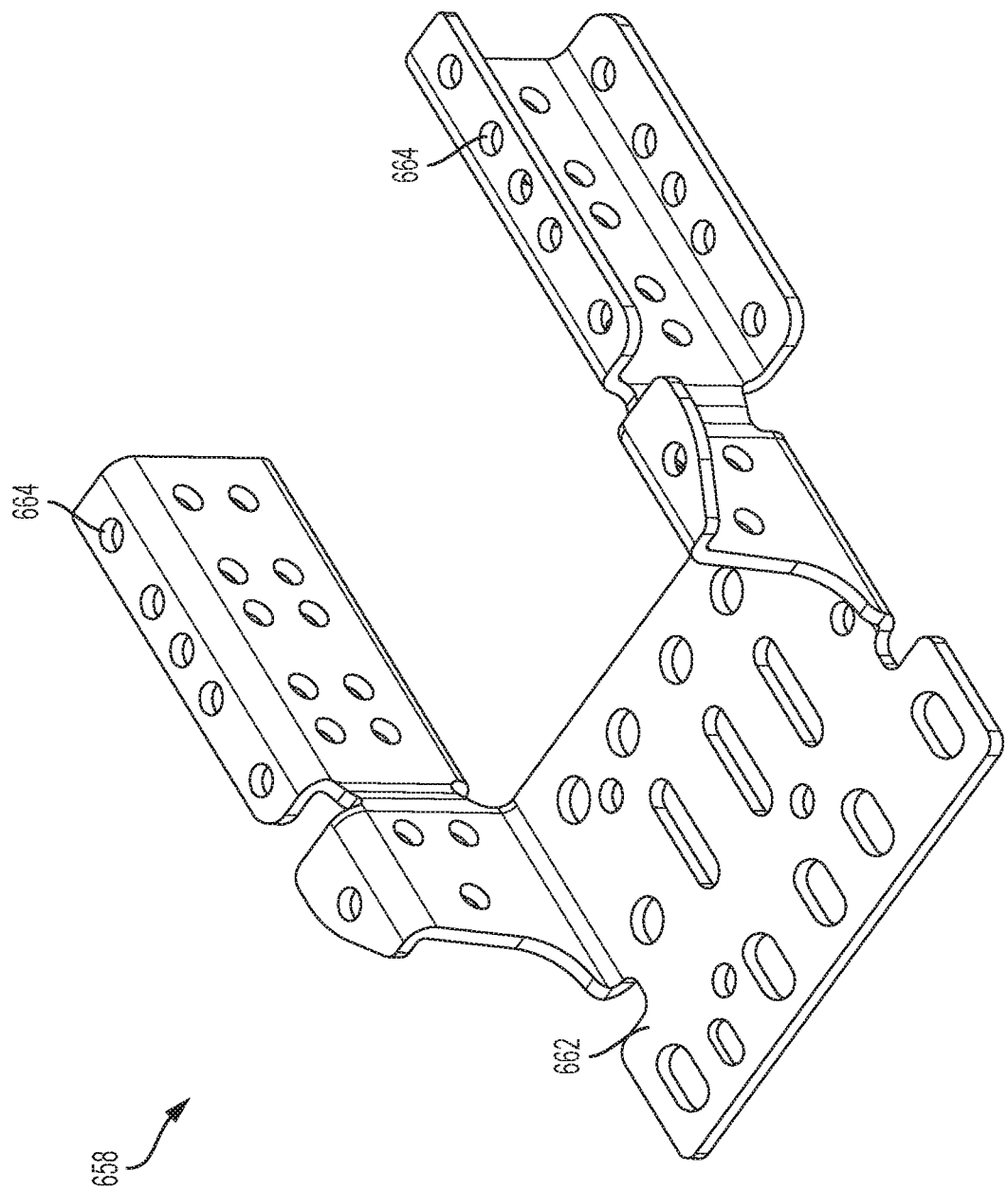
FIG. 74 is a perspective view of a C-shaped channel for a support portion of the battery pack of FIG. 2A.
Figure 75:
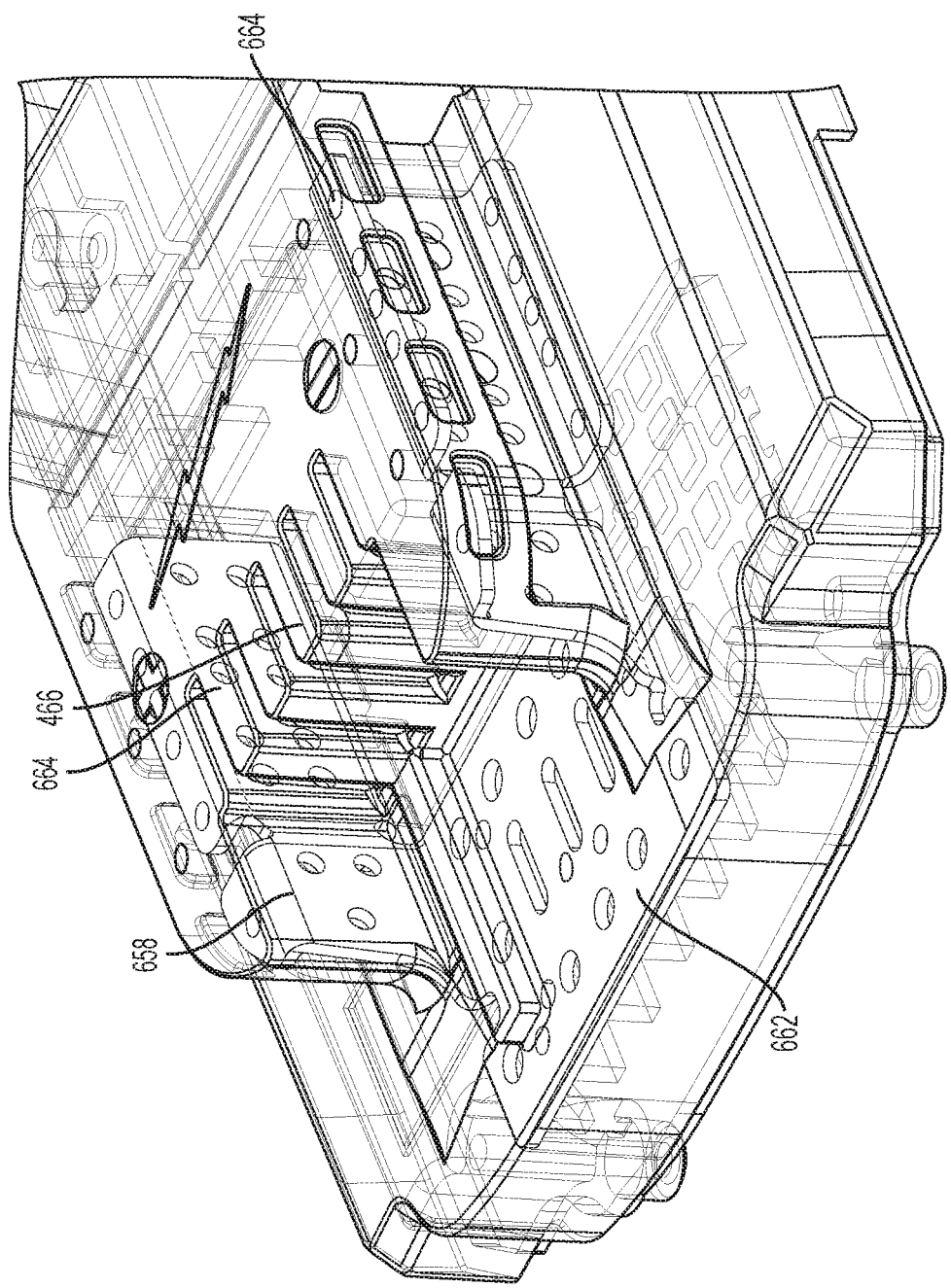
FIG. 75 is a perspective view of the C-shaped channel in the support portion of the battery pack of FIG. 2A.

Due to the higher number of cells used in the battery pack 18, the battery pack 18 may be more vulnerable to damage. The battery pack 18 includes a C-shaped channel 658 to reinforce the terminal block 466. The illustrated channel 658 is formed by a metal stamping. FIGS. 74-75 illustrate the C-shaped channel 658. As shown in FIG. 74, the C-shaped channel 658 includes a front ledge 662 and two C-shaped bars 664 connected to the front ledge 662.

Figure 76:
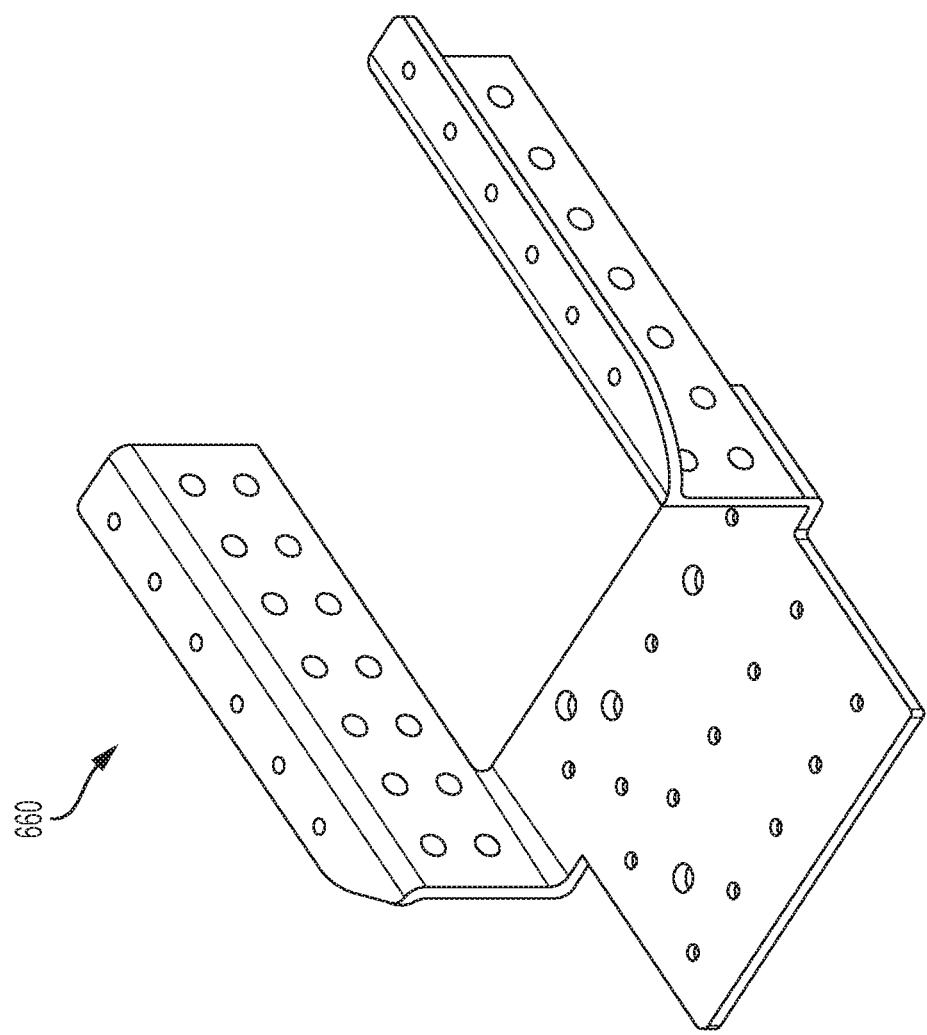
FIG. 76 is a perspective view of a L-shaped channel for the battery pack of FIG. 2B.

FIG. 75 illustrates positioning of the C-shaped channel 658 within the battery pack 18. The C-shaped channel 658 is positioned around the terminal block 466 of the battery pack 18. The front ledge 662 is positioned in front of the terminal block 466 supporting a portion of the top housing of the battery pack 18. The C-shaped bars 664 are provided on the sides of the terminal block 466 supporting the rails of the top housing that receive the corresponding portion of the power tool 10. In some embodiments, an L-shaped channel 660 (as shown in FIG. 76) rather than the C-shaped channel 658 may be used.

Figure 79:
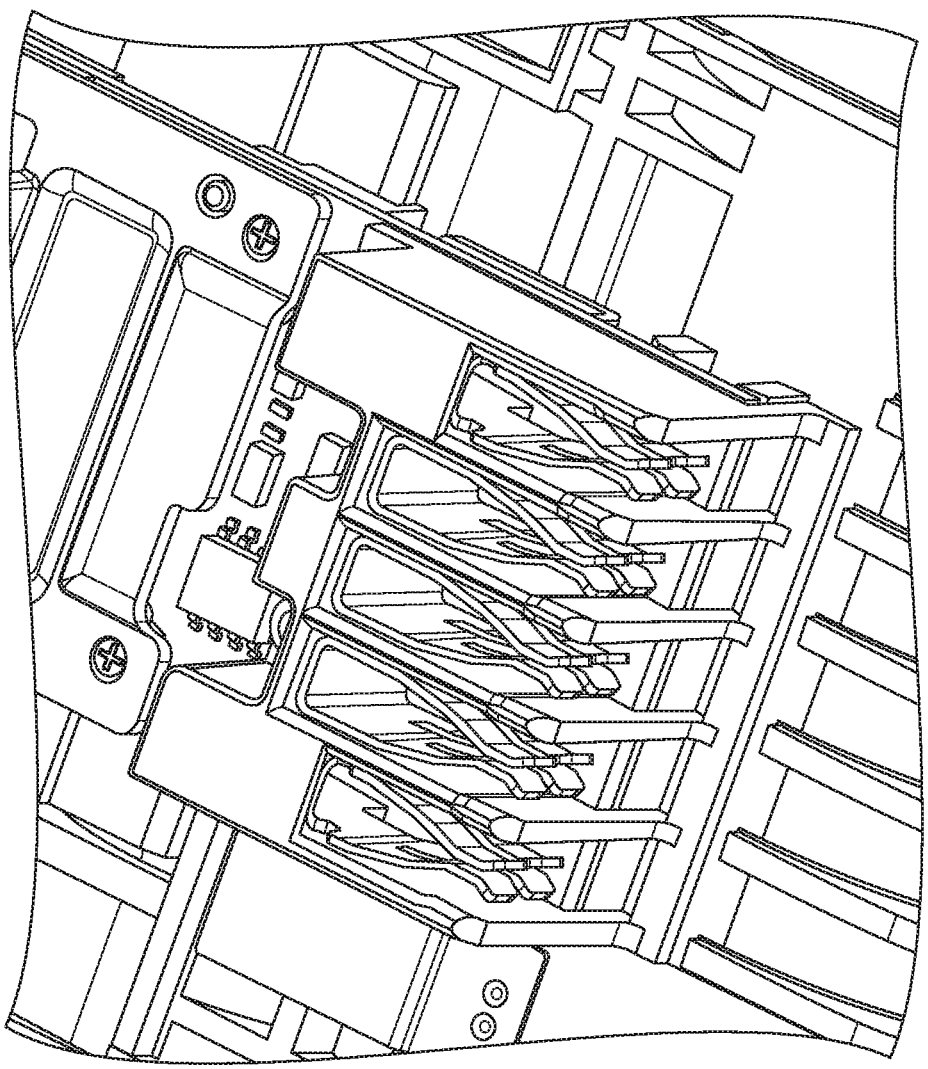
FIG. 79 is a perspective view of the terminal block of a battery pack of FIG. 2A.

FIG. 79 illustrates the terminal block 466 of the battery pack 18. The terminal block 466 includes power terminals, a charger terminal and one or more (e.g., two) communication terminals (collectively referred to as battery pack terminals 482).

The battery pack terminals 482 may be made from an EFTEC copper alloy material or FAS 680 copper alloy material. In the illustrated construction, the charger terminals and the communication terminals are shorter than the power terminals, which may allow more space for other components (e.g., circuitry for charging) of the battery pack 18. The relatively longer power terminals also ensure connection is maintained during operation to inhibit arcing, etc.

Figure 80:
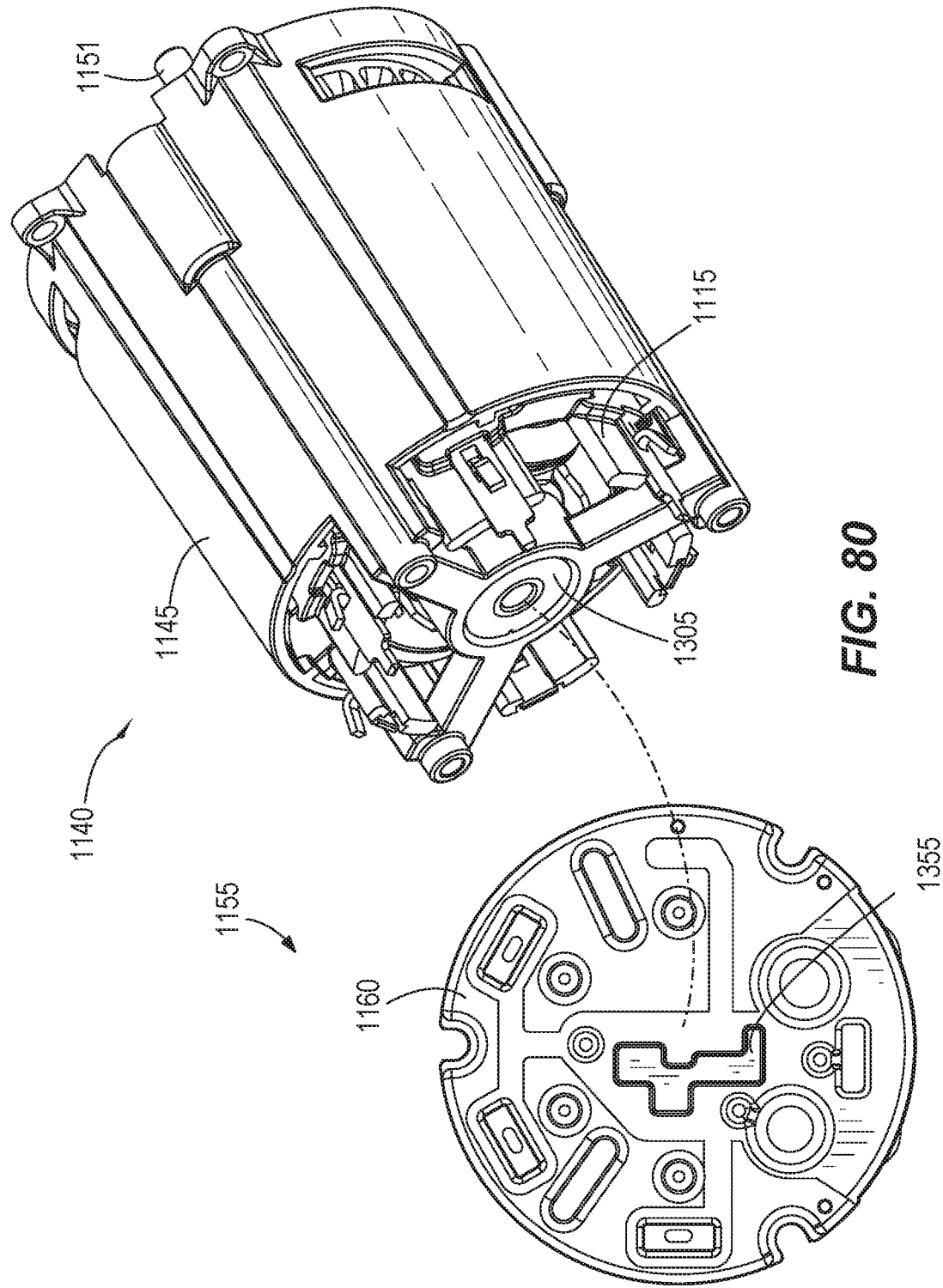
FIG. 80 is a perspective view of a motor assembly in accordance with some embodiments, illustrating a PCB assembly exploded from the remainder of the motor assembly.
Figure 81:
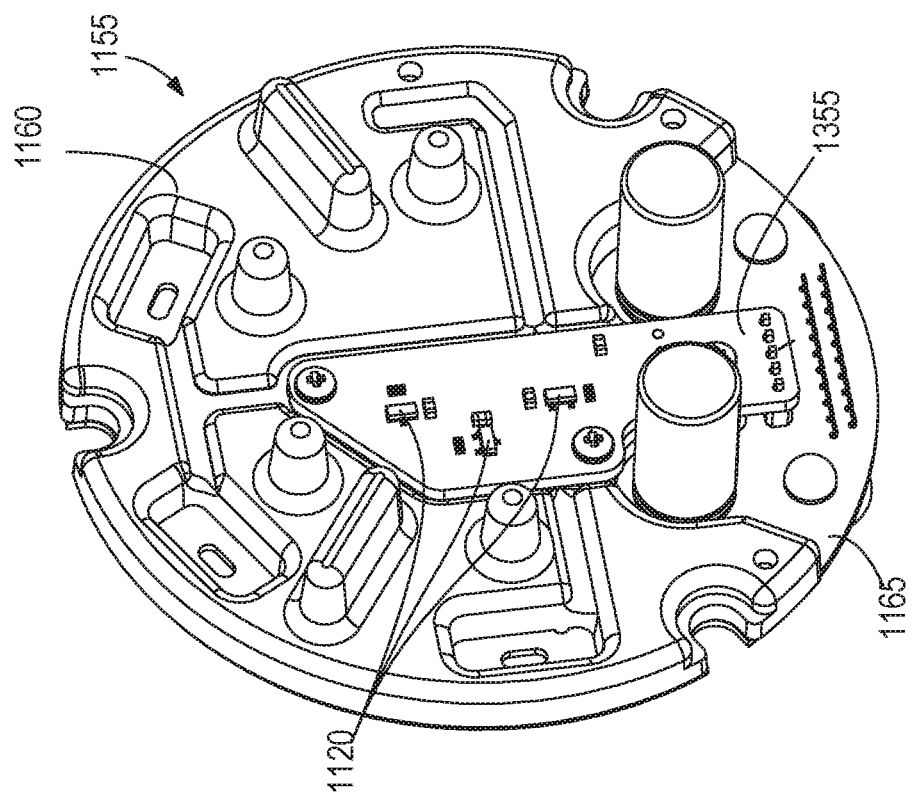
FIG. 81 is a perspective view of the PCB assembly of FIG. 80, with portions removed.

With reference to FIGS. 80-81, a motor assembly 1140 is shown including a motor housing 1145, a motor 1115 positioned within the motor housing 1145, and a PCB assembly 1155 coupled to an end of the motor housing 1145 opposite the end from which a motor shaft 1151 protrudes. The PCB assembly 1155 includes a heat sink 1160, a power PCB 1165 disposed on a rear side of the heat sink 1160, and a position sensor PCB 1355 disposed on an opposite side of the heat sink 1160. The motor 1115 also includes a permanent ring magnet 1305 mounted on the rear of the rotor shaft 1151. The ring magnet 1305 is affixed to the rotor shaft 1151 and co-rotates with the rotor shaft 1151, emanating a rotating magnetic field that is detectable by Hall-effect sensors 1120 (FIG. 81) mounted on the position sensor PCB 1355. In other words, the Hall-effect sensors 1120 on the position sensor PCB 1355 detect the rotating magnetic field emanated by the ring magnet 1305. In some embodiments, the position sensor PCB 355 is at least partially covered by a low-pressure molding.

The Hall-effect sensors 1120 output motor feedback information, such as an indication (e.g., a pulse) when the Hall-effect sensors detect a pole of a magnet 1305 attached to a rotating shaft 1151 of the motor 1115. Based on the motor feedback information from the Hall-effect sensors 1120, the motor controller may determine the rotational position, velocity, and/or acceleration of the shaft 1151. In the illustrated embodiment, there are three Hall-effect sensors 1120 on the position sensor PCB 1355. Alternatively, there may be other numbers of Hall-effect sensors 1120 (e.g., two, four, etc.).

Figure 82:
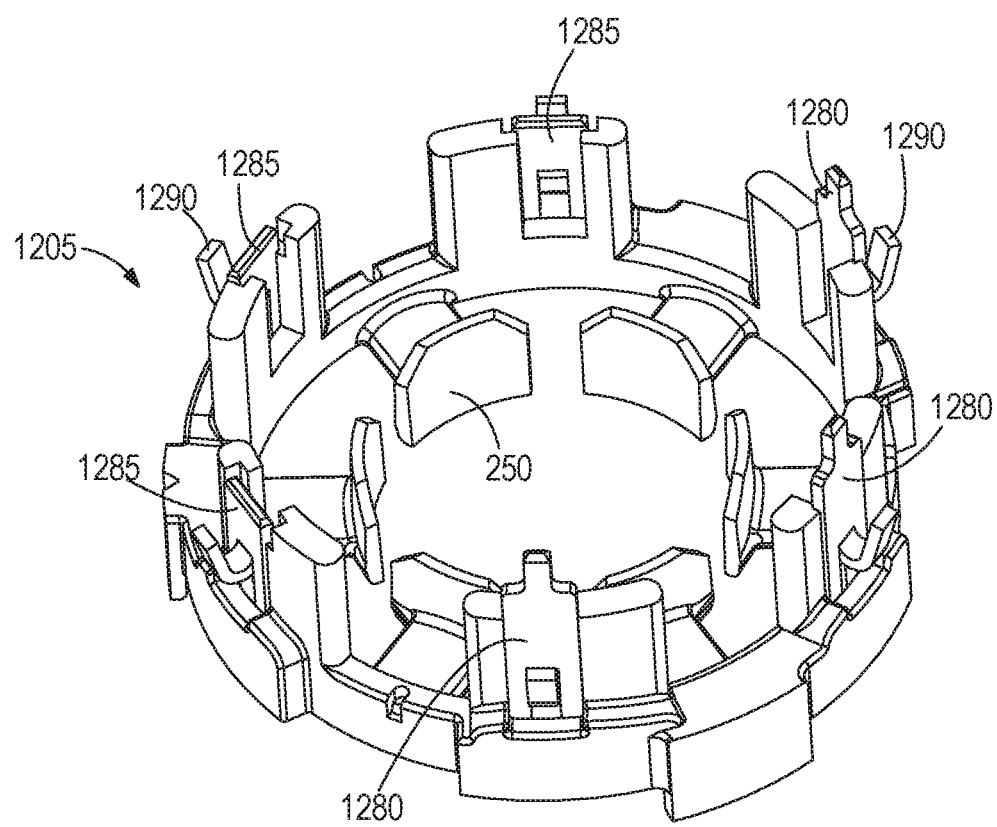
FIG. 82 is a perspective view of an end cap in accordance with some embodiments, with coil contact plates overmolded therein.
Figure 83:
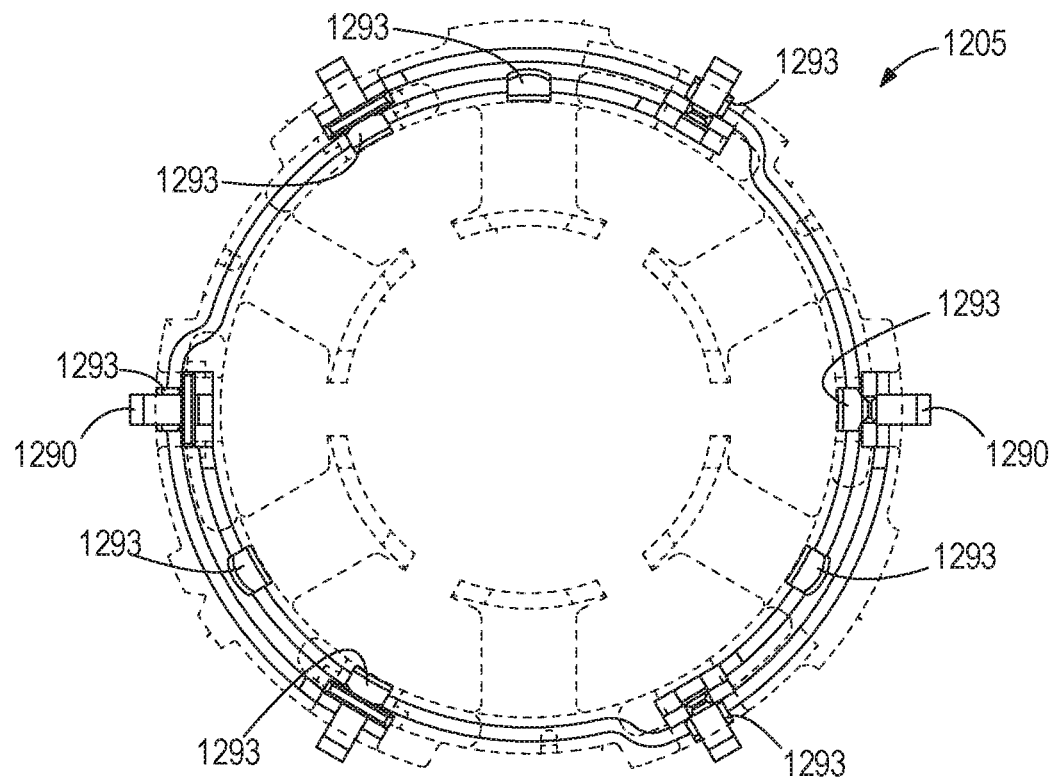
FIG. 83 is a front view of the end cap and coil contact plates of FIG. 82, illustrating the end cap in a transparent state.
Figure 84:
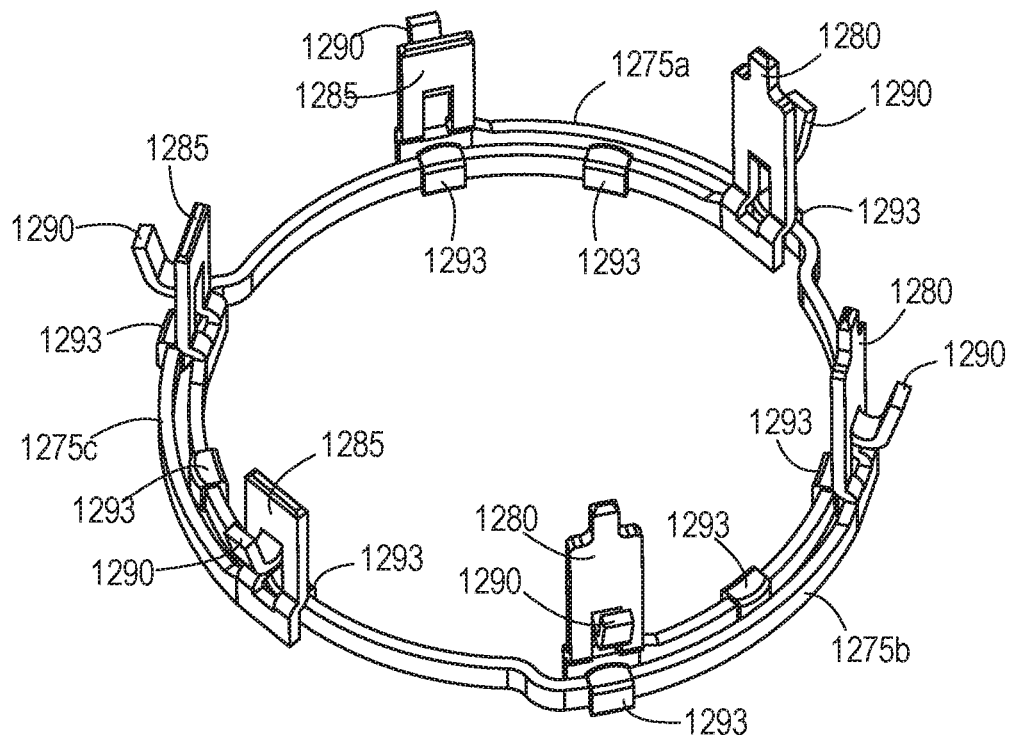
FIG. 84 is perspective view of the coil contact plates of FIG. 82.

With reference to FIG. 82-84, an end cap 1205 is shown with contact plates 1275a, 1275b, and 1275c (also referred interchangeably herein as coil contact plates 1275) that short-circuit diagonally opposite pairs of coil windings. The coil contact plates 1275 are generally semi-circular in shape and staggered to avoid contact between adjacent coil contact plates 1275. In particular, the first coil contact plate 1275a is positioned radially inward of the second coil contact plate 1275b, and the first coil contact plate 1275a is positioned radially outward of the third coil contact plate 1275c. Each of the coil contact plates 1275 includes a first terminal 1280 and a second terminal 1285 diagonally opposite the first terminal 1280. Stator windings are connected to hooks 1290 on the respective terminals 1280, 1285.

With continued reference to FIGS. 83 and 84, a plurality of spacers 1293 are coupled to the coil contact plates 1275. At least some of the spacers 1293 are positioned between adjacent coil contact plates 1275 in order to create and maintain an insulating gap (e.g., a space) between the adjacent coil contact plates 1275. In some embodiments, the plurality of spacers 1293 are equally spaced circumferentially around the coil contact plates 1275. The spacers 1293 are pre-molded onto the coil contact plates 1275 before the coil contact plates 1275 are overmolded. As such, the coil contact plates 1275 and the spacers 1283 are overmolded in the end cap 1205. In particular, each of the spacers 1293 are molded on one of the coil contact plates 1275. In the illustrated embodiment, the spacers 1293 include a first spacer positioned between the first and second adjacent coil contact plates 1275a, 1275b, and a second spacer 1293 positioned between the adjacent first and third coil contact plates 1275a, 1275c. As such, insulating gaps are created between the adjacent coil contact plates 1275. The pre-molded spacers 1293 prevent internal shorts between coil contact plates 1275 and portions of the coil contact plates 1275 being exposed. In other words, the relative spacing between adjacent coil contact plates 1275 may be difficult to adequately control during an injection molding process, and the coil contact plates 1275 may deform during the molding process from the injection pressure. This deformation of the coil contact plates 1275 can cause internal shorts or exposure. By adding the pre-molding spacers 1293, deformation of the coil contact plates 1275 while being overmolded is prevented.

Thus, the invention may provide, among other things, high-power, battery-powered electrical system, such as a power tool system.

Although the invention has been described in detail with reference to certain preferred embodiments, variations and modifications exist within the scope and spirit of one or more independent aspects of the invention as described.

One or more independent features and/or independent advantages of the invention may be set forth in the claims.

What is claimed is:

1. A method of operating a motor of a powertool including a trigger switch, a field-effect transistor (FET) being operable to supply current to the motor, and a relay being operable to supply current to the FET, the method comprising:

in response to a trigger signal from the trigger switch to operate the motor, determining whether the FET is operational; and in response to the FET being operational, operating the relay to supply current through the FET to the motor.

2. The method of claim 1, wherein a second FET is operable to supply current to the motor, and wherein the method further comprises, before operating the relay, in response to the signal to operate the motor, determining whether the second FET is operational.

3. The method of claim 1, further comprising, in response to the FET not being operational, disabling operation of the motor.

4. The method of claim 3, wherein disabling includes temporarily disabling operation of the motor.

5. The method of claim 4, further comprising after temporarily disabling, determining whether the FET is operational.

6. The method of claim 5, further comprising, in response to the FET being operational after temporarily disabling the motor, operating the relay to supply current through the FET to the motor.

7. The method of claim 5, further comprising, in response to the FET not being operational after temporarily disabling the motor, permanently disabling the motor.

8. The method of claim 1, wherein determining includes turning on the FET.

9. The method of claim 8, wherein determining includes supplying a test signal to the FET, and monitoring an output of the FET.

10. The method of claim 1, wherein the relay is provided between a battery pack and the FET, and wherein the method further comprises supplying, using the relay, current from the battery pack to the FET in response to the signal to operate the motor.

11. The method of claim 1, wherein operating the relay to supply current through the FET to the motor includes closing the relay to supply the current from a power source.

12. The method of claim 1, further comprising closing the relay to supply the current from a power source to the FET, without operating the motor, when determining whether the FET is operational.

13. The method of claim 1, wherein the current is supplied to the motor through the relay and the FET.

14. The method of claim 1, further comprising providing pulse-width modulation (PWM) signals to the FET for controlling a speed of the motor.

15. The method of claim 14, wherein the signal to operate the motor indicates a magnitude of an operating parameter of the motor, and wherein the method further comprises adjusting a duty cycle of the PWM signal provided to the FET to correspond to the magnitude of the operating parameter.

16. The method of claim 14, further comprising:
in response to detecting that the current exceeds a predetermined threshold, reducing the duty cycle of the PWM signal provided to the FET.

17. The method of claim 16, wherein reducing the duty cycle of the PWM signal includes reducing the duty cycle to a non-zero value.

* * * * *